(12) United States Patent
Pitbladdo

(10) Patent No.: US 6,895,782 B2
(45) Date of Patent: May 24, 2005

(54) OVERFLOW DOWNDRAWN GLASS FORMING METHOD AND APPARATUS

(76) Inventor: Richard B. Pitbladdo, 415 Augusta Blvd. #111, Naples, FL (US) 34113

( * ) Notice: Subject to any disclaimer, the term of this patent is extended or adjusted under 35 U.S.C. 154(b) by 0 days.

(21) Appl. No.: 10/771,761

(22) Filed: Feb. 4, 2004

(65) Prior Publication Data

US 2004/0154336 A1 Aug. 12, 2004

Related U.S. Application Data

(63) Continuation-in-part of application No. 10/214,904, filed on Aug. 8, 2002.
(60) Provisional application No. 60/444,728, filed on Feb. 4, 2003, provisional application No. 60/449,671, filed on Feb. 24, 2003, provisional application No. 60/505,302, filed on Sep. 23, 2003, and provisional application No. 60/534,950, filed on Jan. 8, 2004.

(51) Int. Cl.[7] .............................................. C03B 17/06
(52) U.S. Cl. ................................ 65/53; 65/121; 65/195
(58) Field of Search ............................ 65/53, 121, 195

(56) References Cited

U.S. PATENT DOCUMENTS

| 1,673,907 A | 6/1928 | Ferngren |
| 1,697,227 A | 1/1929 | Danner |
| 1,731,260 A | 10/1929 | Nobbe |

(Continued)

FOREIGN PATENT DOCUMENTS

| DE | 1596484 | 7/1967 |
| DE | 1596402 | 12/1967 |

(Continued)

OTHER PUBLICATIONS

Bottger, et al.; "LCD substrate—the future process" International Glass Review, Issue 2—2000; 3 pages.
Bocko, Peter L. and Mitchell, Mark H. "AMLCD Glass Substrates—Foundation for High–Tech Displays" The GlassResearcher, vol. 12, No. 1, pp. 26–29, 2002 (no month available).
Varshneya, Arun, "Fundamentals of Inorganic Glasses", Academic Press, Inc., 1994, pp. 534–540.
Snyder, R.D./Byars, E.F., "Engineering Mechanics", McGraw–Hill Book Company, 1973, pp. 349–350.
Kingery, W.D.; Bowen, H.K.; Uhlmann, D.R., "Introduction to Ceramics", John Wiley & Sons, 1976, pp. 705–767.

*Primary Examiner*—Sean Vincent
(74) *Attorney, Agent, or Firm*—Brown & Michaels, PC

(57) ABSTRACT

The present invention alters the flow path at the inlet of the sheet glass forming apparatus to improve quality. The bottom of the downcomer pipe is preferably shaped to alter the character of the vortex flow in the quiescent flow zone between the pipes. In another embodiment, a bead guide provides hydraulic stresses that are in opposition to the surface tension stress and thus reduces the influence of surface tension on the formation of thick beads on the edges of the sheet. The present invention also measures the temperature of the glass by immersing thermocouples in the glass, at locations where any defects caused by the immersion are in the glass that forms the unusable edges of the sheet. In another embodiment, the support structure for the trough is altered to substantially reduce the aging of the trough due to thermal creep.

59 Claims, 58 Drawing Sheets

U.S. PATENT DOCUMENTS

| | | | |
|---|---|---|---|
| 1,759,229 A | 5/1930 | Drake | |
| 1,829,639 A | 10/1931 | Ferngren | |
| 1,829,641 A | 10/1931 | Ferngren | |
| 1,841,579 A | 1/1932 | Fraser | |
| 1,891,370 A | 12/1932 | Danner | |
| 3,149,949 A | 9/1964 | Dockerty et al. | 65/53 |
| 3,338,696 A | 8/1967 | Dockerty | 65/145 |
| 3,433,613 A | 3/1969 | Dockerty | 65/145 |
| 3,437,470 A | 4/1969 | Overman | 65/195 |
| 3,451,798 A | 6/1969 | Simon | 65/199 |
| 3,506,429 A | 4/1970 | Overman | 65/203 |
| 3,519,411 A | 7/1970 | Cortright et al. | 65/90 |
| 3,589,887 A | 6/1971 | Ward | 65/195 |
| 3,607,182 A | 9/1971 | Leibowitz | 65/53 |
| 3,682,609 A | 8/1972 | Dockerty | 65/83 |
| 3,723,082 A | 3/1973 | Knowles et al. | 65/84 |
| 4,214,886 A | 7/1980 | Shay et al. | 62/121 |
| 4,416,678 A | 11/1983 | Bottger | 65/2 |
| 5,374,595 A | 12/1994 | Dumbaugh, Jr. et al. | 501/66 |
| 6,319,867 B1 | 11/2001 | Chacon et al. | 501/66 |
| 2001/0039814 A1 | 11/2001 | Pitbladdo | 65/193 |
| 2003/0110804 A1 | 6/2003 | Fenn et al. | 65/90 |
| 2003/0192349 A1 | 10/2003 | Meda et al. | 65/53 |
| 2004/0055338 A1 * | 3/2004 | Helfinstine et al. | 65/374.13 |

FOREIGN PATENT DOCUMENTS

| | | |
|---|---|---|
| DE | 1596403 | 12/1967 |
| DE | 21 58 253 | 11/1971 |
| DE | 31 11484 A1 | 2/1983 |
| DE | 33 16795 | 11/1983 |
| DE | 31 11484 C2 | 12/1983 |
| DE | 33 14540 | 12/1983 |
| DE | 3329843 | 5/1984 |
| DE | 3507852 | 8/1985 |
| DE | 3518137 | 1/1986 |
| DE | 43 36 046 | 10/1993 |
| DE | 43 26 143 | 12/1993 |
| DE | 196 44 673 | 4/1998 |
| DE | 198 09 878 | 9/1999 |
| DE | 198 40 113 | 3/2000 |
| DE | 19964043 | 7/2001 |
| DE | 100 21 013 | 11/2001 |
| DE | 100 28 741 | 12/2001 |
| FR | 1549081 | 12/1967 |
| FR | 1549915 | 1/1968 |
| GB | 982153 | 2/1965 |
| JP | 09110443 | 4/1997 |
| JP | 10291827 | 11/1998 |
| JP | 11-246230 | 9/1999 |
| JP | 2001-80922 | 9/1999 |

* cited by examiner

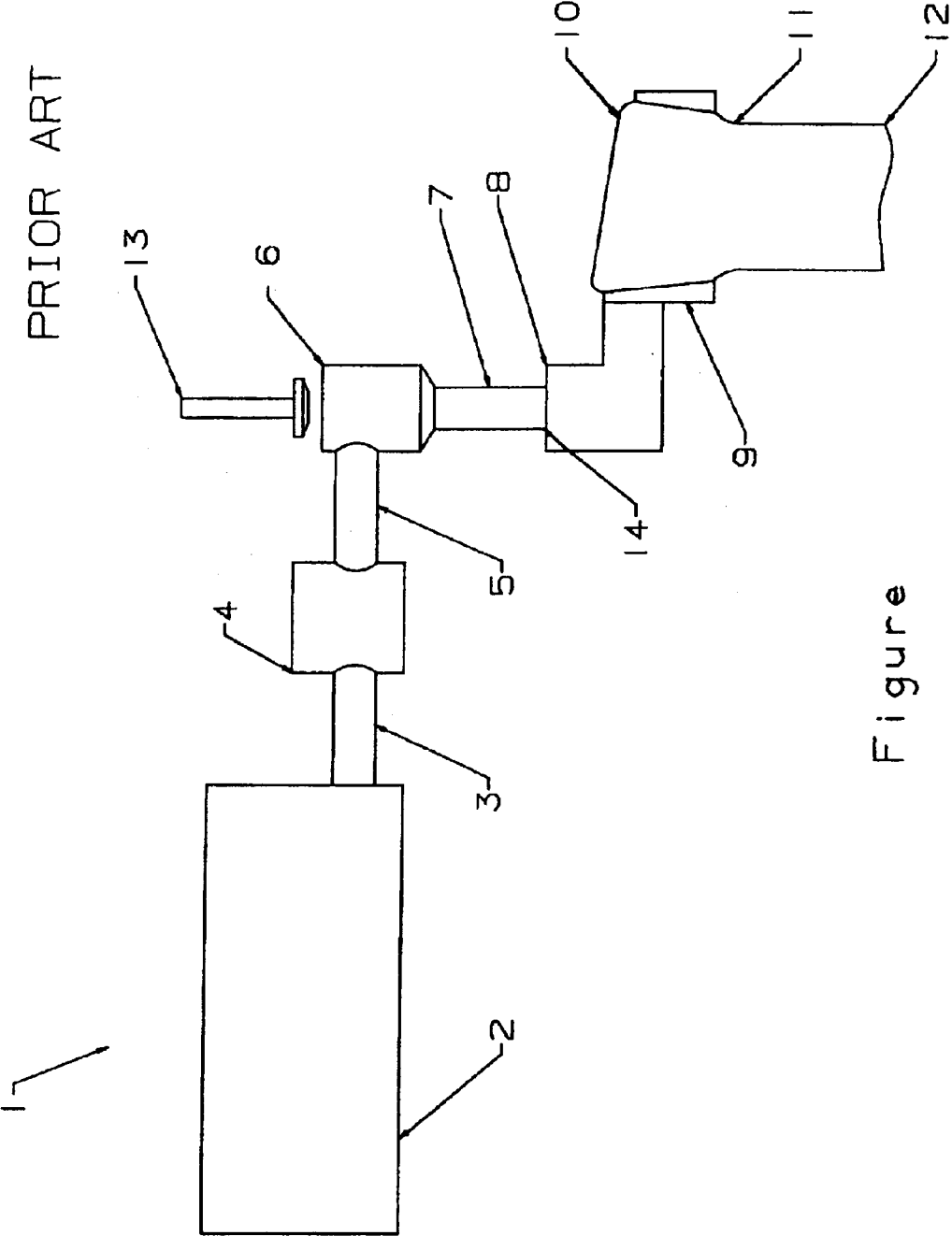

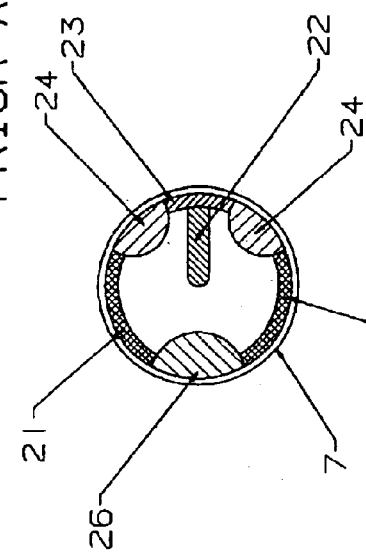
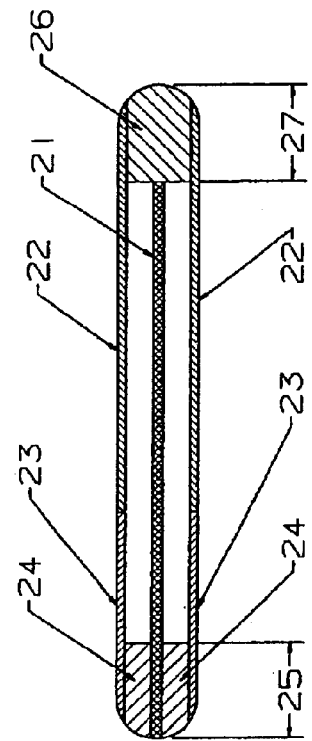
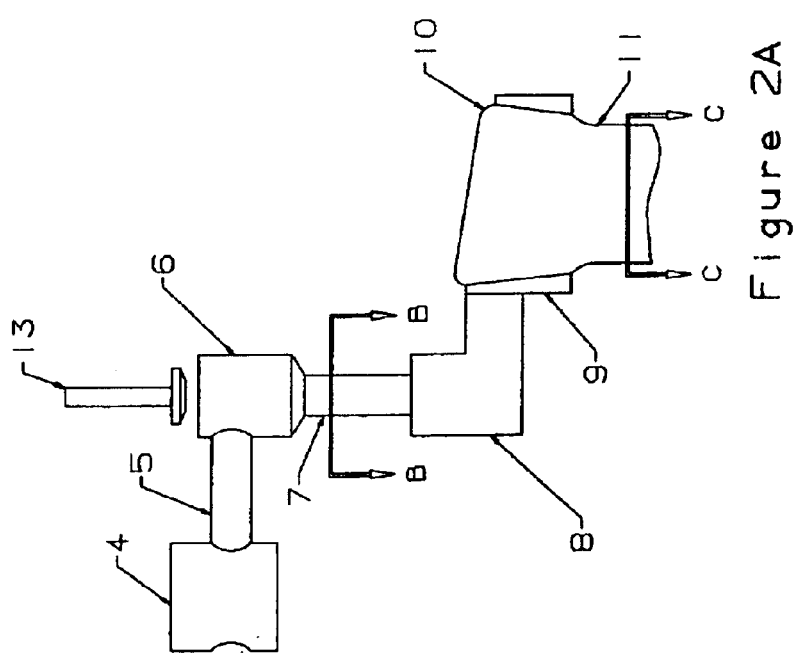
Figure 2B PRIOR ART
Figure 2C
Figure 2A

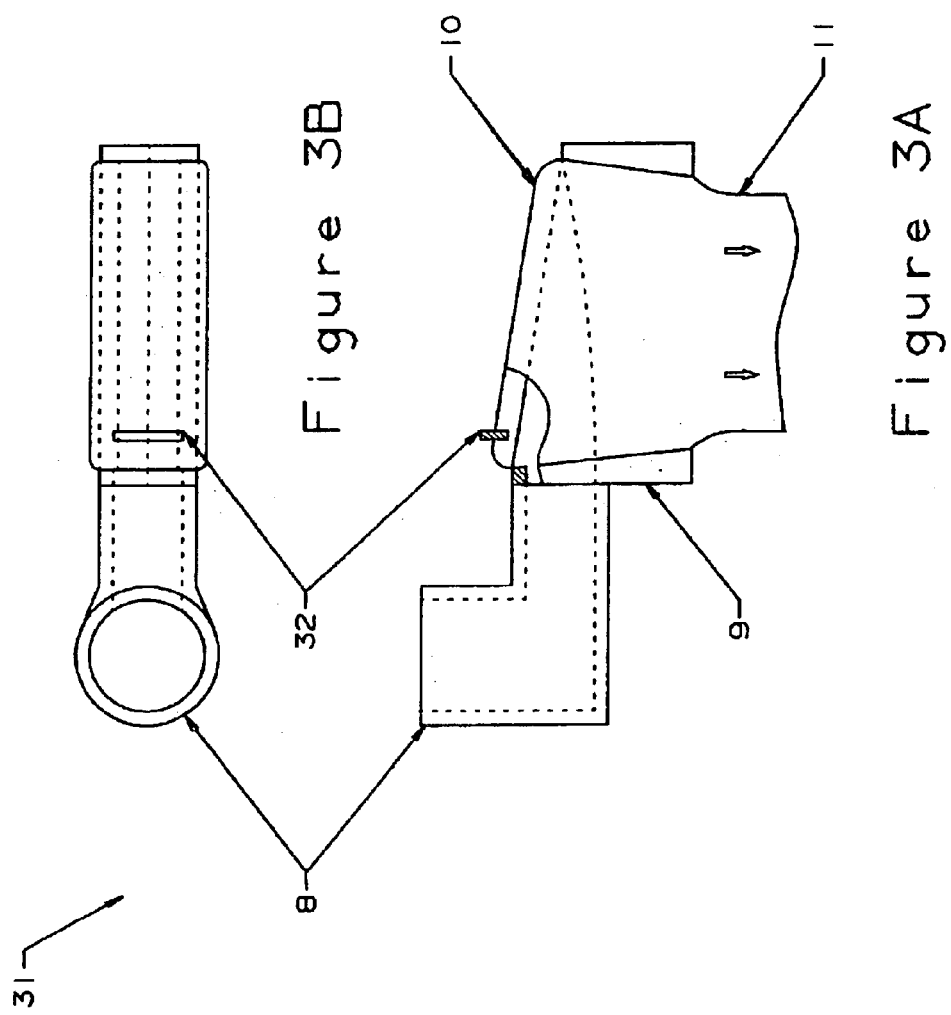

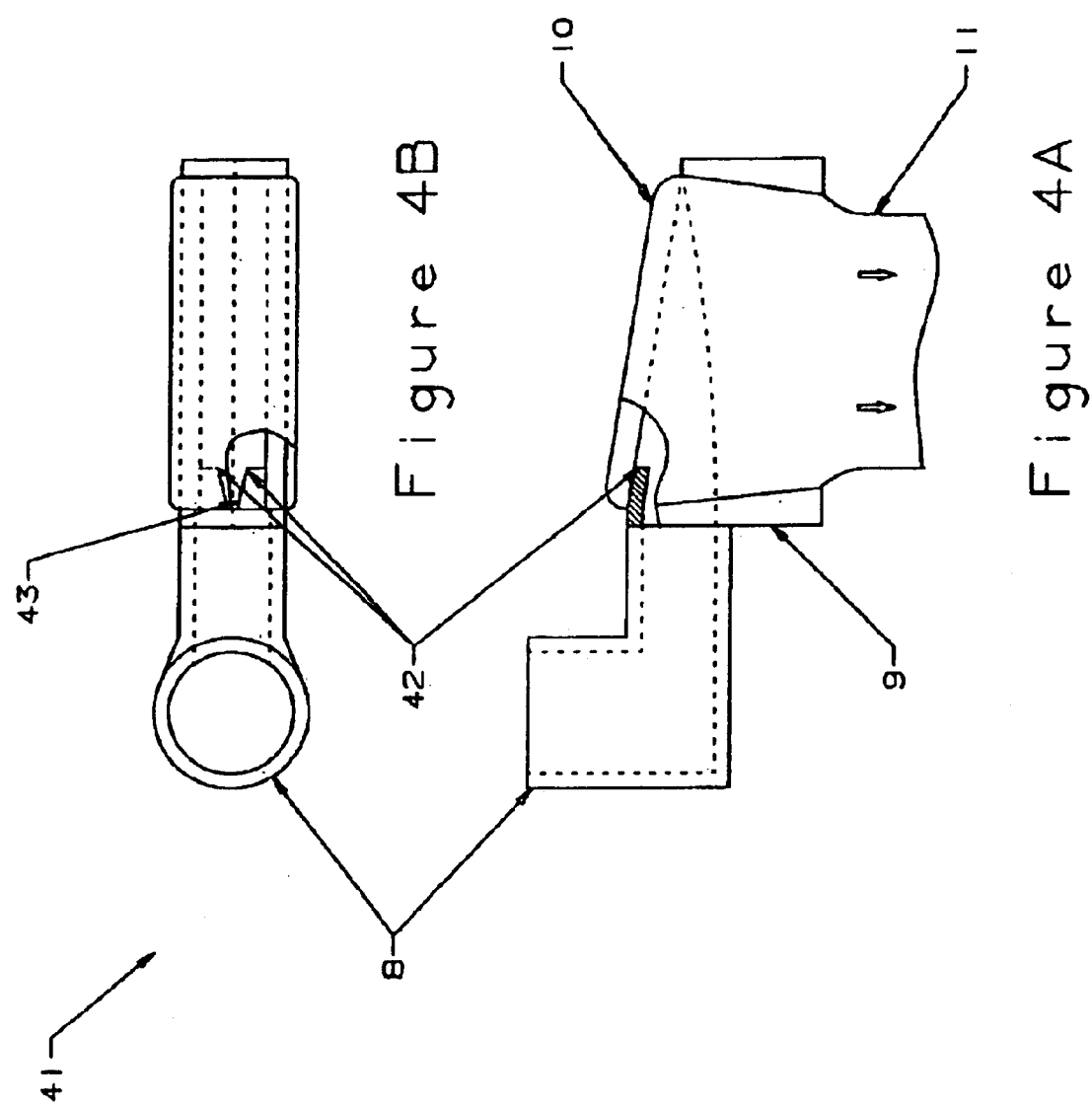

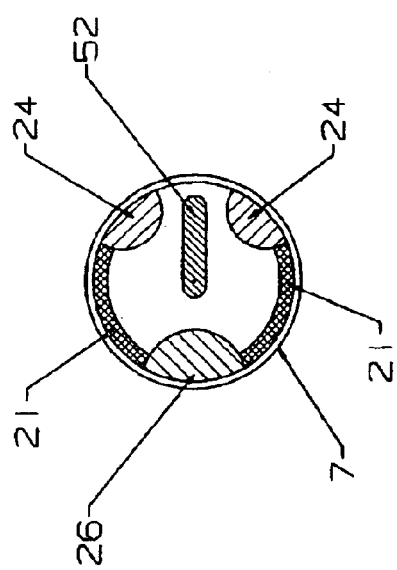
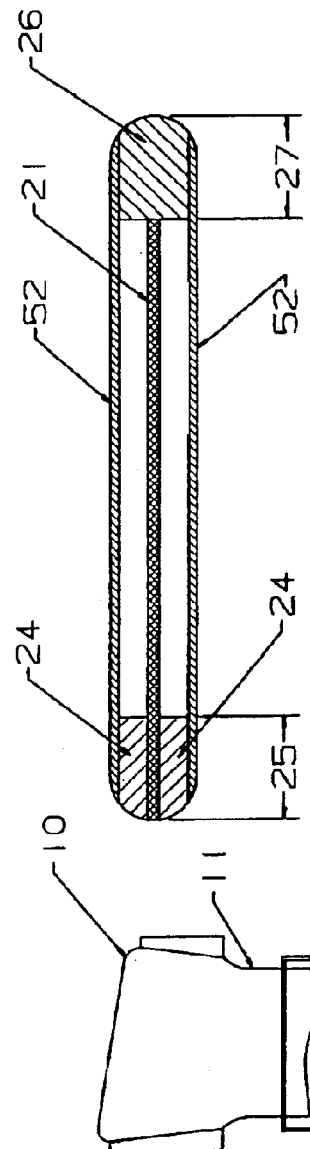
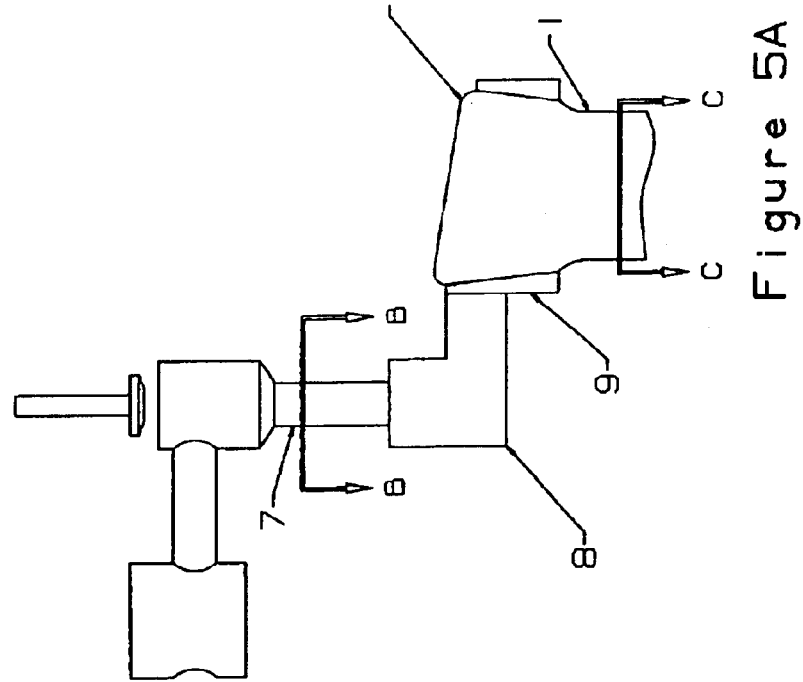

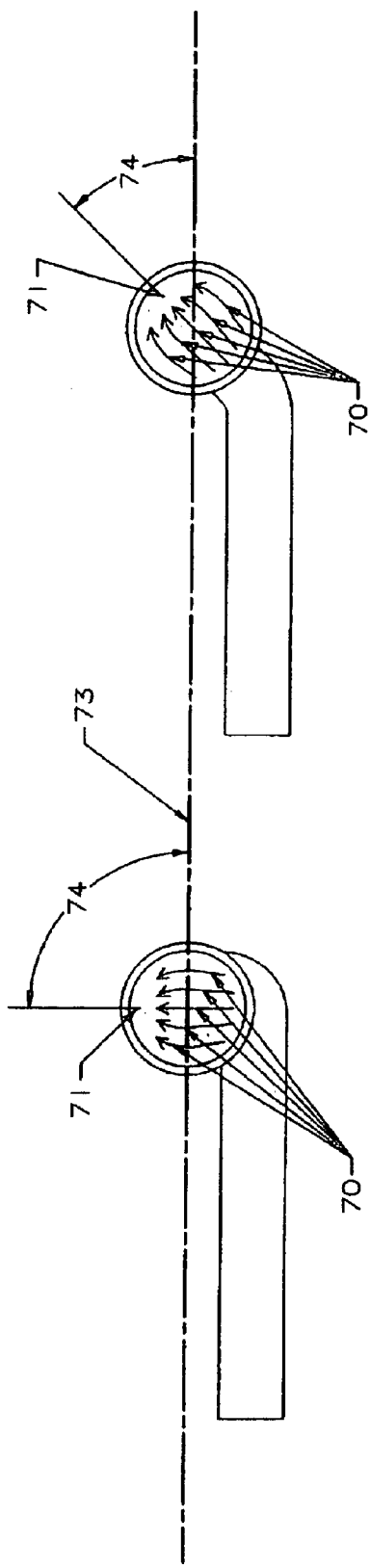
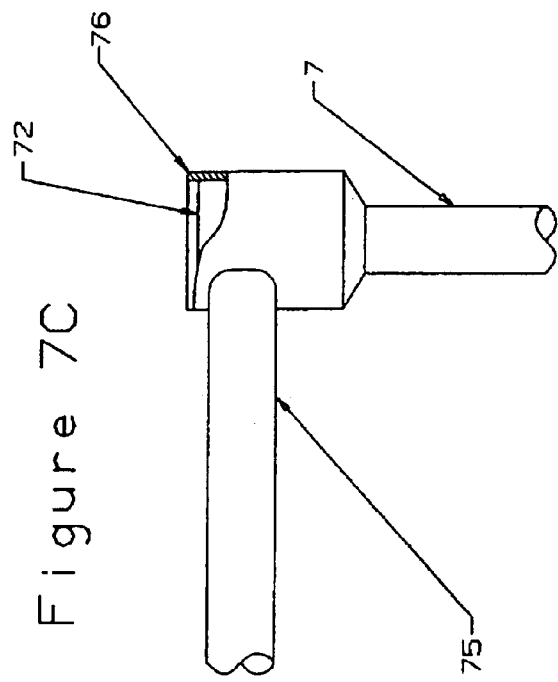
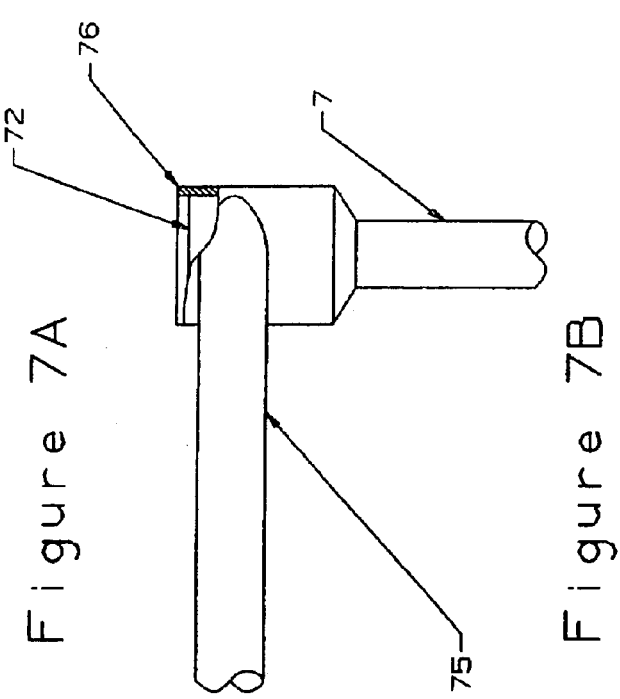
Figure 7A
Figure 7B
Figure 7C
Figure 7D

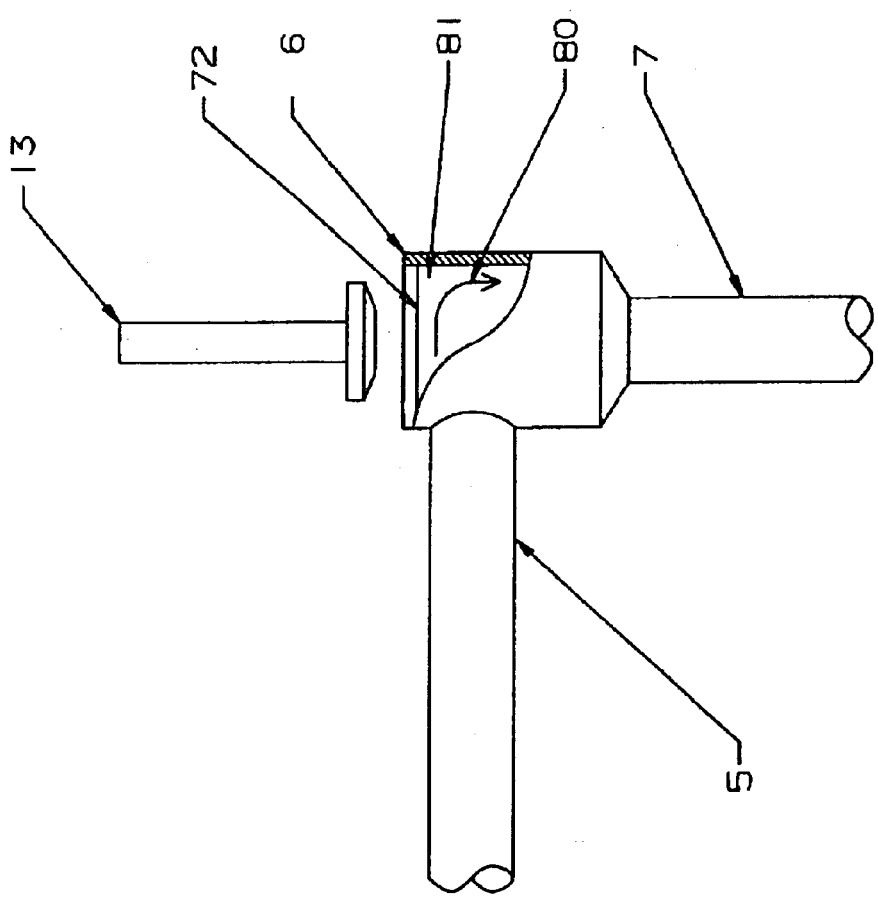

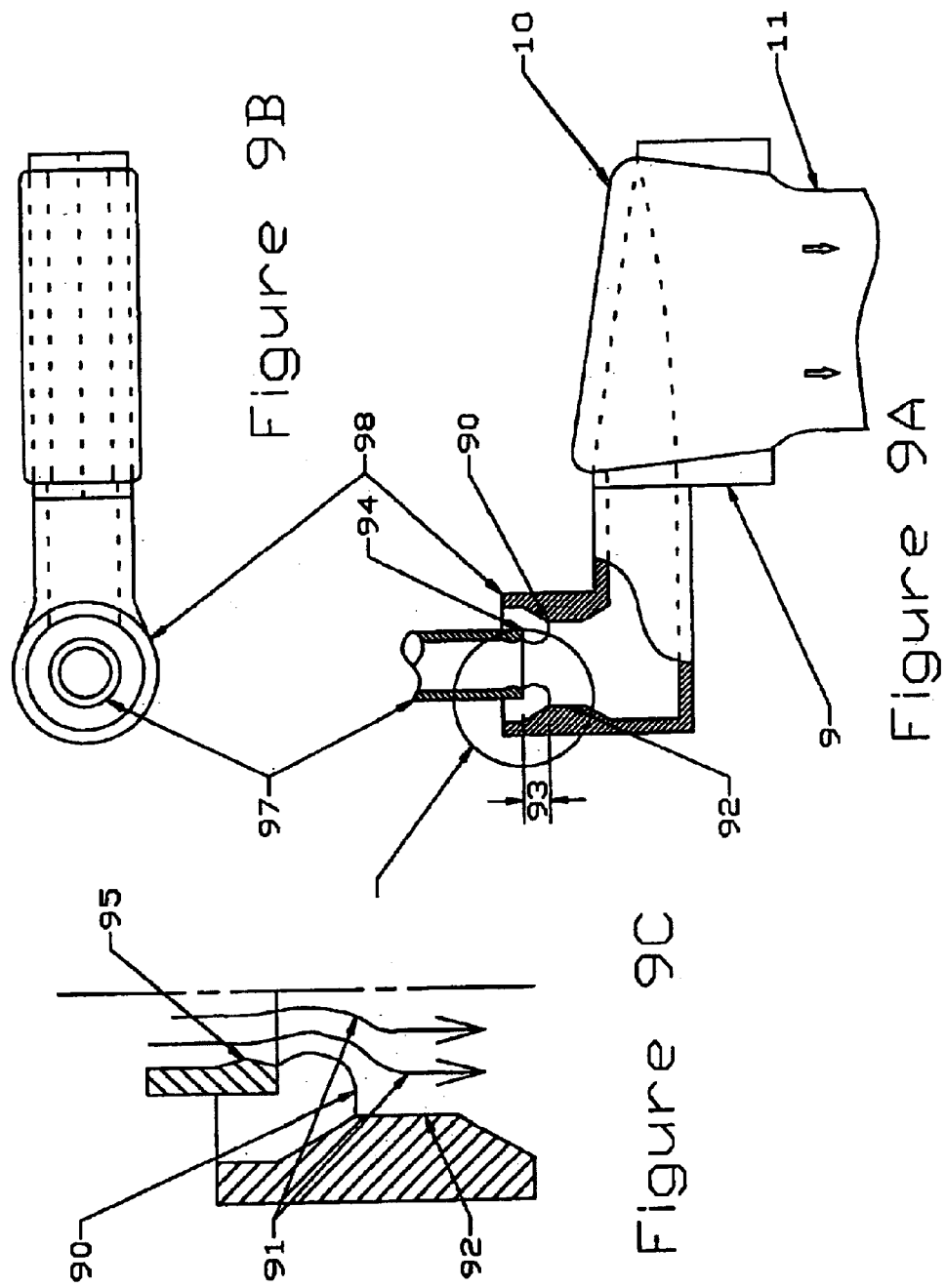

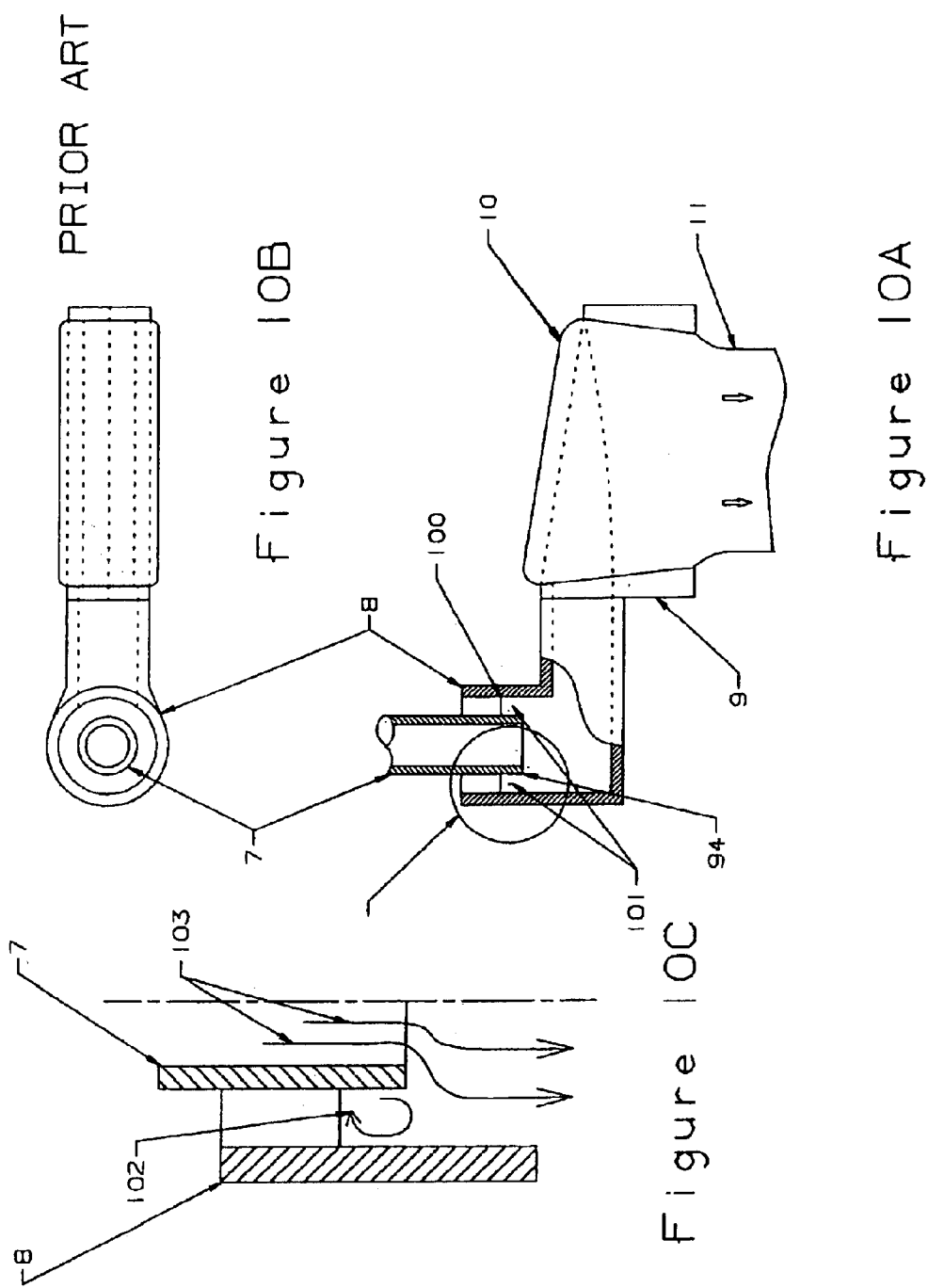

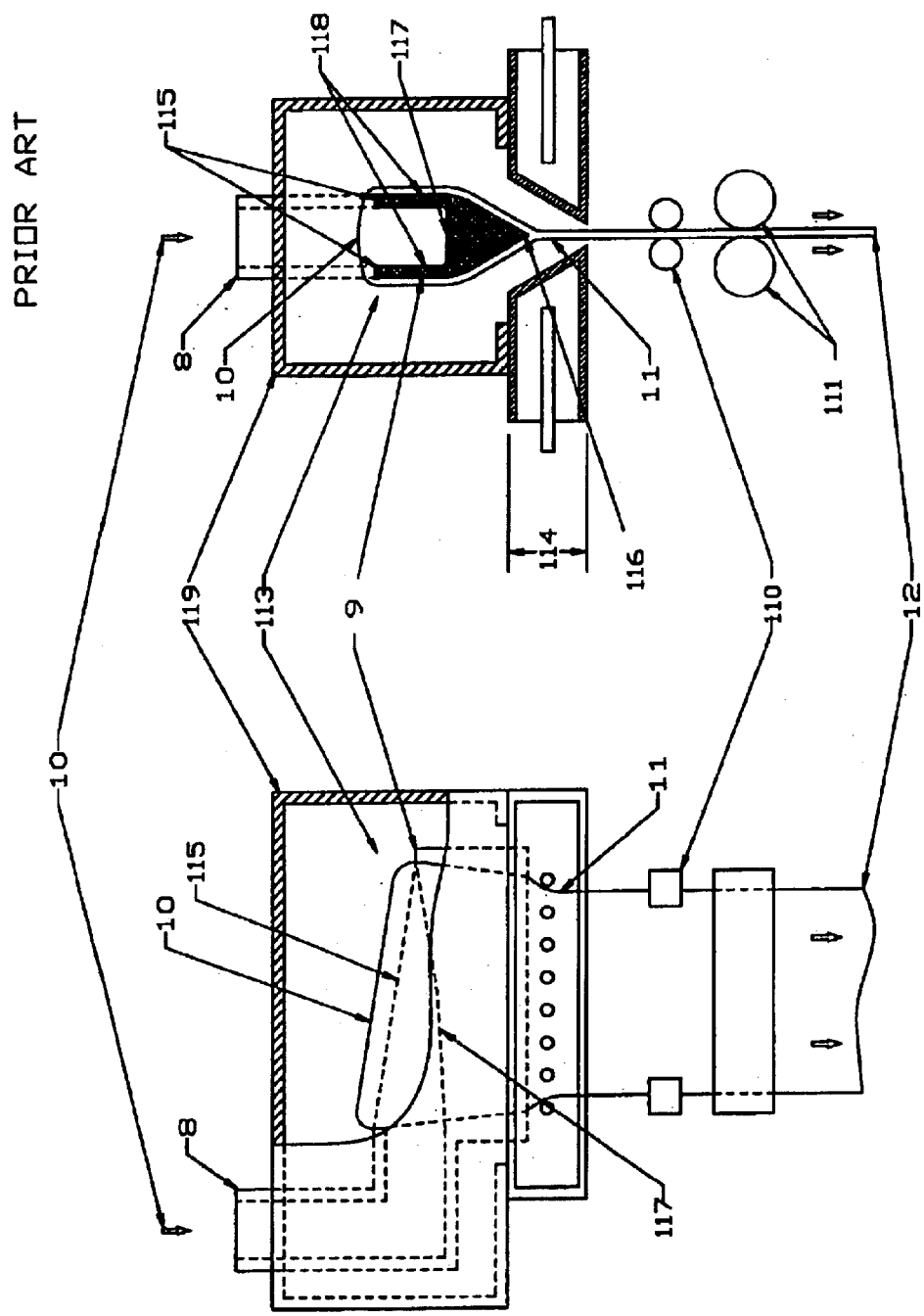

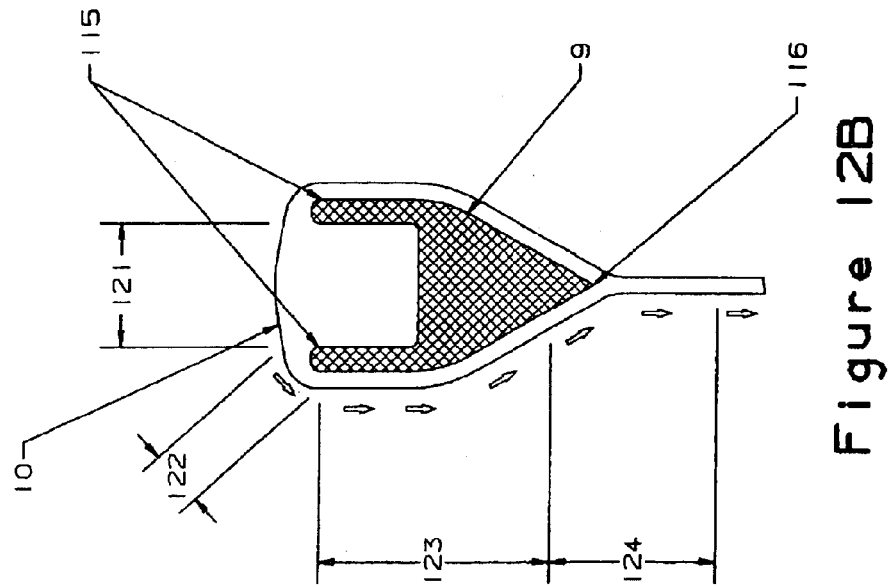
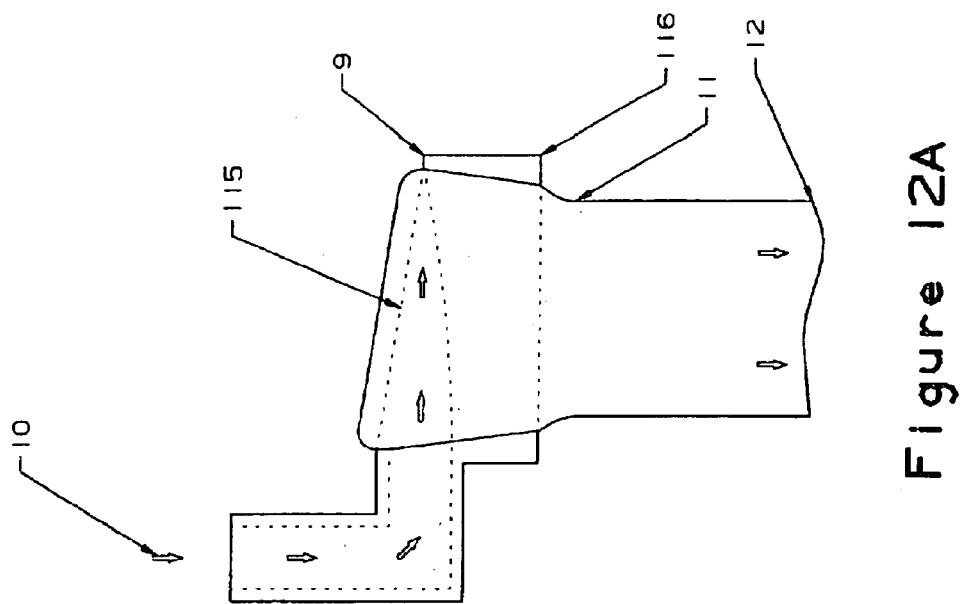

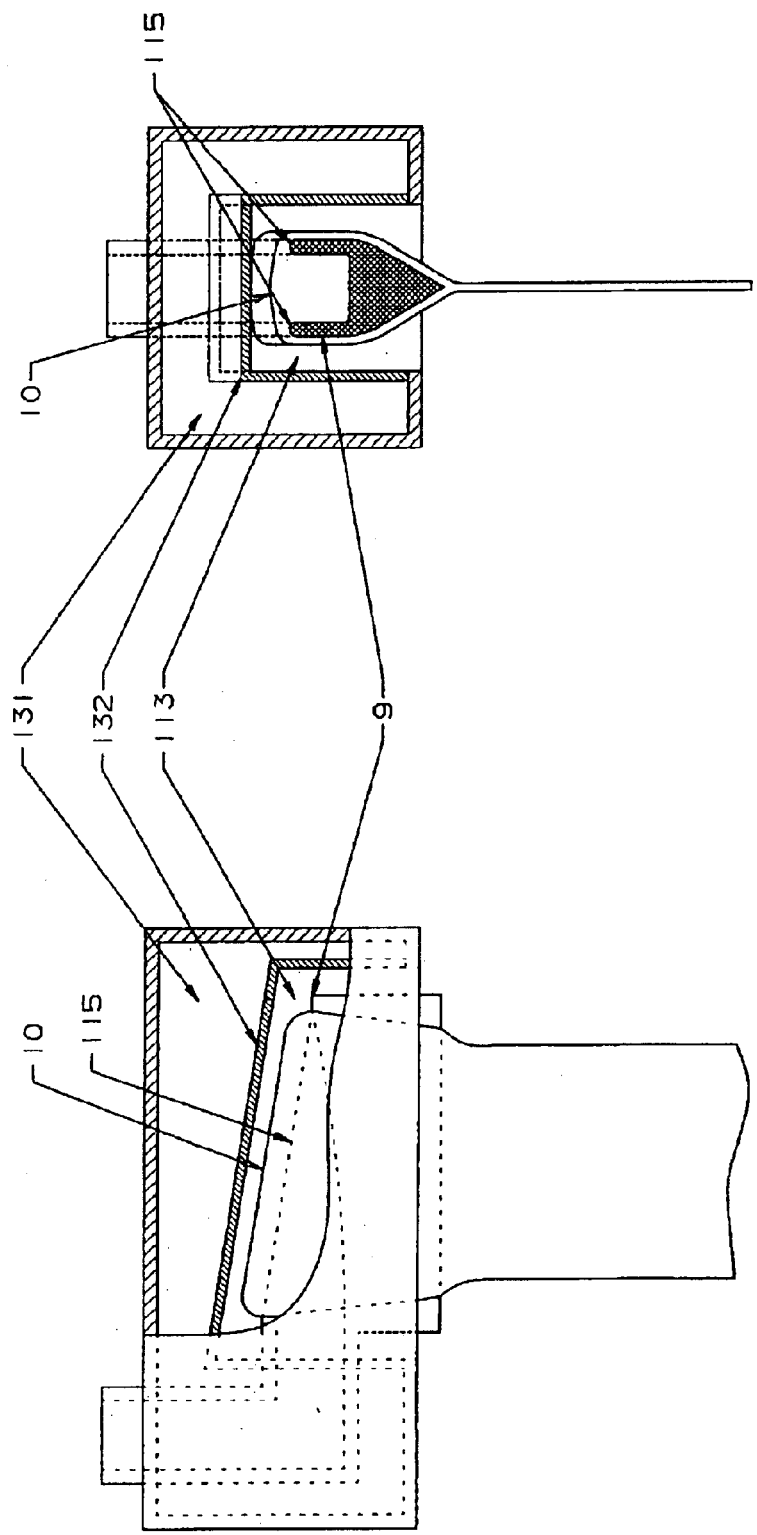

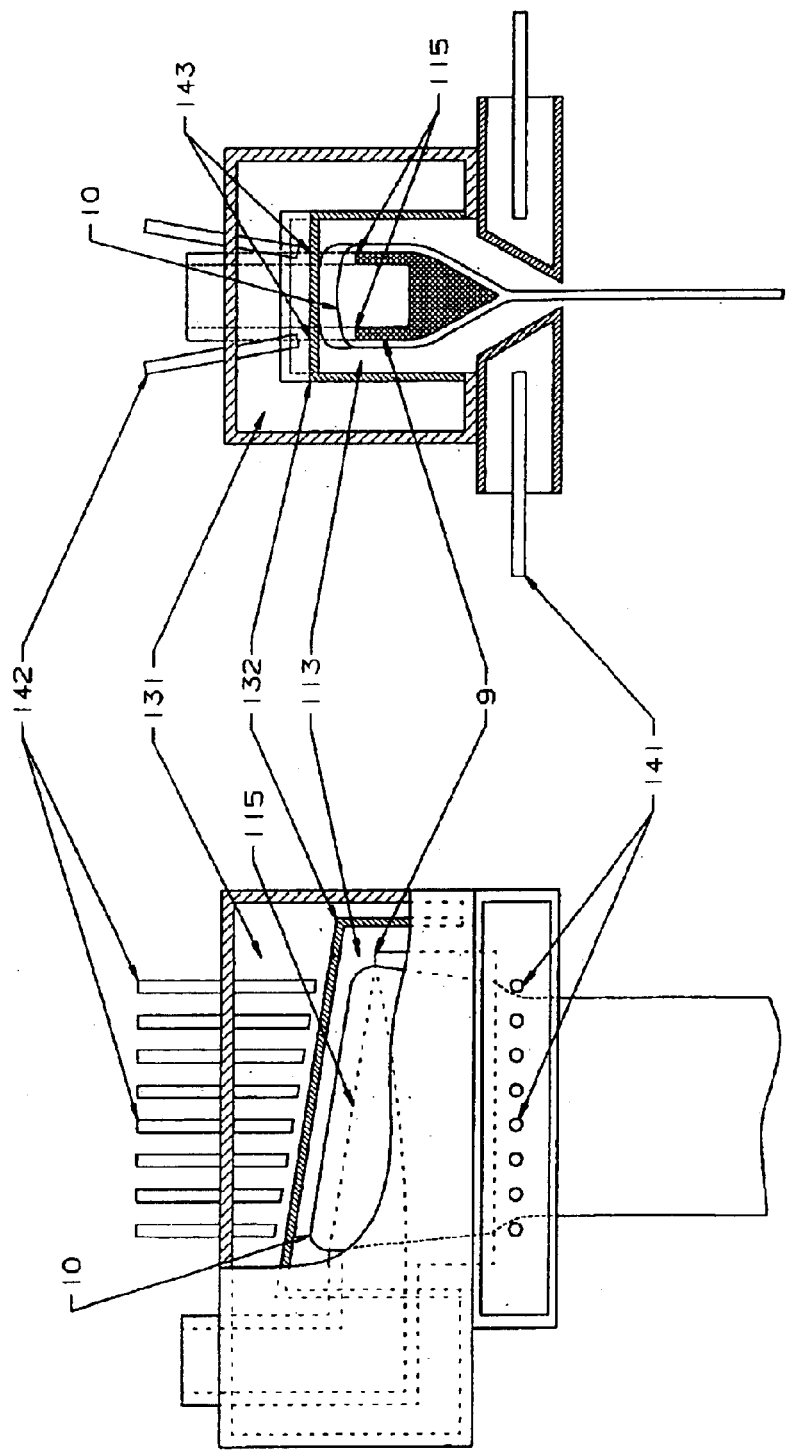

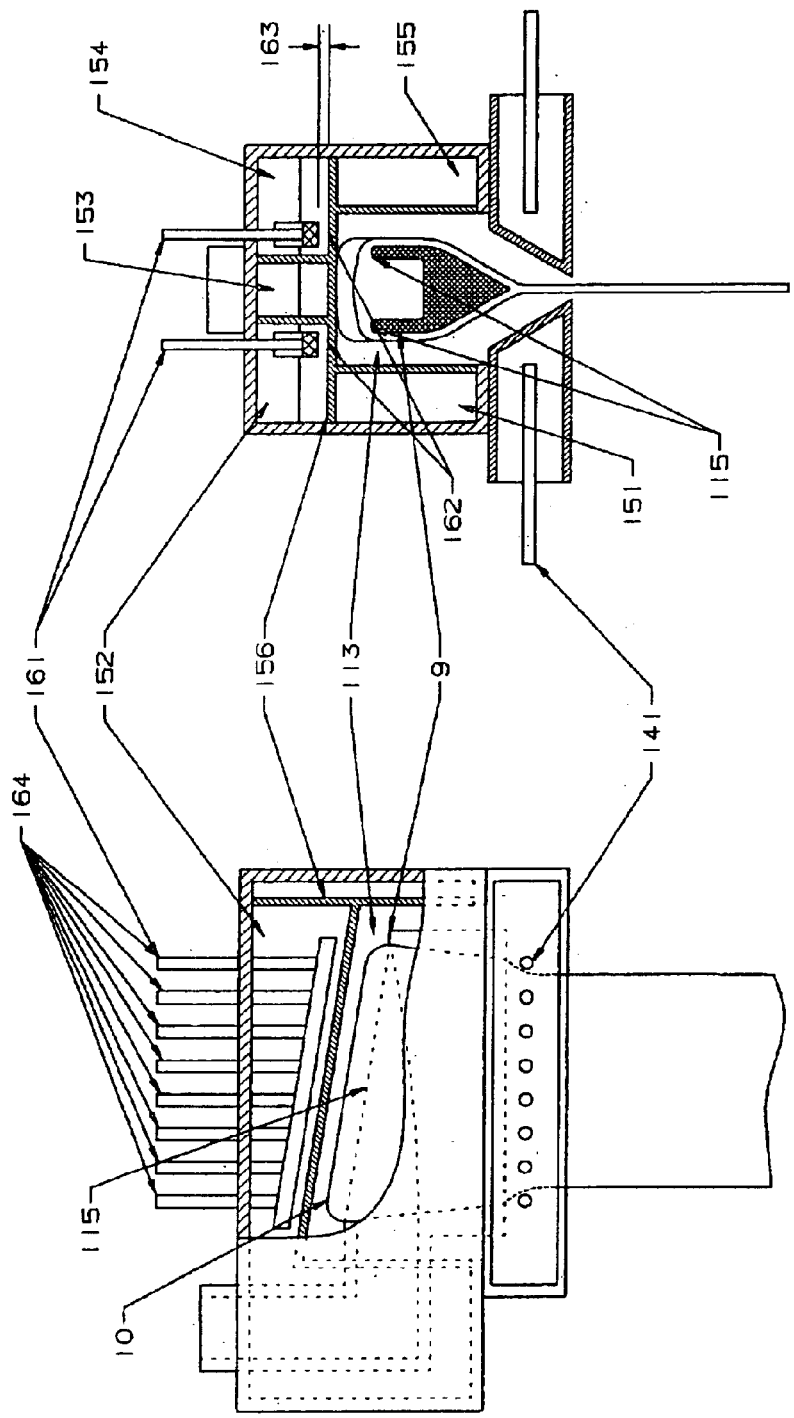

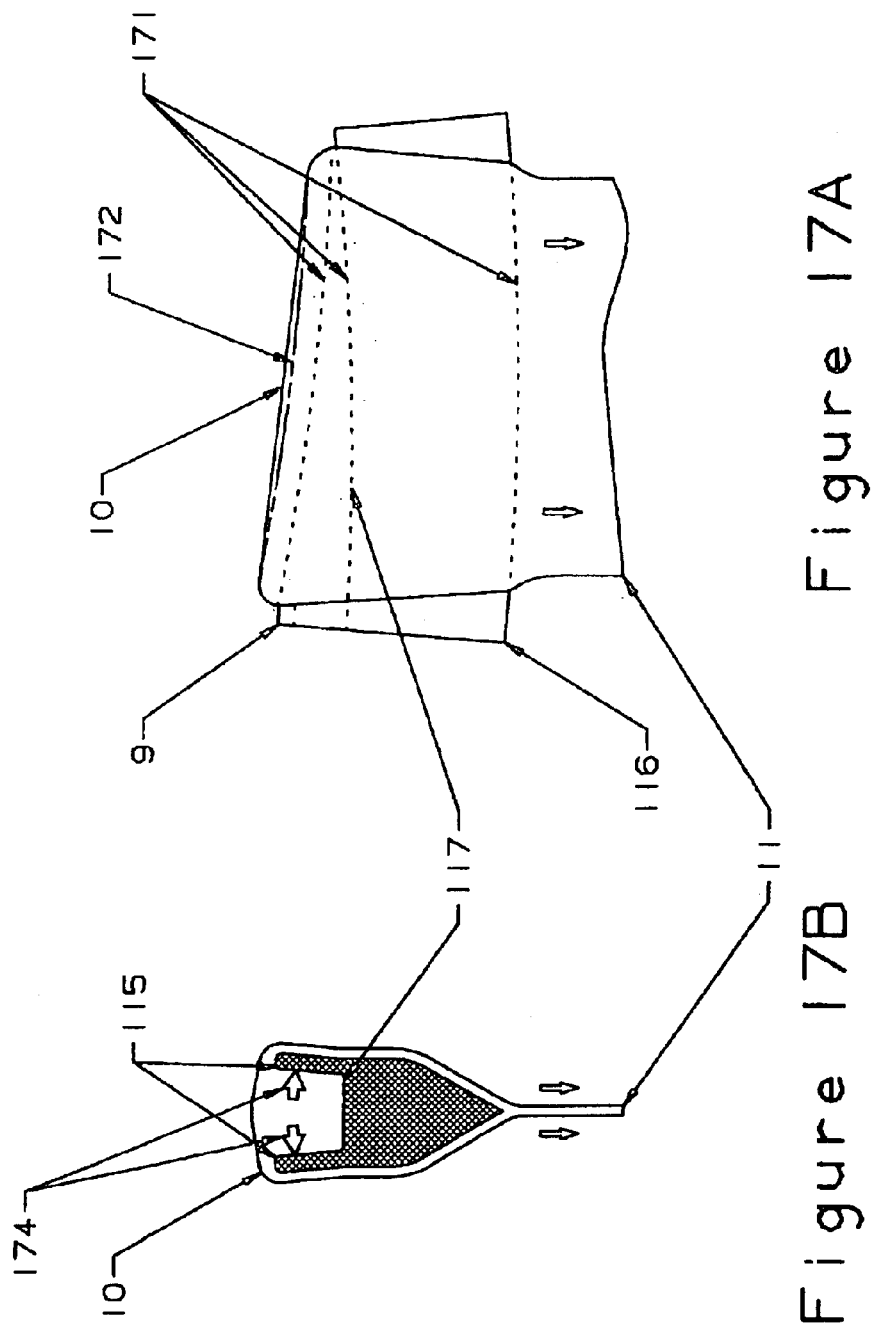

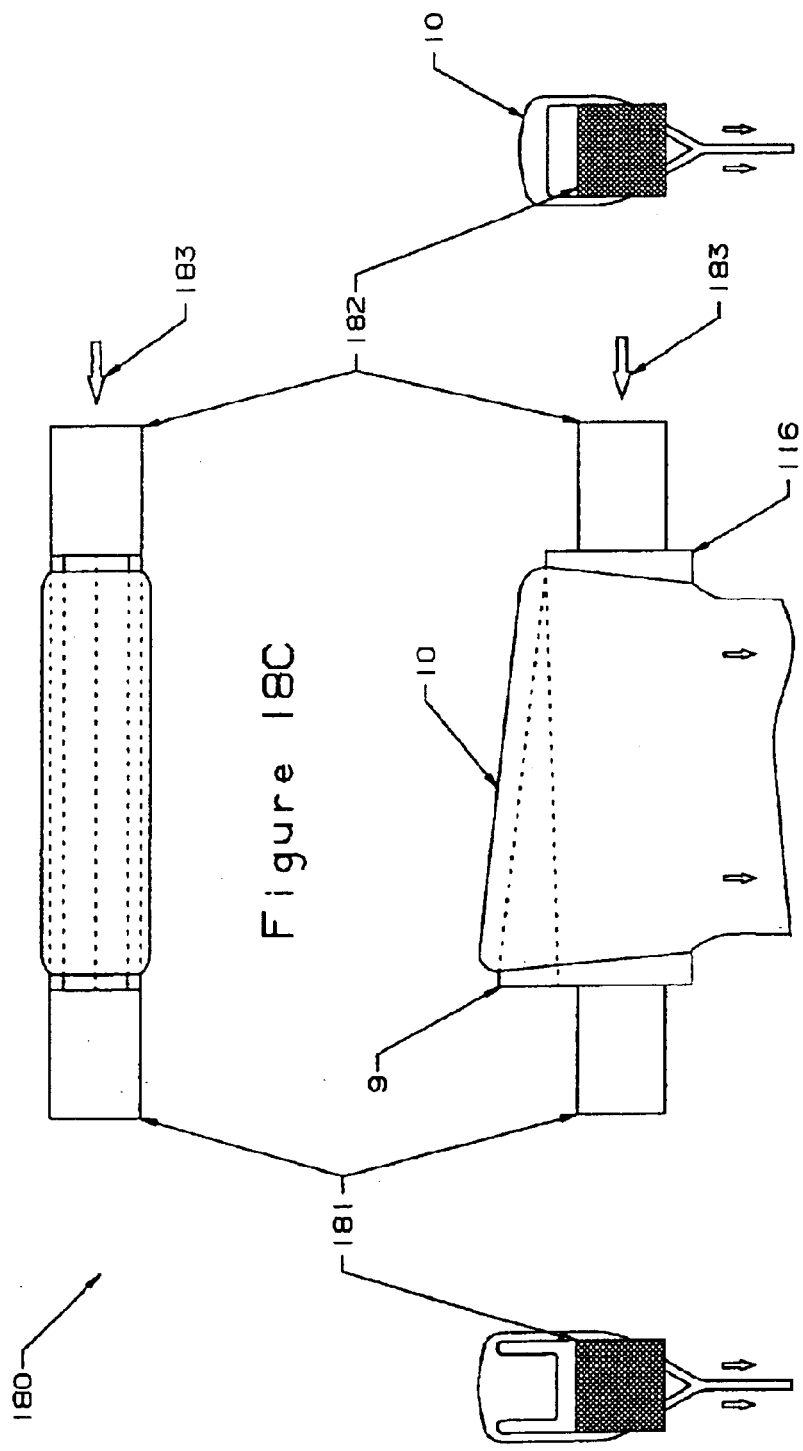

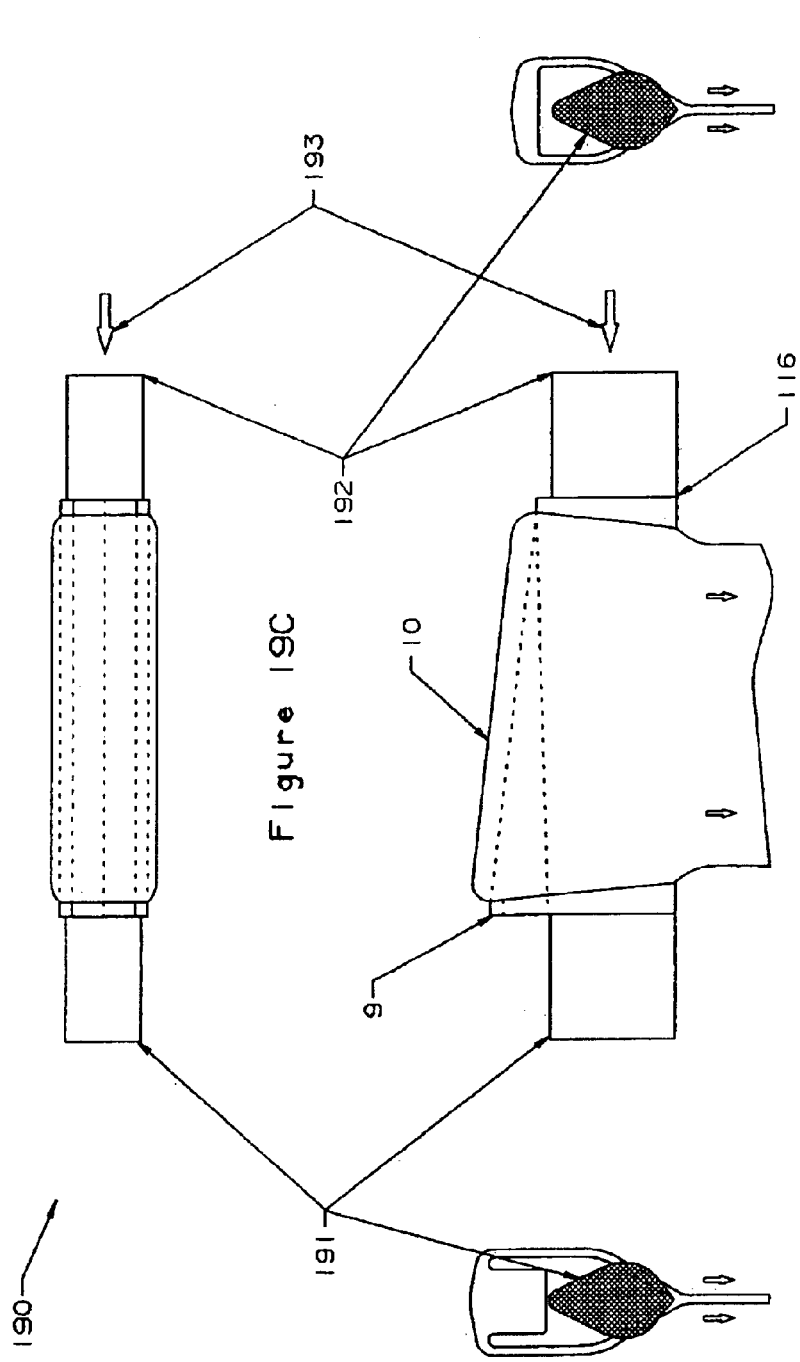

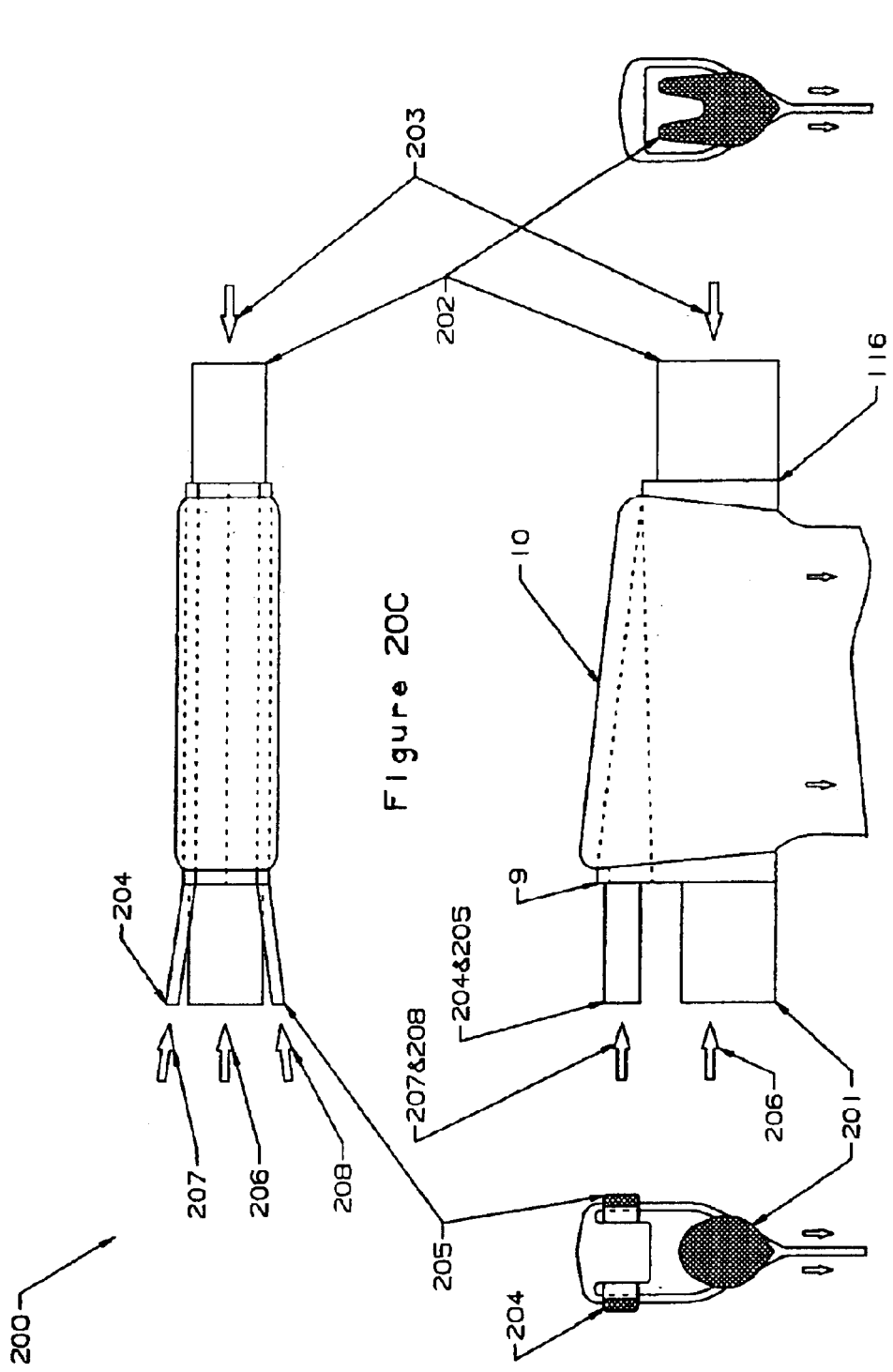

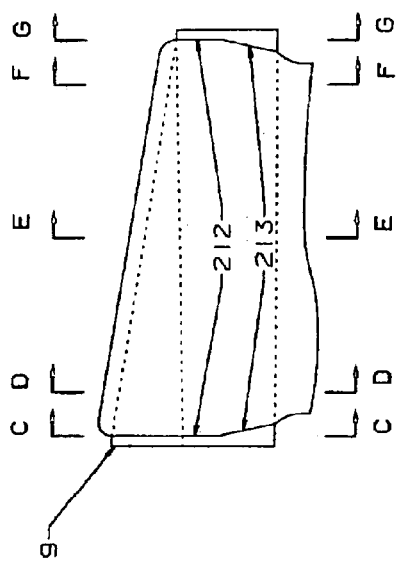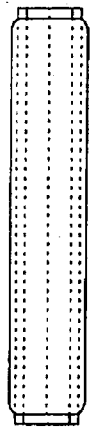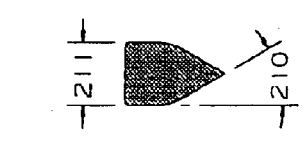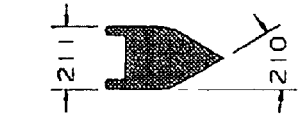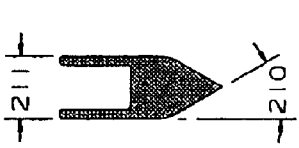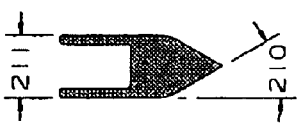
PRIOR ART
Figure 21B
Figure 21C  Figure 21D  Figure 21E  Figure 21F  Figure 21G
Figure 21A

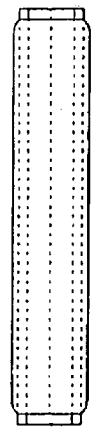
Figure 22B
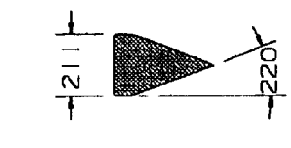
Figure 22C
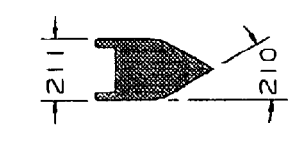
Figure 22D
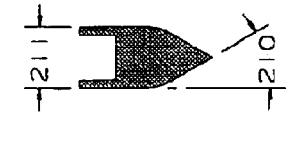
Figure 22E
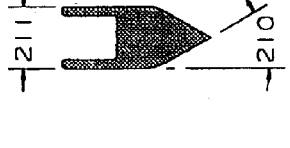
Figure 22F
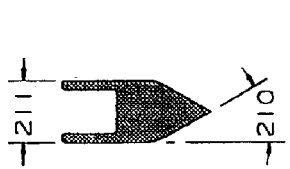
Figure 22G
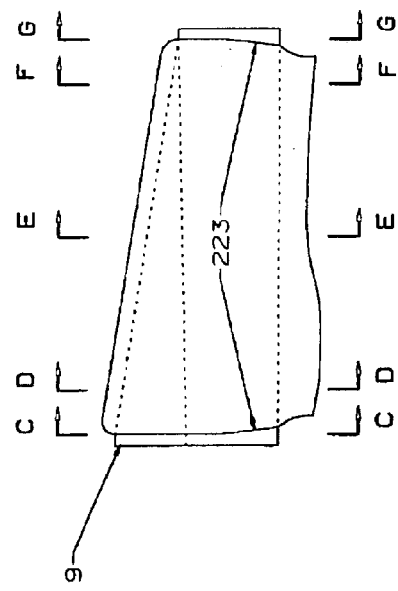
Figure 22A
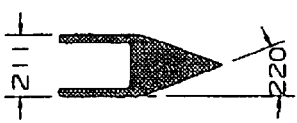

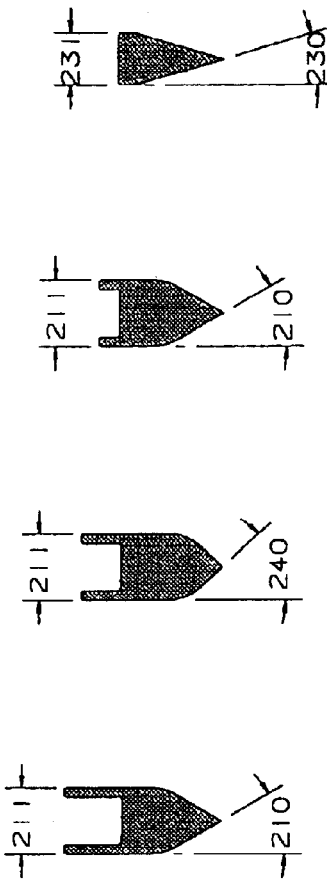
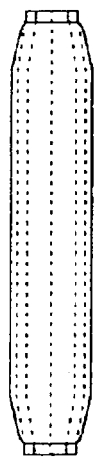
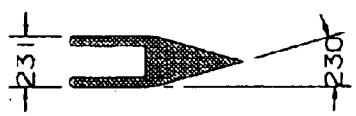
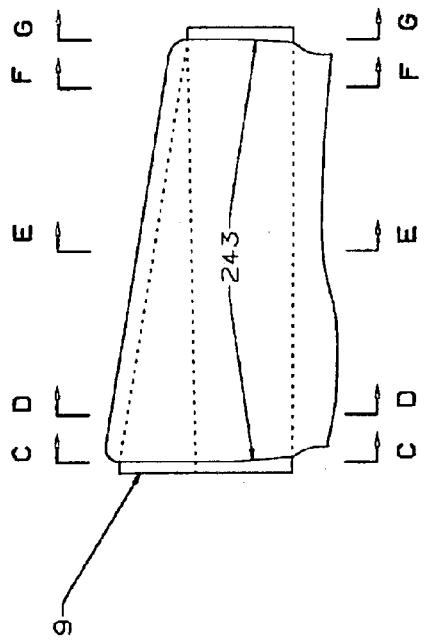
Figure 24G
Figure 24F
Figure 24E
Figure 24D
Figure 24C
Figure 24B
Figure 24A

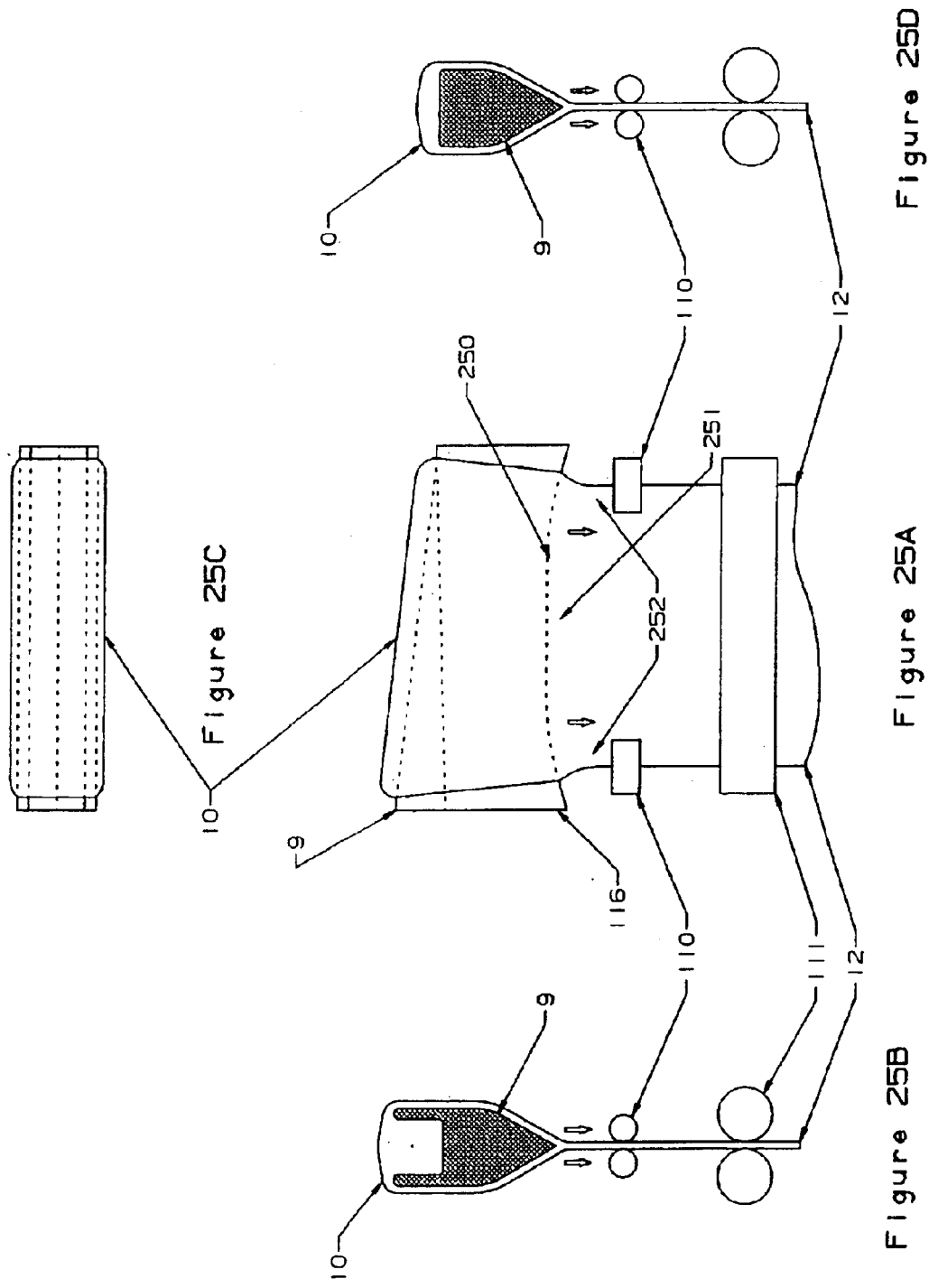

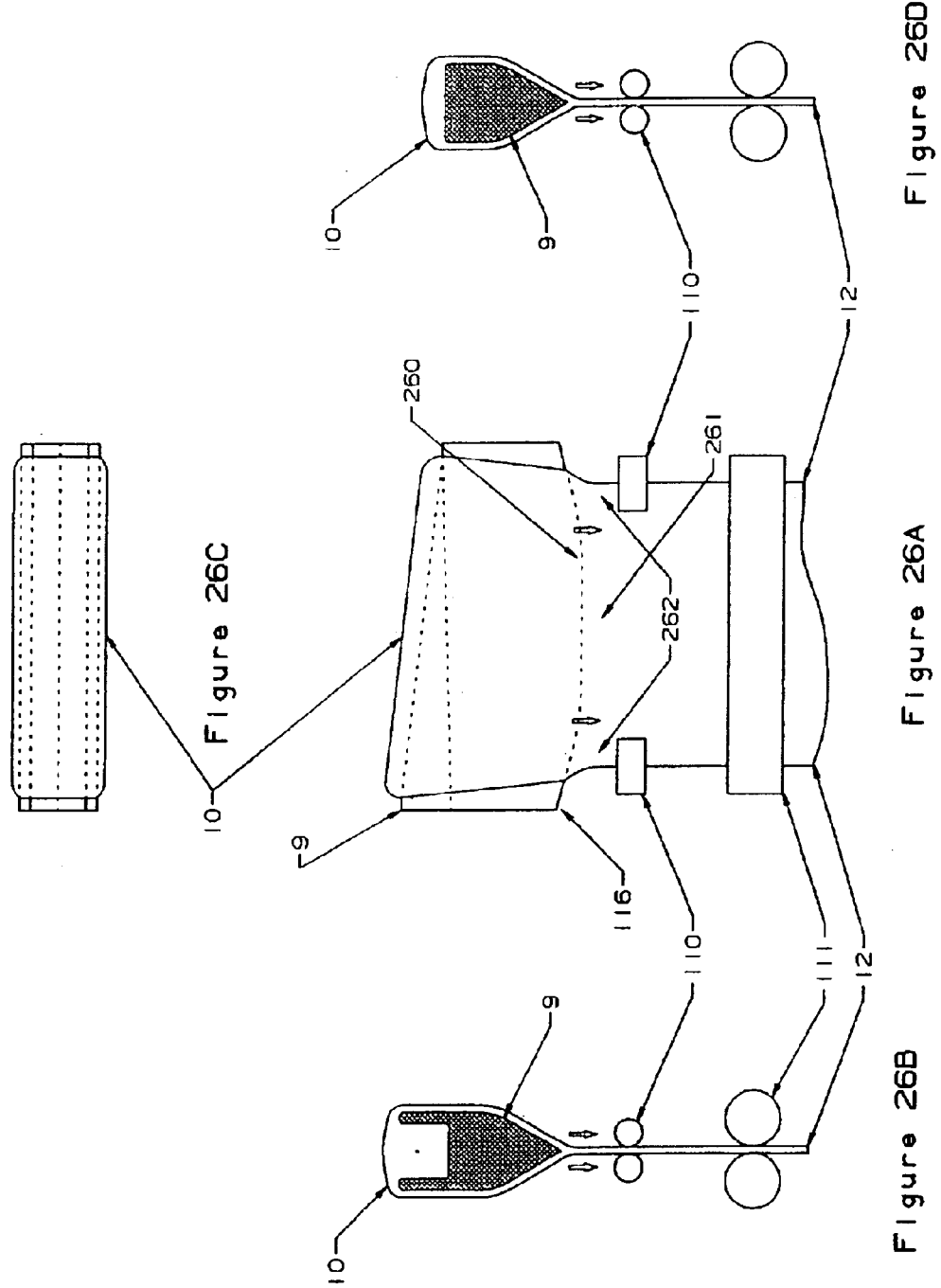

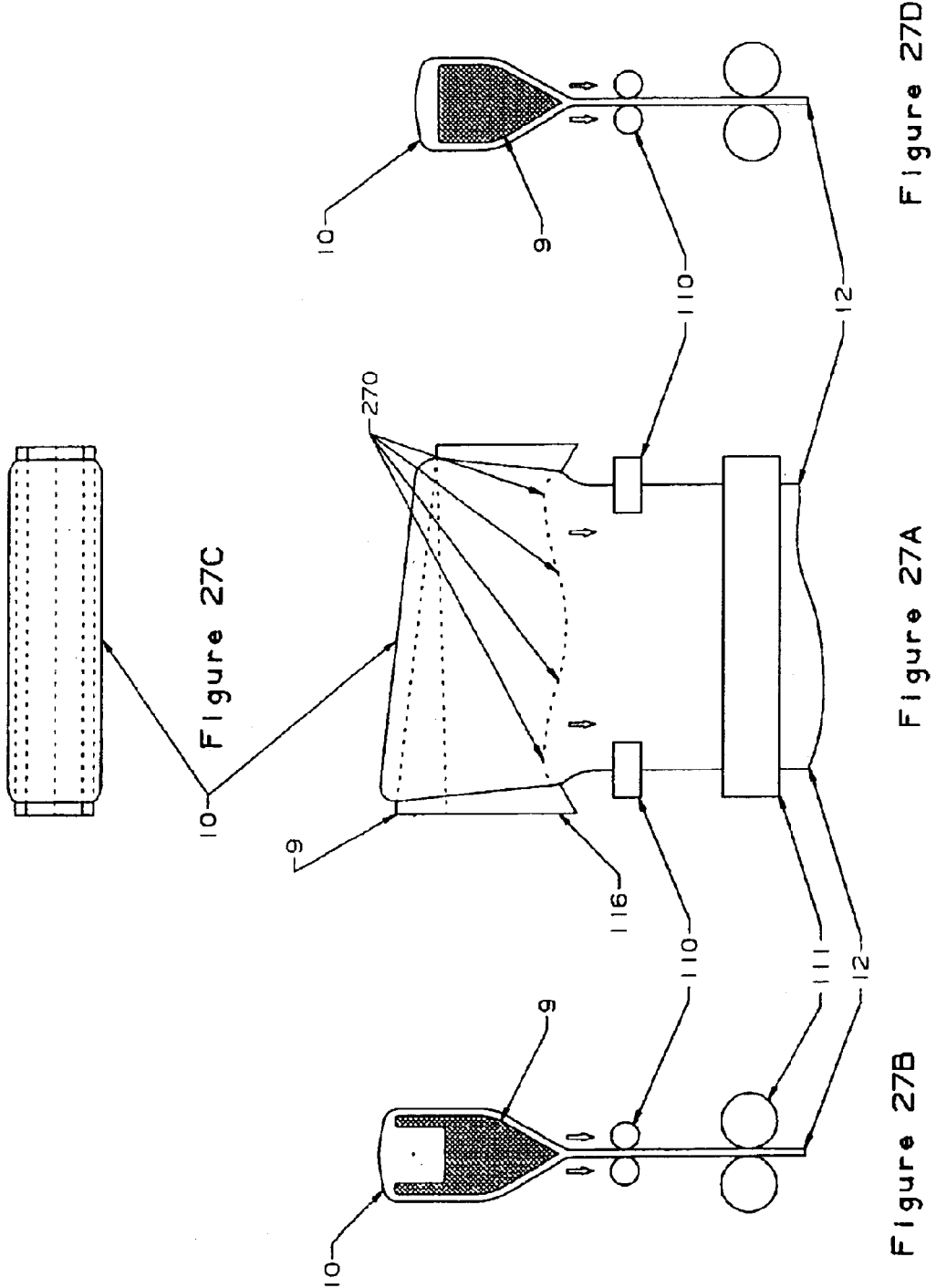

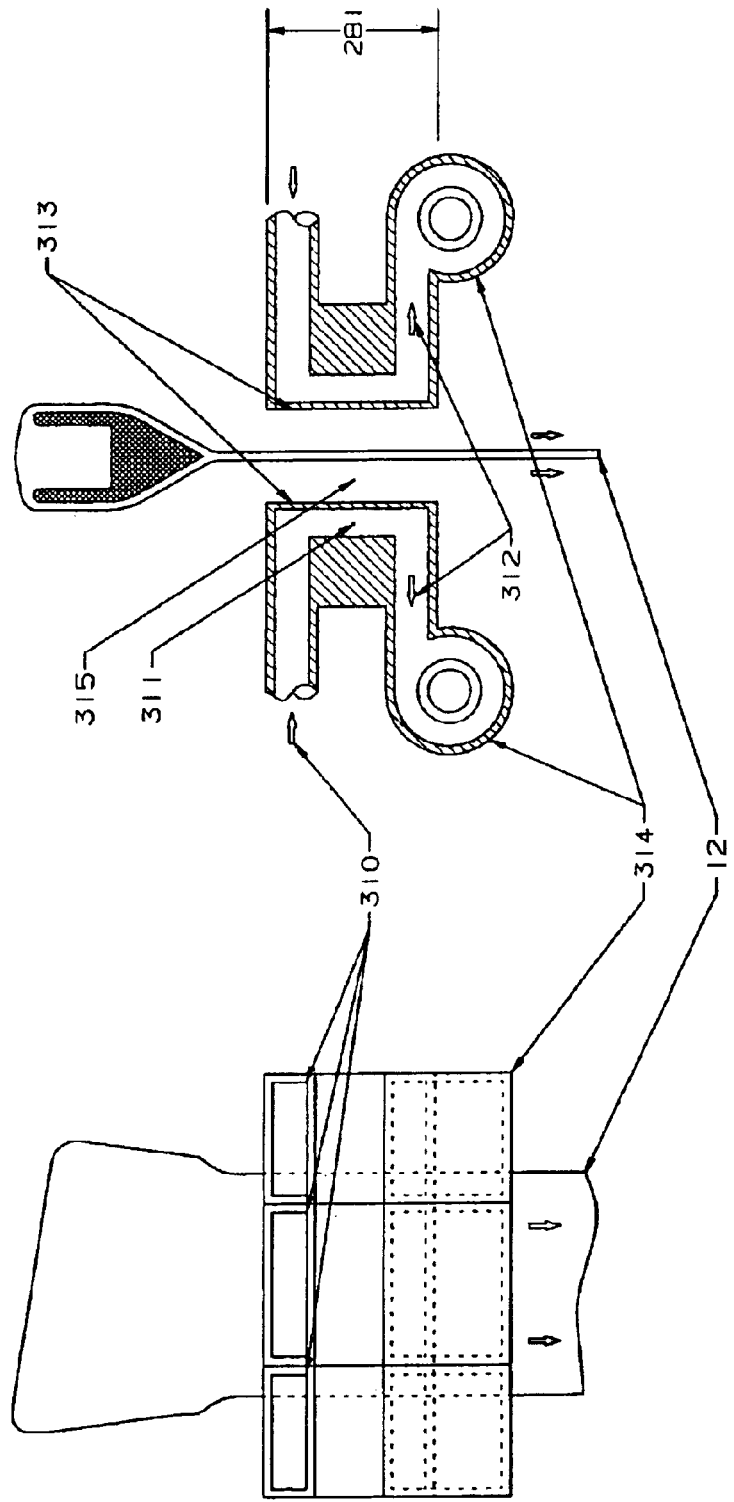

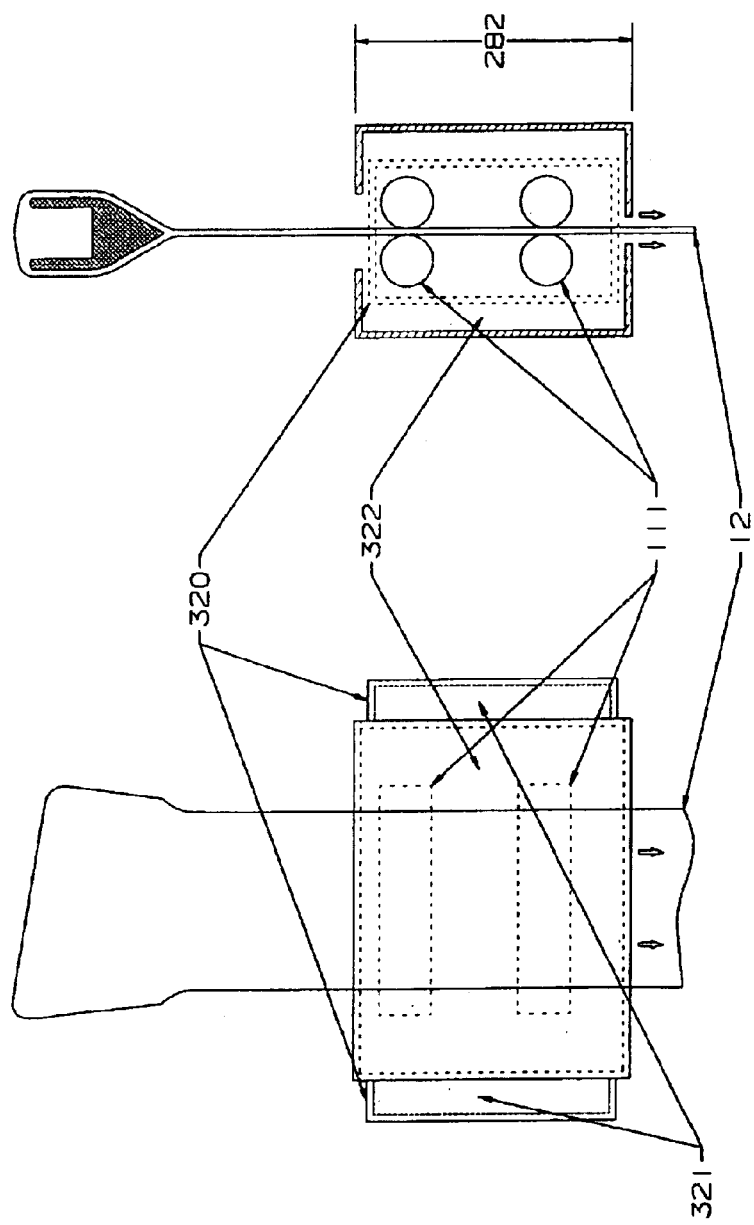

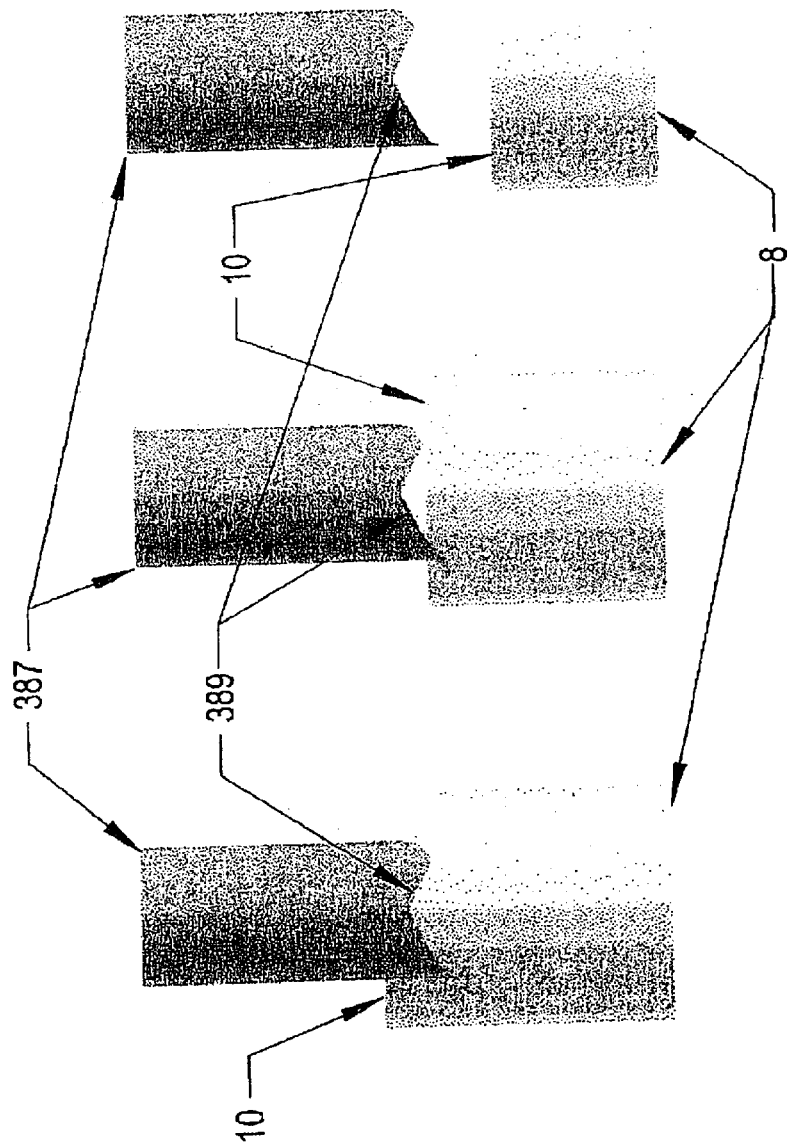

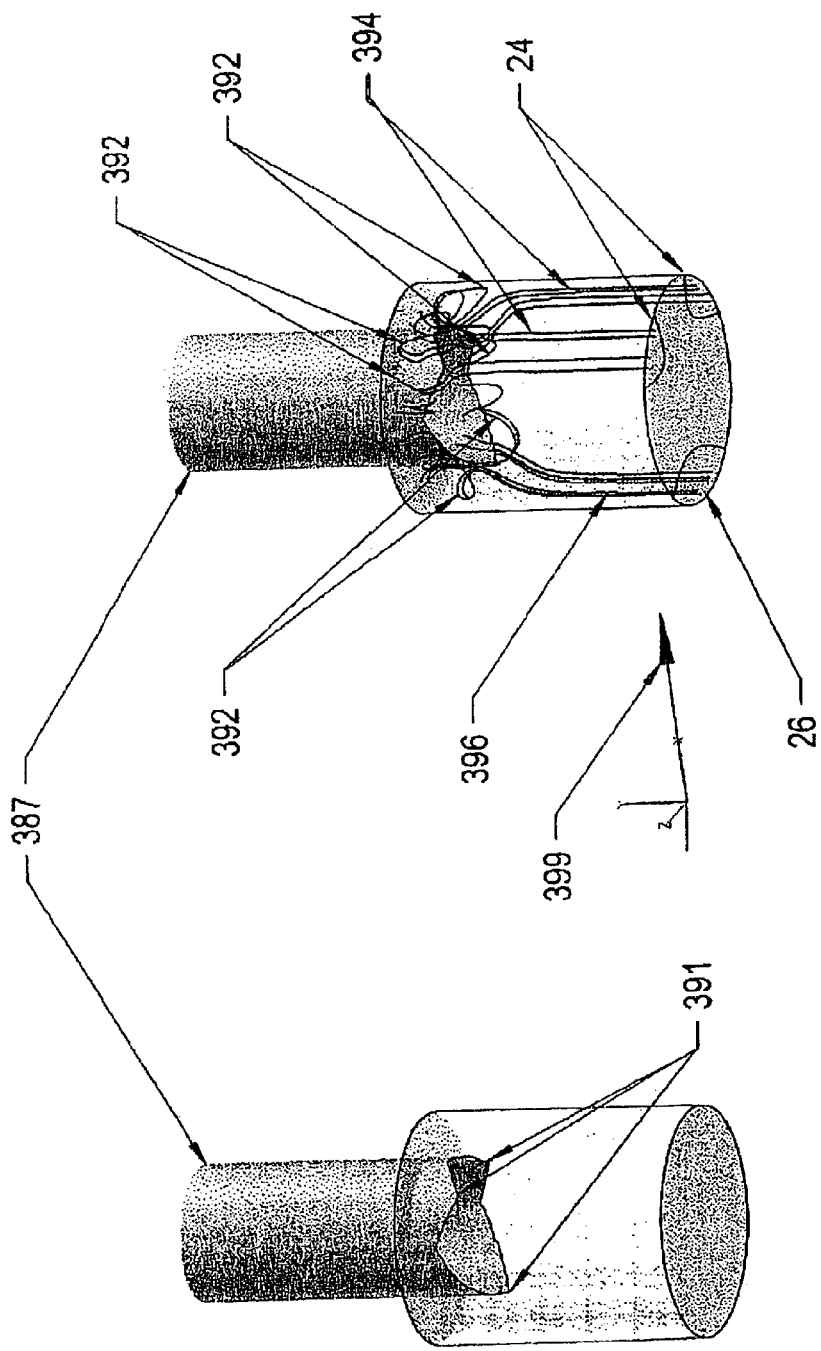

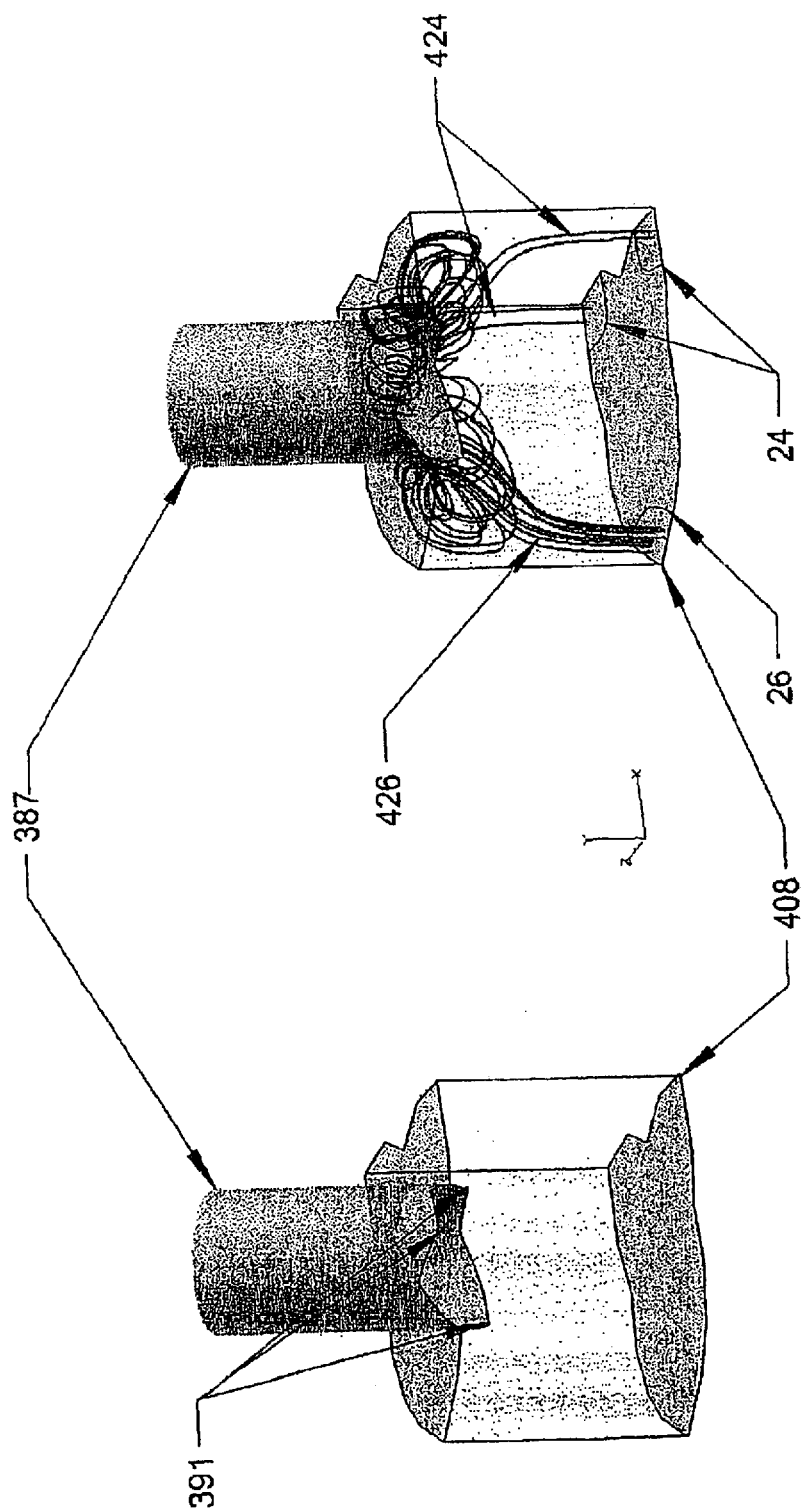

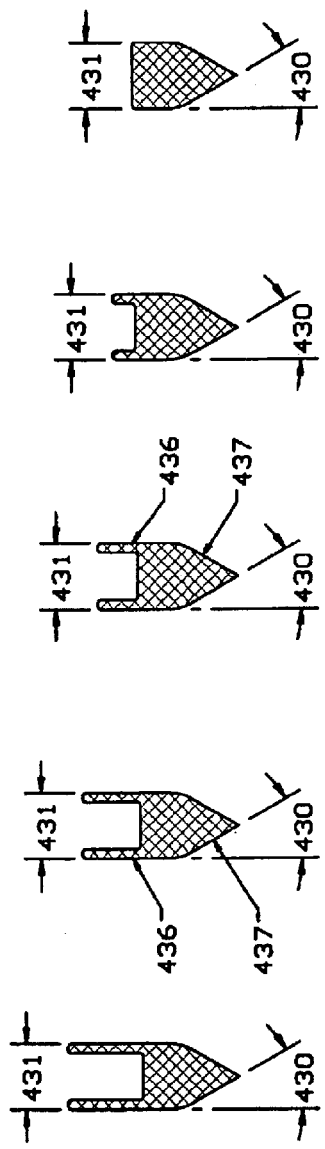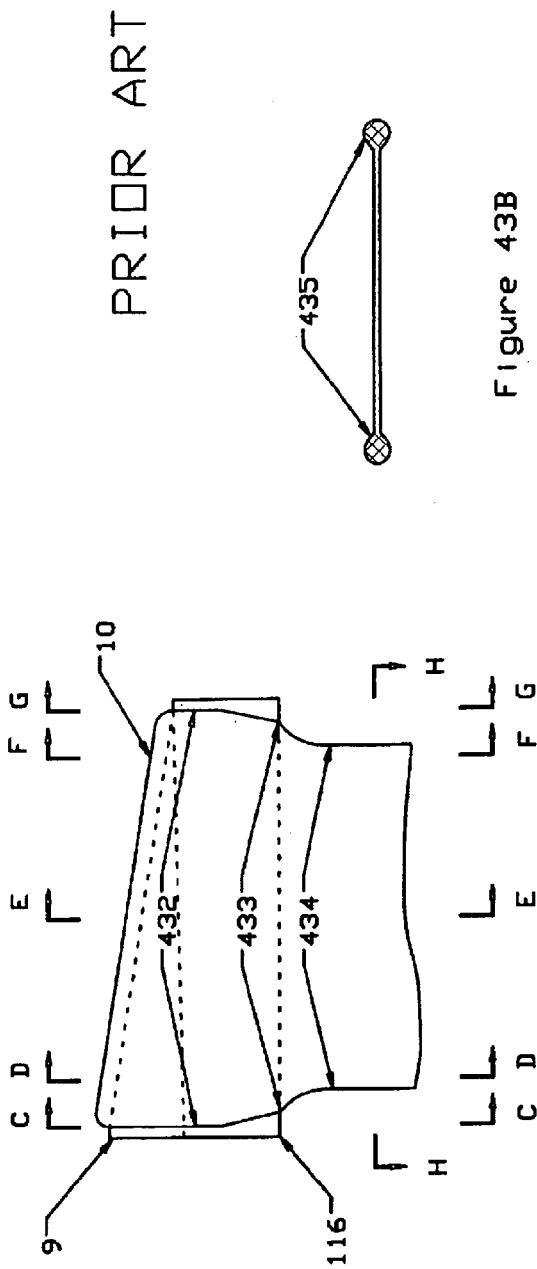

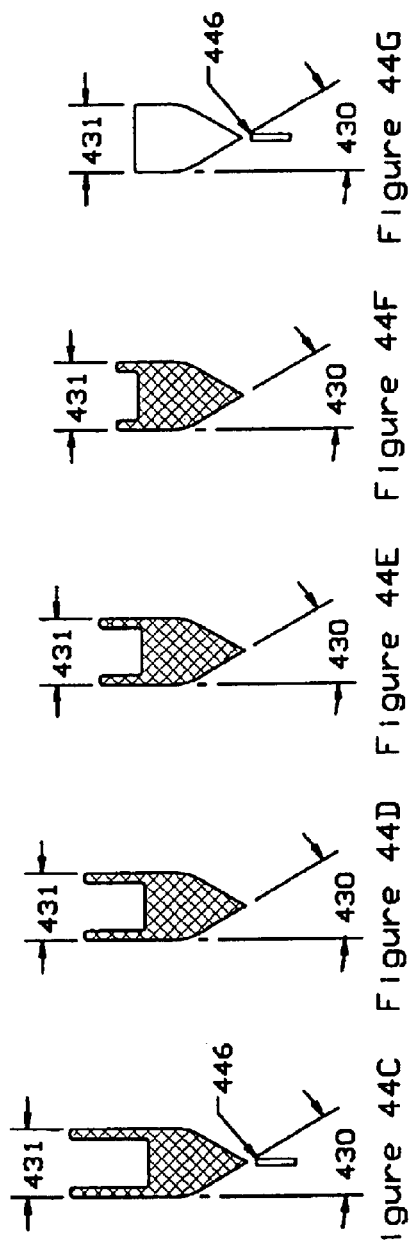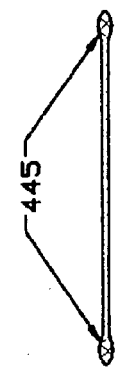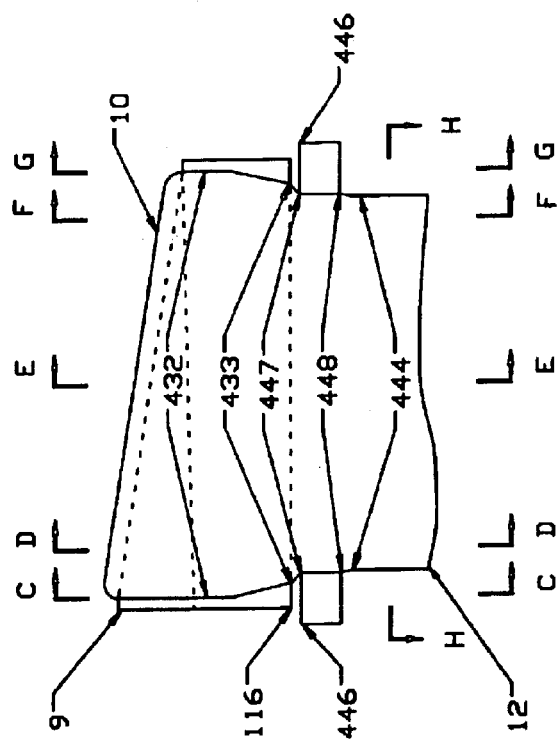

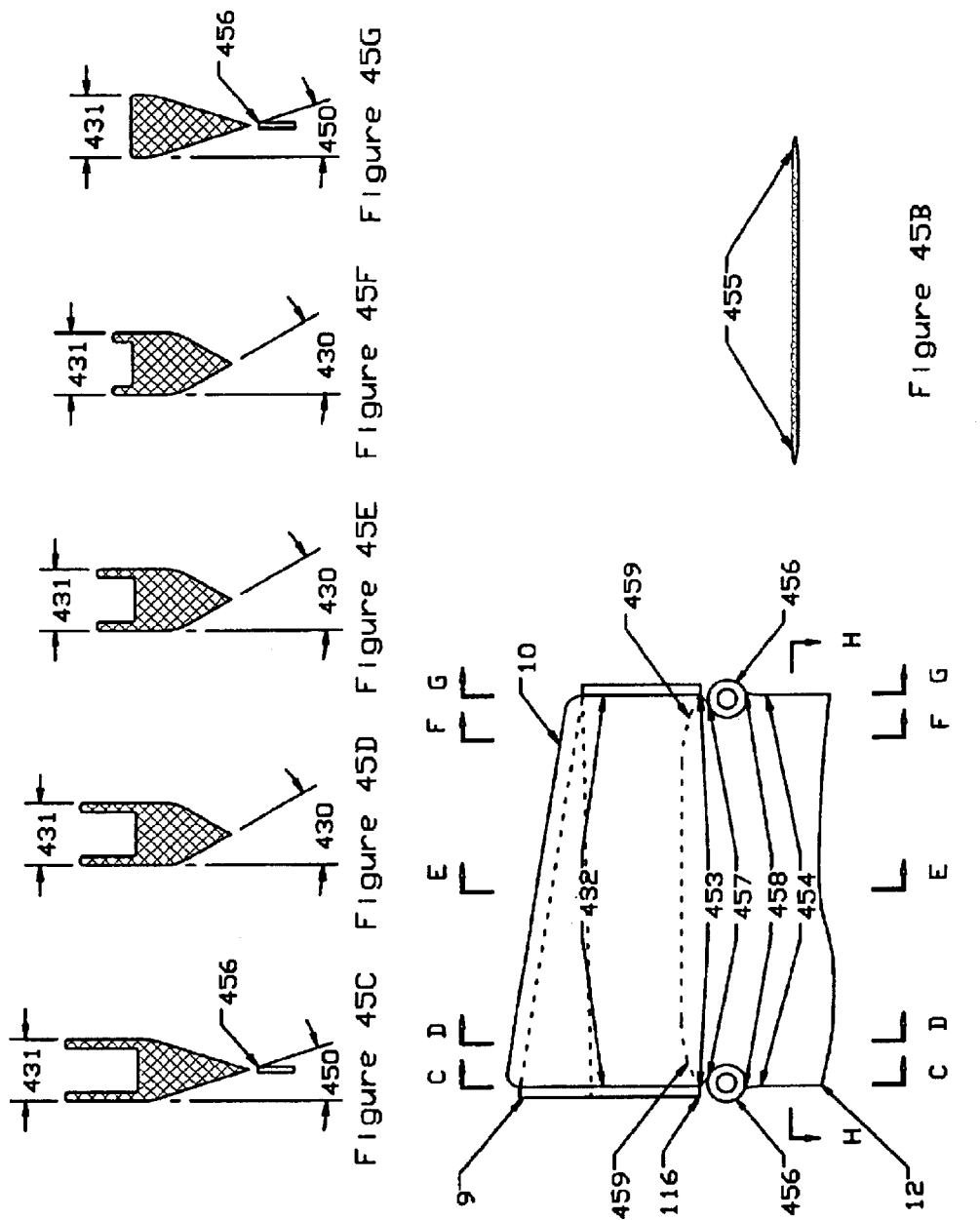

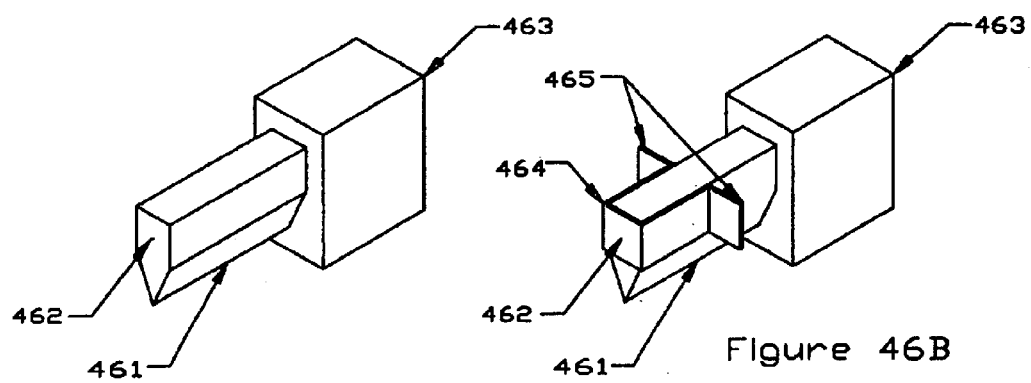
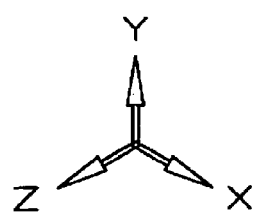
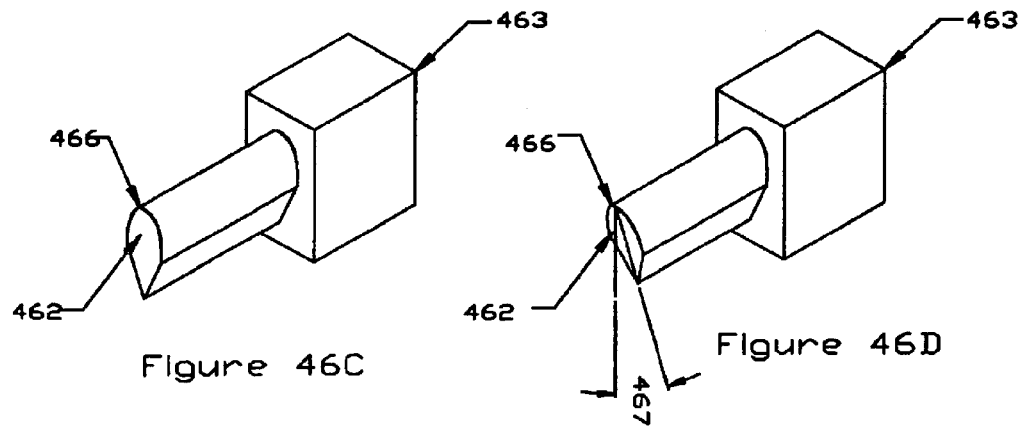

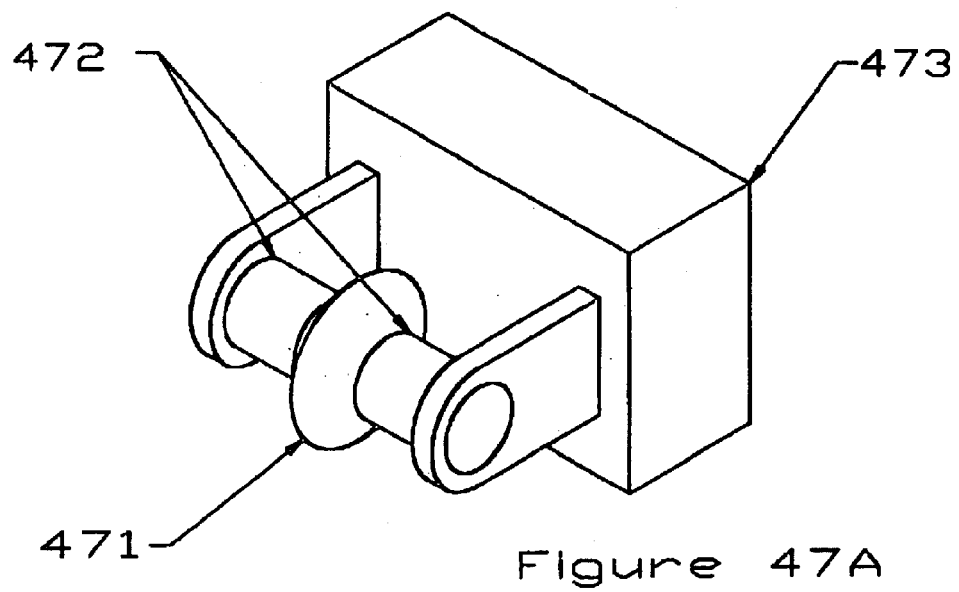
Figure 47A
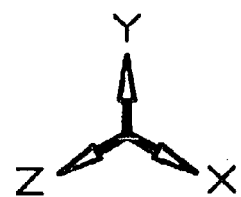
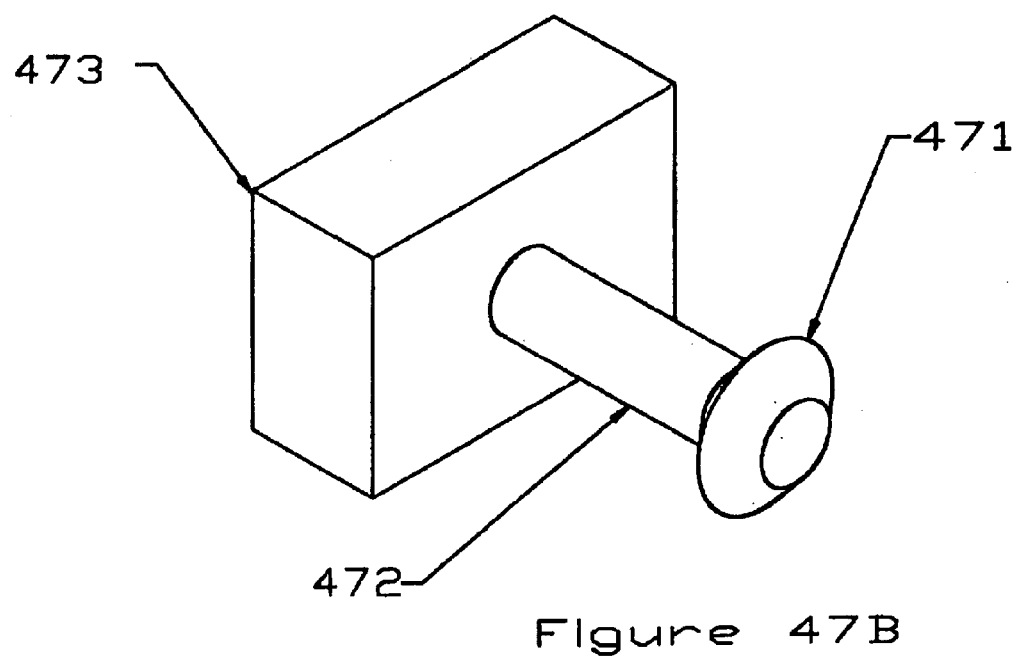
Figure 47B

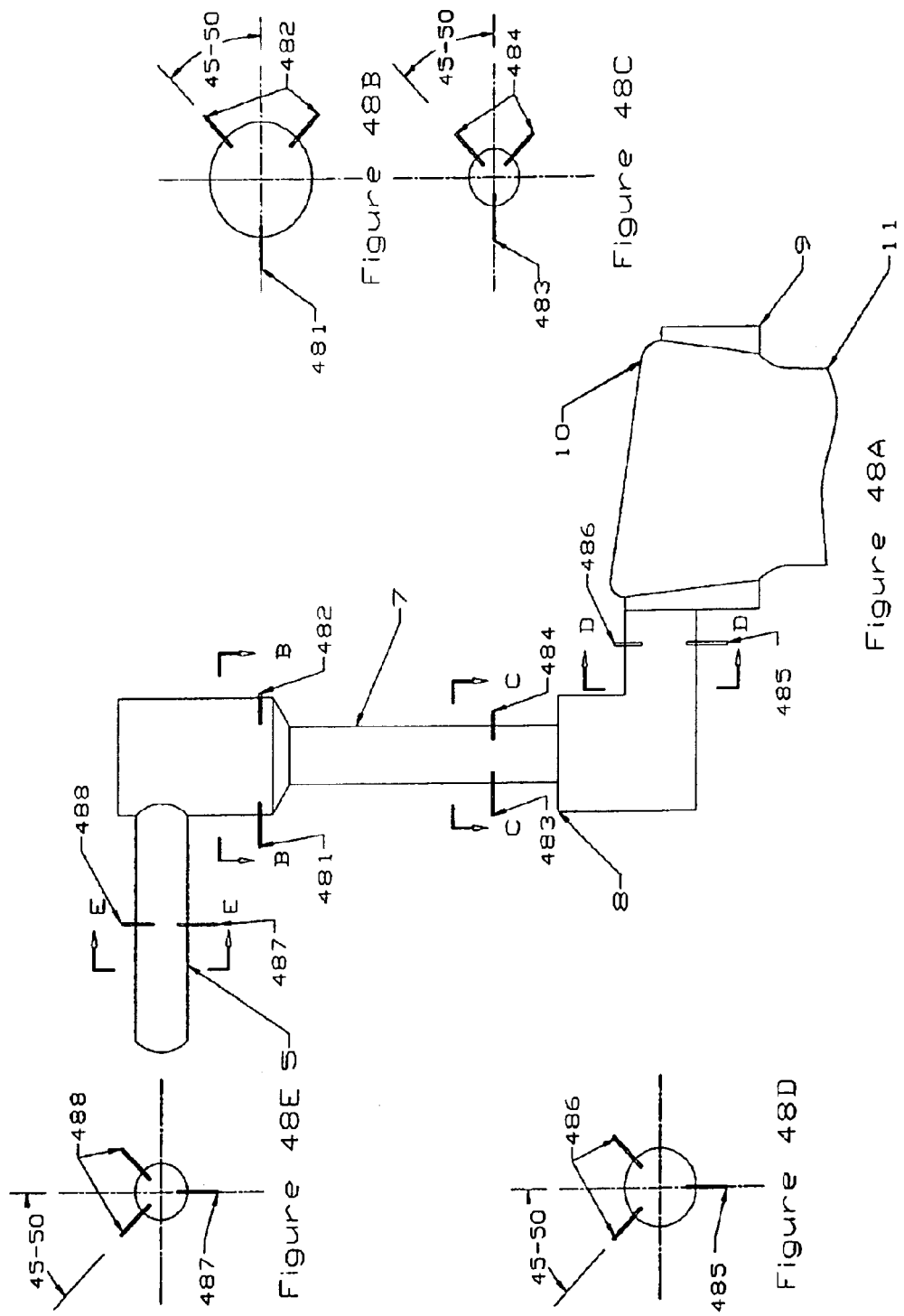

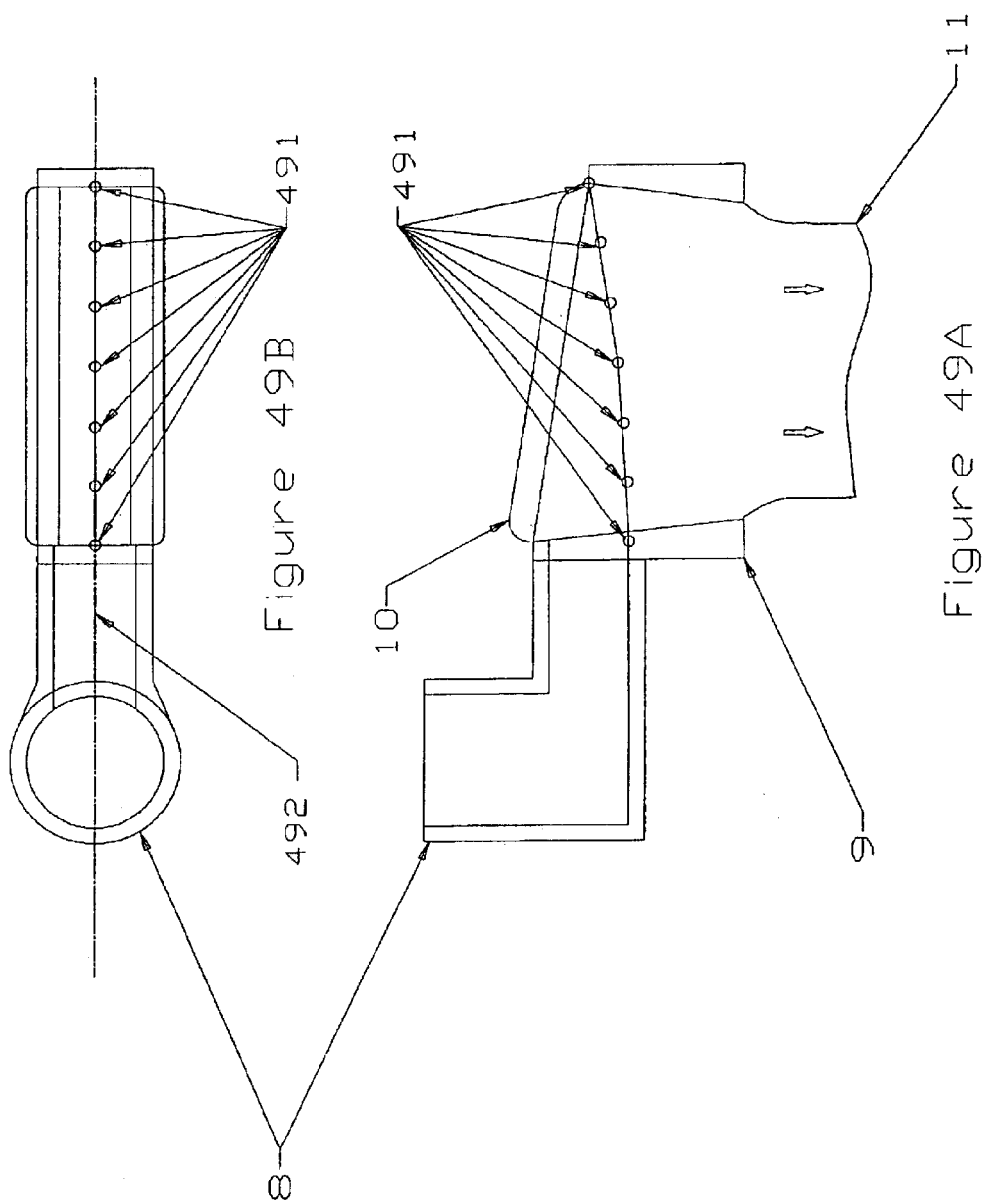

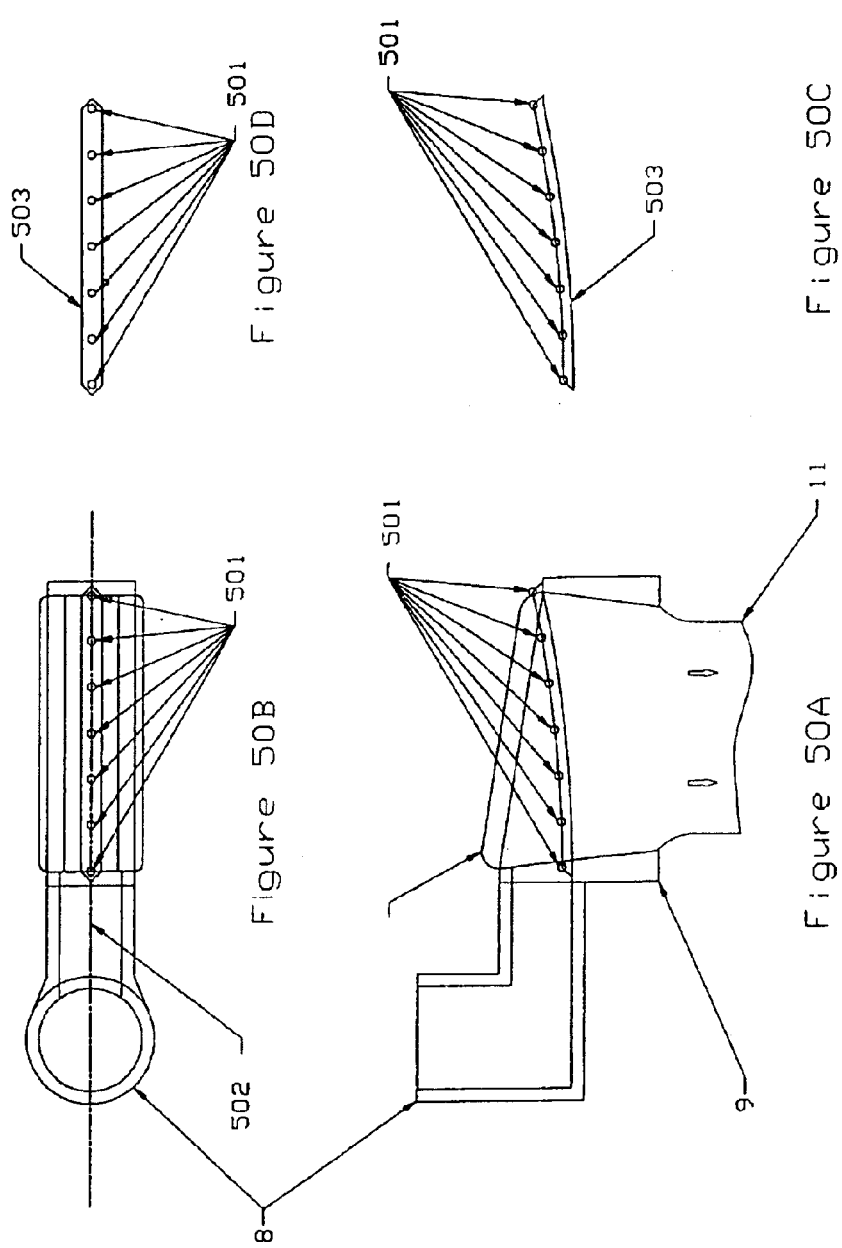

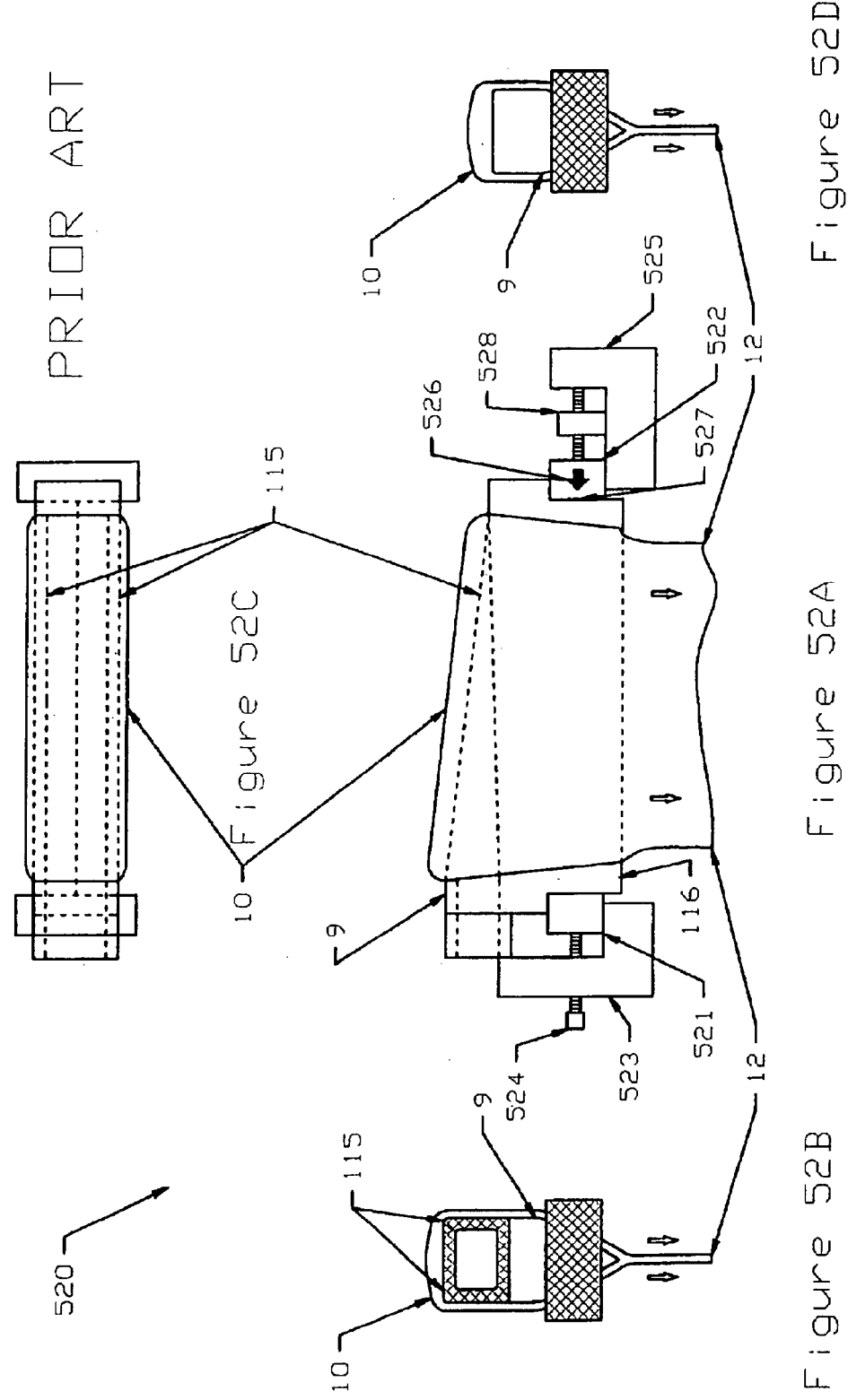

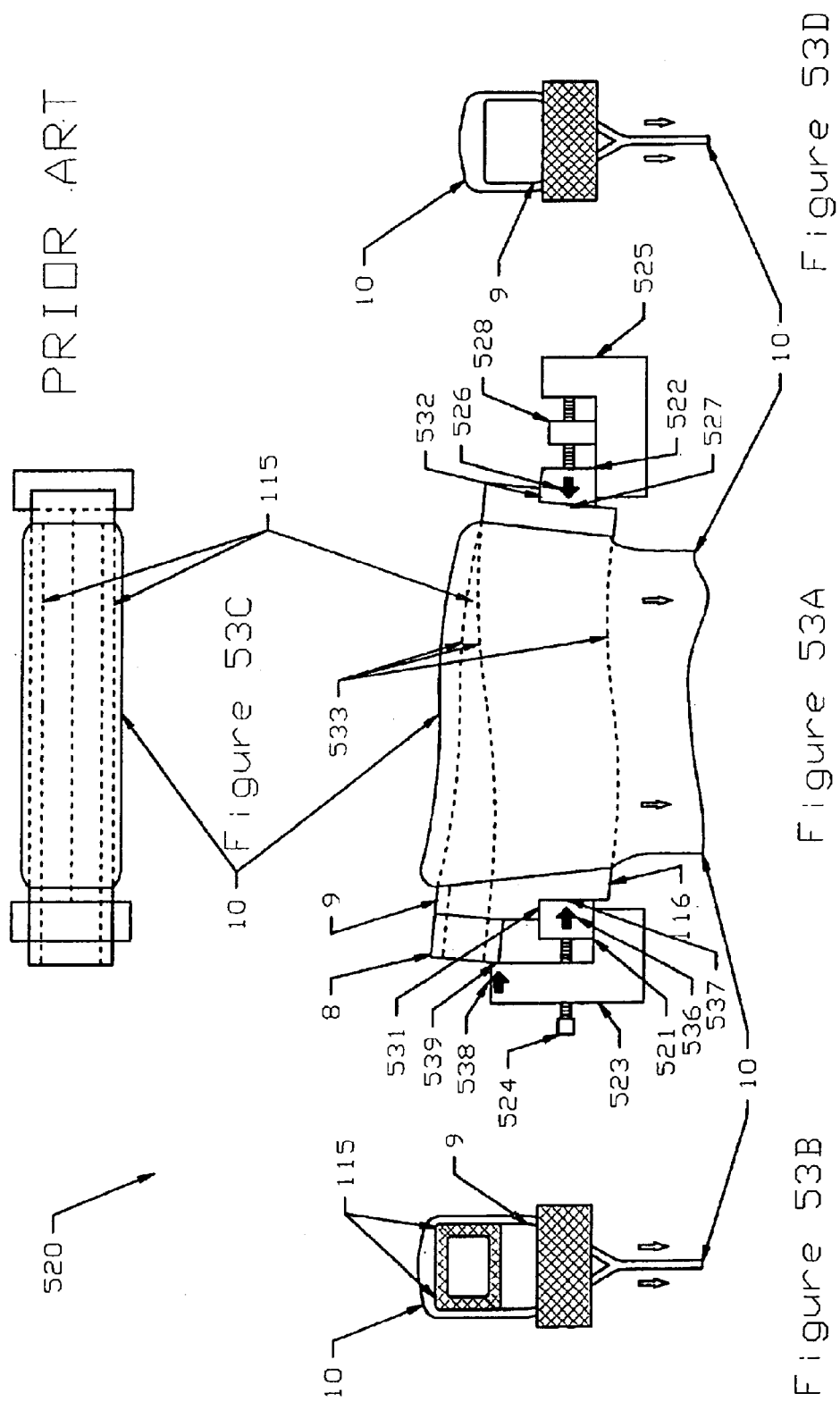

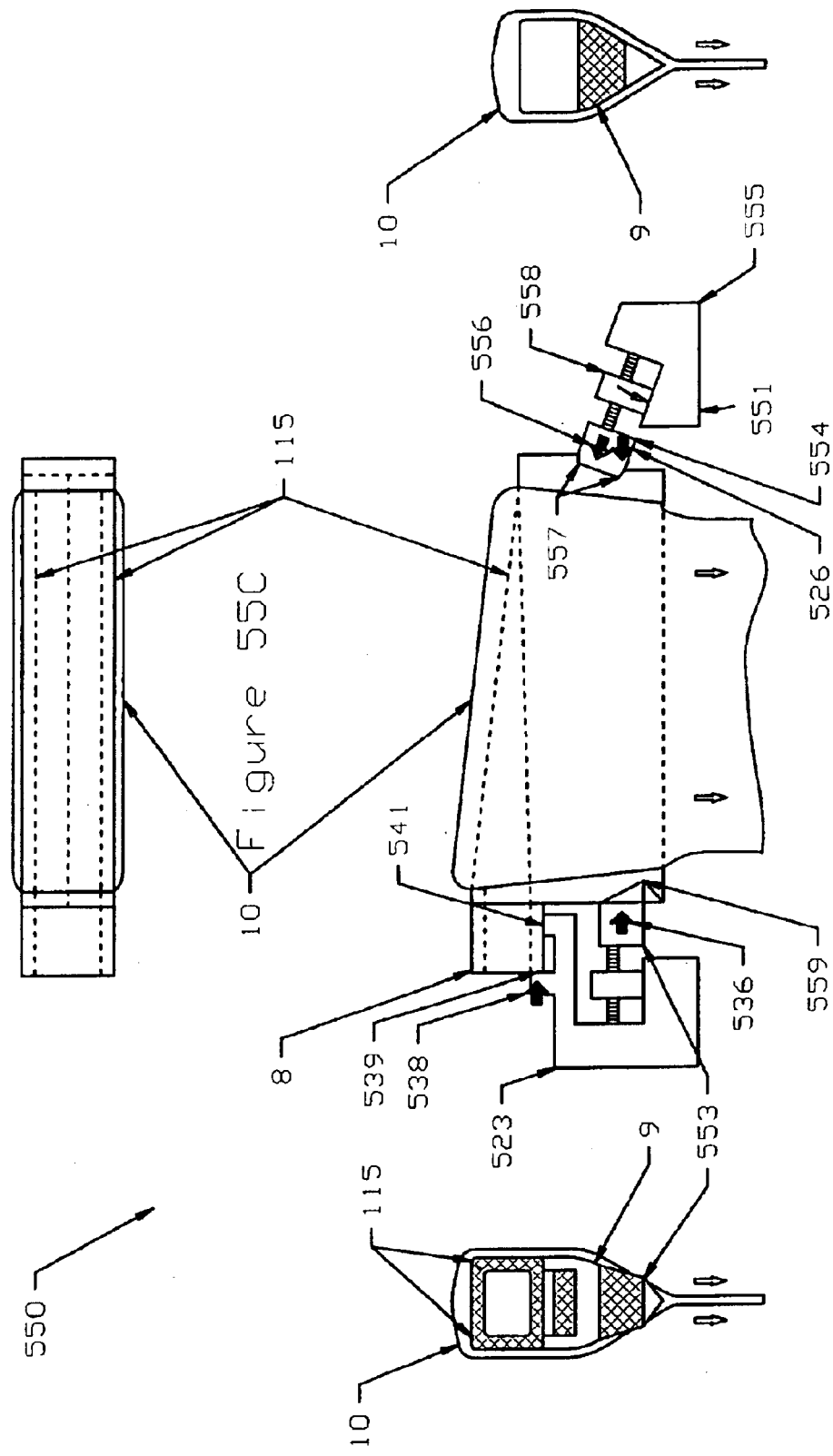

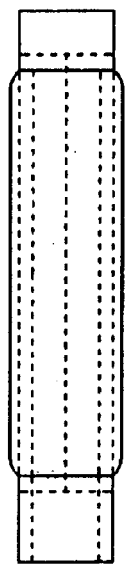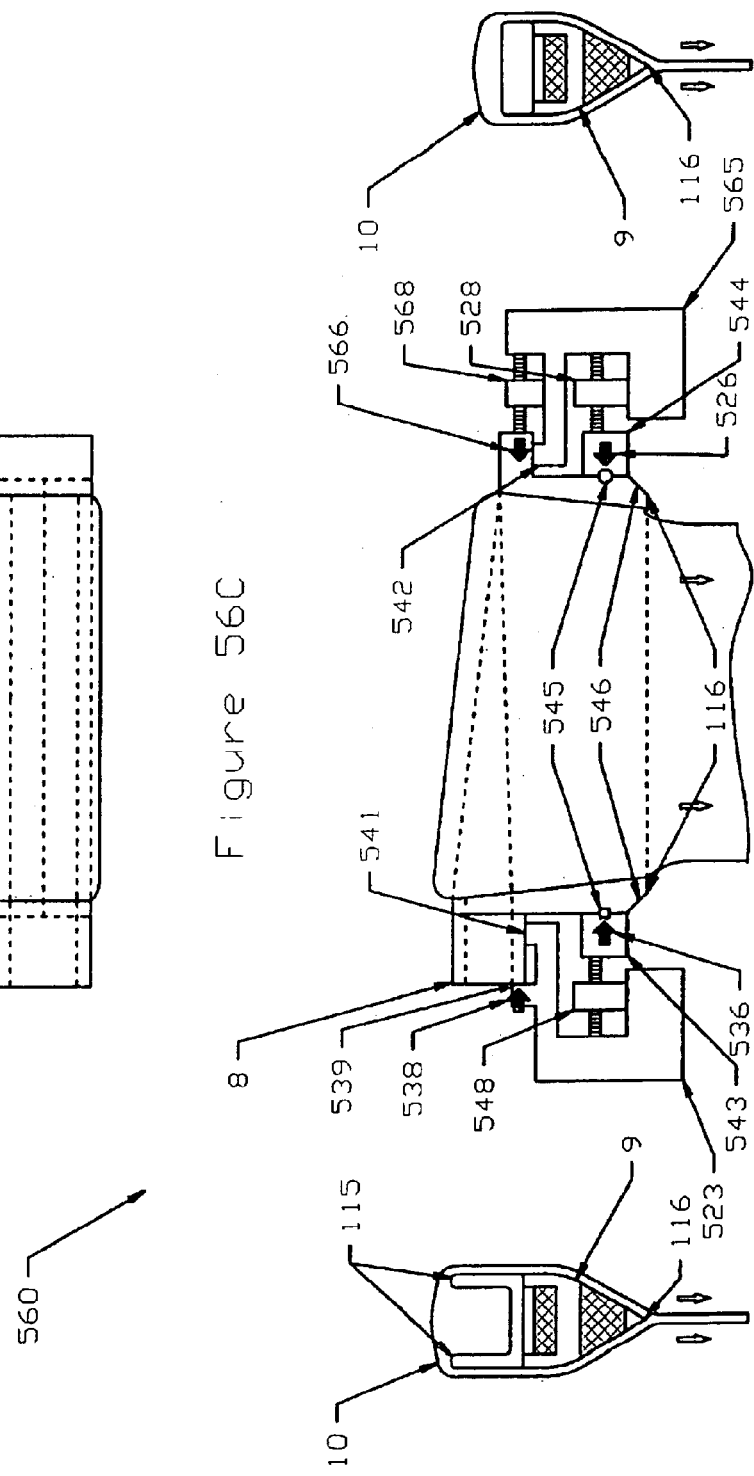

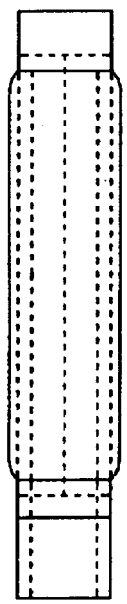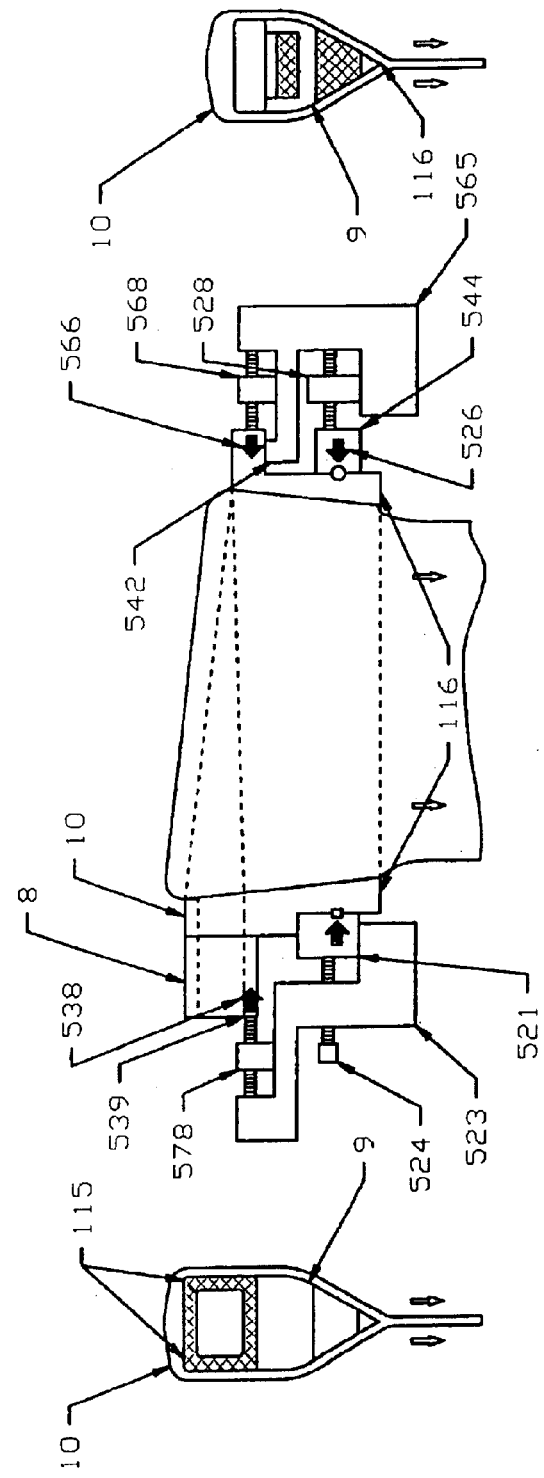
Figure 57A
Figure 57B
Figure 57C
Figure 57D

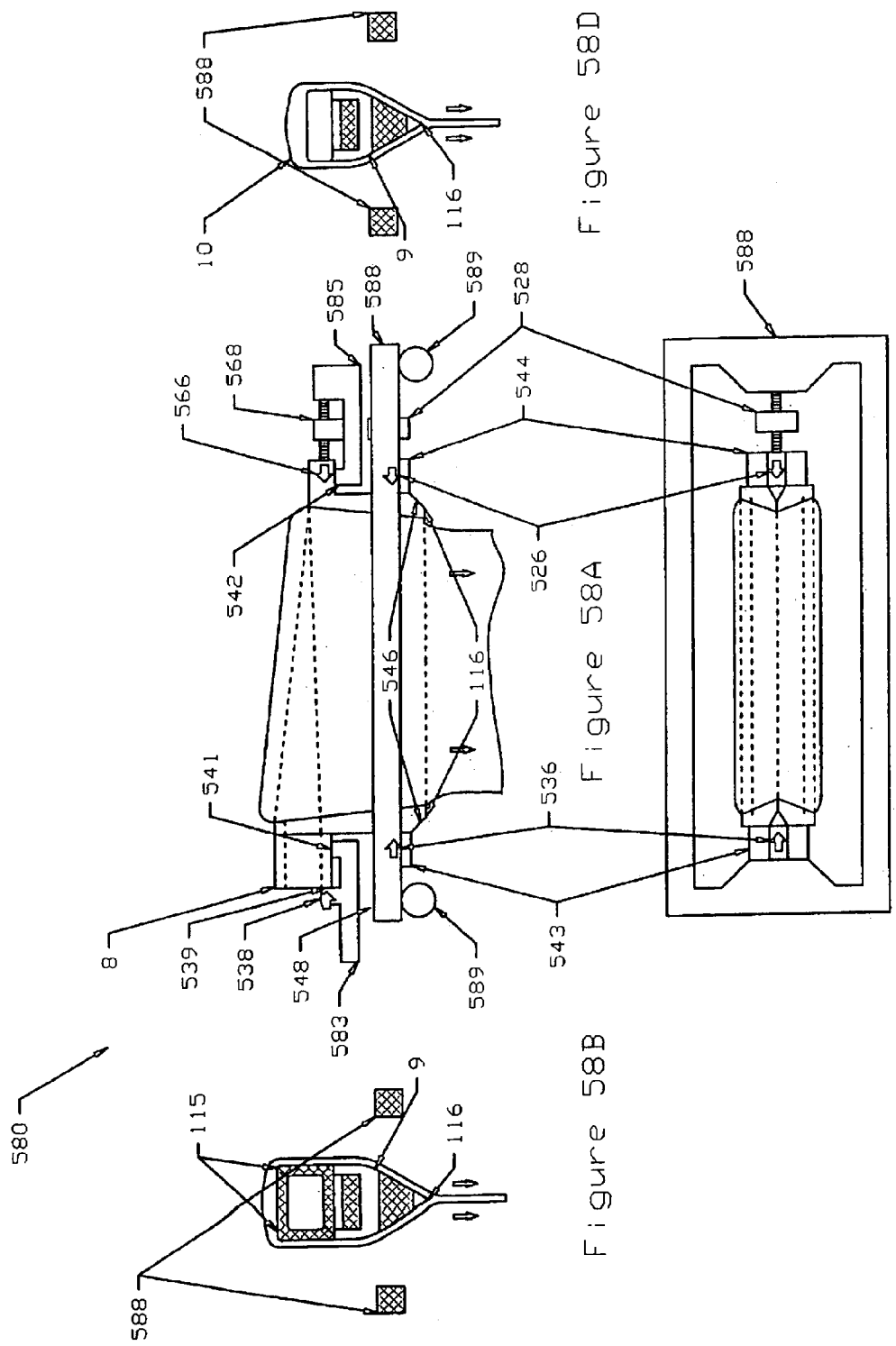

OVERFLOW DOWNDRAWN GLASS FORMING METHOD AND APPARATUS

REFERENCE TO RELATED APPLICATIONS

This application claims an invention that was disclosed in one of the following provisional applications:

1) Provisional Application No. 60/444,728, filed Feb. 4, 2003, entitled "SHEET GLASS FORMING APPARATUS";
2) Provisional Application No. 60/449,671, filed Feb. 24, 2003, entitled "SHEET GLASS FORMING APPARATUS";
3) Provisional Application No. 60/505,302, filed Sep. 23, 2003, entitled "TEMPERATURE MEASUREMENT FOR SHEET GLASS FORMING APPARATUS"; and
4) Provisional Application No. 60/534,950, filed Jan. 8, 2004, entitled "SHEET GLASS FORMING APPARATUS".

The benefit under 35 USC §119(e) of the United States provisional applications is hereby claimed, and the aforementioned applications are hereby incorporated herein by reference.

In addition, this application is a continuation in part of copending U.S. application Ser. No. 10/214,904, filed on Aug. 8, 2002, entitled "SHEET GLASS FORMING APPARATUS". The aforementioned application is hereby incorporated by reference.

BACKGROUND OF THE INVENTION

1. Field of the Invention

The invention pertains generally to the manufacture of glass sheets, and, more particularly, to glass sheets formed from an overflow process.

2. Description of Related Art

The glass that is used for semiconductor powered display applications, and particularly for TFT/LCD display devices that are widely used for computer displays, must have very high surface quality to allow the successful application of semiconductor type material. Sheet glass made using the apparatus of U.S. Pat. No. 3,338,696, assigned to Corning, Inc., makes the highest quality glass as formed and does not require post-processing. The Corning patent makes glass by a manufacturing process termed: "The Overflow Process". Glass made using other processes requires grinding and/or polishing and thus does not have as fine a surface finish. The glass sheet must also conform to stringent thickness variation and warp specifications. The fine surface finish is formed from virgin glass primarily from the center of the glass stream. This glass has not been in contact with foreign surfaces since the stirring operation.

The teachings of U.S. Pat. No. 3,338,696 are still the state of the art as practiced today. However, the apparatus has limitations.

A major drawback of the apparatus of "The Overflow Process" is that, even though it makes excellent glass over most of the surface, the surface of the glass sheet nearest the inlet is composed of glass that has flowed in proximity to the feeding pipe surfaces and therefore is subject to lower quality.

Another drawback of the apparatus of "The Overflow Process" is that, even though its makes excellent glass during stable operating conditions, it recovers from transient conditions very slowly. This is caused in part by quiescent zones of glass flow in the pipes conducting the glass from the stirring device to the apparatus when these pipes are designed using traditional practice. During unintended process transient these quiescent zones slowly bleed glass of a previous material composition into the main process stream of glass causing defects. These defects eventually subside when the process stabilizes; however, there is a period of time where the quality of the glass sheet is substandard.

Yet another drawback of the apparatus of "The Overflow Process" is the limited means for controlling the thickness of the formed sheet. The selective cooling of the glass with respect to width as the sheet is formed is not provided in current practice.

The thickness control system of U.S. Pat. No. 3,682,609 can compensate for small thickness errors, but it can only redistribute the glass over distances on the order of 5–10 cm.

Another drawback of the apparatus of "The Overflow Process" is that the forming apparatus deforms during a manufacturing campaign in a manner such that the glass sheet no longer meets the thickness specification. This is a primary cause for premature termination of the production run.

A further drawback of the apparatus of "The Overflow Process" is that surface tension and body forces have a major effect on the molten glass flow down the external sides of the forming apparatus causing the sheet to be narrower than the forming apparatus and the edges of the formed sheet to have thick beads.

U.S. Pat. No. 3,451,798 provides for edge directors which endeavor to compensate for the surface tension effects but are in reality a correction for problems created by restricting the forming apparatus cross-section to a single profile on its external surface. These edge directors often extend below the bottom of the trough providing some influence to flow below the trough; however, the fixed shape, lack of adjustability and lack of a heating option limit their usefulness in minimizing and/or eliminating the bead at each edge of the sheet.

Another drawback of the prior art is that the glass sheet is not inherently flat when drawn from the forming apparatus.

Yet another drawback of the apparatus of "The Overflow Process" is that the drawing of the sheet from the bottom of the apparatus has a propensity to have a cyclic variation in sheet thickness. This cyclic thickness variation is a strong function of uncontrolled air currents, which tend to become more prevalent as the equipment ages during a production campaign. As the apparatus ages, air leaks develop through cracks in material and assorted openings caused by differential expansion.

An additional drawback of the apparatus of "The Overflow Process" is that, even though it makes excellent glass during stable operating conditions, the control of process temperature and flow is limited by poor measurement technology, thus allowing unintended process transients which cause glass defects. Temperature measurement technology as presently practiced measures the temperature of the outer surface of the process piping, not the actual temperature of the entering glass process stream. Defects caused by the flow and temperature transients eventually subside when the process stabilizes; however, there is a period of time where the quality of the glass sheet is substandard.

Another drawback of the apparatus of "The Overflow Process" is that the temperature of the glass in the forming apparatus is not measured. Only the temperature of the air in the chamber surrounding the apparatus is measured.

Therefore, there is a need in the art for an apparatus which overcomes the shortcomings of the prior art.

SUMMARY OF THE INVENTION

In a preferred embodiment of the present invention, all the glass that forms the surface of the useful area of the sheet is virgin glass, which is not contaminated by flow in proximity to a refractory or refractory metal surface after the stirring operation. In addition, this embodiment significantly reduce inhomogeneities in the glass that forms the sheet by relocating or eliminating the regions of quiescent flow in the piping between the stirring device and the sheet glass forming apparatus.

The present invention alters the flow path at the inlet of the sheet glass forming apparatus to improve quality. The vortex flow is altered at the inlet to the apparatus. The bottom of the downcomer pipe is preferably shaped to alter the character of the vortex flow in the quiescent flow zone between the pipes. The shape of the bottom end of the downcomer pipe is not flat or linear. The altered shape has at least one downward extension, which is curved. In a preferred embodiment, there are three downward extensions. The downward extensions are preferably V-shaped.

In a preferred embodiment, the present invention significantly reduces inhomogeneities in the glass that forms the useable sheet by diverting the glass from the quiescent flow region at the joint of the downcomer pipe and the inlet pipe to the unusable edges of the sheet.

In another preferred embodiment, this invention introduces a precise thermal control system to redistribute the flow of molten glass at the weirs which is the most critical area of the forming process. This thermal control effectively counteracts the degradation of the sheet forming apparatus which inevitably occurs during a production campaign.

In yet another preferred embodiment, the invention introduces a counteracting force to these stresses on the trough in a manner such that the thermal creep which inevitably occurs has a minimum impact on the glass flow characteristics of the forming trough. This embodiment is designed such that this counteracting force is maintained through an extended period of the production campaign. Thus, sheet glass may be manufactured for a longer time with the same forming trough.

Another preferred embodiment creates a variable external cross-section which alters the direction and magnitude of the surface tension and body force stresses and thus, reduces the adverse influence of surface tension and body forces on sheet width.

An embodiment of the present invention embodies design features that limit the effect of surface tension on the flow off the bottom of the forming apparatus. It also provides additional versatility in the adjustment of the thickness of the glass beads at each end of the sheet.

In a preferred embodiment, the present invention employs a bead guide. The bead guide is an adjustably shaped device located beneath the trough at each end of the trough. This device is easily removable for replacement or modification during a production run. The molten glass flows over and attaches itself to the bead guide. The device is optionally heated. The bead guide provides hydraulic stresses that are in opposition to the surface tension stress and thus reduces the influence of surface tension on the formation of thick beads on the edges of the sheet.

In an alternative embodiment, the bead guide is used in combination with an altered trough design. The width and the angle of the inverted slope of the forming wedge are changed to alter the effect of surface tension and body forces on the narrowing of the sheet. In addition, the width and the inverted slope angle may be increased to make the structure stiffer and thus more resistant to thermal creep. The variable external cross-section provides hydraulic stresses that are in opposition to the surface tension and body force stresses and thus reduces the influence of surface tension and body forces.

In an alternative preferred embodiment, the glass is preferentially cooled across its width to create forming stresses during solidification, which ensure that the glass sheet drawn is inherently flat.

In a further preferred embodiment, this invention adjusts the internal pressure in each of the major components of the forming apparatus such that the pressure difference across any leakage path to the forming zone is essentially zero. Therefore, air leakage in the apparatus is minimized even though the cracks and openings exist during initial operation and develop during manufacturing.

A preferred embodiment of the present invention measures the temperature of the glass by immersing thermocouples in the glass, at locations from which any defects caused by the immersion are in the glass that forms the unusable edges of the sheet.

BRIEF DESCRIPTION OF THE DRAWINGS

FIG. 1 illustrates the principle parts of "The Overflow Process" glass sheet manufacturing system.

FIG. 2A shows a side view of "The Overflow Process" as known in the prior art.

FIG. 2B shows a cross-section of the glass flow in the downcomer pipe across lines B—B of FIG. 2A.

FIG. 2C shows a cross-section across lines C—C of FIG. 2A, where the glass flow in the downcomer pipe appears in the sheet for "The Overflow Process".

FIG. 3A shows a side view of a surface flow distribution device in a preferred embodiment of the present invention.

FIG. 3B shows a top view of a surface flow distribution device in a preferred embodiment of the present invention.

FIG. 4A shows a side view of a submerged flow distribution device in a preferred embodiment of the present invention.

FIG. 4B shows a top view of a submerged flow distribution device in a preferred embodiment of the present invention.

FIG. 5A shows a side view of "The Overflow Process" in an embodiment of the present invention.

FIG. 5B shows the glass flow in the downcomer pipe across lines B—B of FIG. 5A when a flow distribution device is used.

FIG. 5C shows a cross-section across lines C—C of FIG. 5A, where the glass flow in the downcomer pipe appears in the sheet when a flow distribution device is used.

FIG. 7A shows the top view of a bowl with side inflow which relocates the quiescent flow zone from the bowl nose to the bowl side in a preferred embodiment of the present invention.

FIG. 7B shows a side view of FIG. 7A.

FIG. 7C shows the top view of a bowl with side inflow which relocates the quiescent flow zone from the bowl nose to a location approximately 45 degrees to the side with respect to the centerline of the forming apparatus in a preferred embodiment of the present invention.

FIG. 7D shows a side view of FIG. 7C.

FIG. 8 illustrates a bowl in "The Overflow Process" as known in the prior art.

FIG. 9A shows a downcomer pipe feeding the forming apparatus inlet with minimum quiescent flow in a preferred embodiment of the present invention.

FIG. 9B shows a top view of FIG. 9A.

FIG. 9C shows a detail of the downcomer pipe to trough inlet pipe connection showing the glass flow pattern in a preferred embodiment of the present invention.

FIG. 10A shows the flow between the downcomer pipe and the forming apparatus inlet in "The Overflow Process" as known in the prior art.

FIG. 10B shows a top view of FIG. 10A.

FIG. 10C shows a detail of the downcomer pipe to trough inlet pipe connection showing the glass flow pattern as known in the prior art.

FIG. 11A shows the principle parts of a typical "Overflow Process" manufacturing system.

FIG. 11B shows a section of FIG. 11A.

FIG. 12A illustrates a side view of the glass flowing through the forming trough.

FIG. 12B shows a section through the center of the forming trough of FIG. 12A showing the cooling zones.

FIG. 13A shows a revised single heating chamber muffle design in a preferred embodiment of the present invention.

FIG. 13B shows a section of FIG. 13A.

FIG. 14A shows air cooling tubes to effect localized cooling to the molten glass as it passes over the weirs in a preferred embodiment of the invention.

FIG. 14B shows a section of FIG. 14A.

FIG. 16A shows radiant coolers which effect localized cooling to the molten glass as it passes over the weirs in a preferred embodiment of the invention.

FIG. 16B shows a section of FIG. 16A.

FIG. 17A illustrates how the prior art trough design deforms as a result of thermal creep.

FIG. 17B shows another view of FIG. 17A.

FIG. 18A shows the forming trough support system as known in the prior art.

FIG. 18B shows another view of FIG. 18A.

FIG. 18C shows another view of FIG. 18A.

FIG. 18D shows another view of FIG. 18A.

FIG. 19A shows single shaped compression blocks on each end of the trough in a preferred embodiment of the present invention.

FIG. 19B shows another view of FIG. 19A.

FIG. 19C shows another view of FIG. 19A.

FIG. 19D shows another view of FIG. 19A.

FIG. 20A show a single shaped compression block on one end of the trough and multiple shaped compression blocks on the other end in a preferred embodiment of the present invention.

FIG. 20B shows another view of FIG. 20A.

FIG. 20C shows another view of FIG. 20A.

FIG. 20D shows another view of FIG. 20A.

FIG. 21A shows a trough design as known in the prior art.

FIG. 21B shows a top view of FIG. 21A.

FIG. 21C shows a cross-section of the trough design shown in FIG. 21A across lines C—C.

FIG. 21D shows a cross-section of the trough design shown in FIG. 21A across lines D—D.

FIG. 21E shows a cross-section of the trough design shown in FIG. 21A across lines E—E.

FIG. 21F shows a cross-section of the trough design shown in FIG. 21A across lines F—F.

FIG. 21G shows a cross-section of the trough design shown in FIG. 21A across lines G—G.

FIG. 22A shows a reduced inverted slope at each end of the trough in a preferred embodiment of the present invention.

FIG. 22B shows a top view of FIG. 22A.

FIG. 22C shows a cross-section of the trough design shown in FIG. 22A across lines C—C.

FIG. 22D shows a cross-section of the trough design shown in FIG. 22A across lines D—D.

FIG. 22E shows a cross-section of the trough design shown in FIG. 22A across lines E—E.

FIG. 22F shows a cross-section of the trough design shown in FIG. 22A across lines F—F.

FIG. 22G shows a cross-section of the trough design shown in FIG. 22A across lines G—G.

FIG. 24A shows an alternate embodiment of the present invention with the potential for increased structural stiffness.

FIG. 24B shows a top view of FIG. 24A.

FIG. 24C shows a cross-section of the trough design shown in FIG. 24A across lines C—C.

FIG. 24D shows a cross-section of the trough design shown in FIG. 24A across lines D—D.

FIG. 24E shows a cross-section of the trough design shown in FIG. 24A across lines E—E.

FIG. 24F shows a cross-section of the trough design shown in FIG. 24A across lines F—F.

FIG. 24G shows a cross-section of the trough design shown in FIG. 24A across lines G—G.

FIG. 25A shows a forming trough with a convex upward forming root which solidifies the center glass before the edge glass in a preferred embodiment of the present invention.

FIG. 25B shows another view of FIG. 25A.

FIG. 25C shows another view of FIG. 25A.

FIG. 25D shows another view of FIG. 25A.

FIG. 26A shows a forming trough with a convex downward forming root which solidifies the edge glass before the center glass in a preferred embodiment of the present invention.

FIG. 26B shows another view of FIG. 26A.

FIG. 26C shows another view of FIG. 26A.

FIG. 26D shows another view of FIG. 26A.

FIG. 27A shows a forming trough with a complexly shaped forming root to solidify the glass in a unique manner over its width in a preferred embodiment of the present invention.

FIG. 27B shows another view of FIG. 27A.

FIG. 27C shows another view of FIG. 27A.

FIG. 27D shows another view of FIG. 27A.

FIG. 31A shows how the pressure in the transition zone may be controlled to minimize leakage in a preferred embodiment of the present invention.

FIG. 31B shows a section of FIG. 31A.

FIG. 32A shows how the pressure in the annealer and pulling machine zone may be controlled to minimize leakage in a preferred embodiment of the present invention.

FIG. 32B shows a section of FIG. 32A.

FIG. 38A shows a downcomer pipe with three downward extensions submerged in the inlet pipe glass in an embodiment of the present invention.

FIG. 38B shows a downcomer pipe with three downward extensions partially submerged in the inlet pipe glass in an embodiment of the present invention.

FIG. 38C shows a downcomer pipe with three downward extensions substantially above the glass free surface in the inlet pipe glass in an embodiment of the present invention.

FIG. 39A shows a downcomer pipe with three downward extensions submerged in the inlet pipe glass in an embodiment of the present invention.

FIG. 39B shows the streamlines of glass flow in the embodiment of the present invention shown in FIG. 39A.

FIG. 42A shows a downcomer pipe with three downward extensions submerged in the glass of a modified inlet pipe in an embodiment of the present invention.

FIG. 42B shows the streamlines of glass flow in the embodiment of the present invention shown in FIG. 42A.

FIG. 43A shows a prior art trough design showing the contraction of the glass sheet width.

FIG. 43B shows a cross-section of the trough shown in FIG. 43A across lines B—B.

FIG. 43C shows a cross-section of the trough shown in FIG. 43A across lines C—C.

FIG. 43D shows a cross-section of the trough shown in FIG. 43A across lines D—D.

FIG. 43E shows a cross-section of the trough shown in FIG. 43A across lines E—E.

FIG. 43F shows a cross-section of the trough shown in FIG. 43A across lines F—F.

FIG. 43G shows a cross-section of the trough shown in FIG. 43A across lines G—G.

FIG. 44A shows the effect of a bead guide on the sheet width using the trough design shown in FIG. 43 in an embodiment of the present invention.

FIG. 44B shows a cross-section of the trough shown in FIG. 44A across lines B—B.

FIG. 44C shows a cross-section of the trough shown in FIG. 44A across lines C—C.

FIG. 44D shows a cross-section of the trough shown in FIG. 44A across lines D—D.

FIG. 44E shows a cross-section of the trough design shown in FIG. 44A across lines E—E.

FIG. 44F shows a cross-section of the trough shown in FIG. 44A across lines F—F.

FIG. 44G shows a cross-section of the trough shown in FIG. 44A across lines G—G.

FIG. 45A shows an alternative embodiment of the present invention, with a bead guide located below an improved trough design.

FIG. 45B shows a cross-section of the trough shown in FIG. 45A across lines B—B.

FIG. 45C shows a cross-section of the trough shown in FIG. 45A across lines C—C.

FIG. 45D shows a cross-section of the trough shown in FIG. 45A across lines D—D.

FIG. 45E shows a cross-section of the trough shown in FIG. 45A across lines E—E.

FIG. 45F shows a cross-section of the trough shown in FIG. 45A across lines F—F.

FIG. 45G shows a cross-section of the trough shown in FIG. 45A across lines G—G.

FIG. 46A shows an embodiment of the bead guide of the present invention.

FIG. 46B shows an alternative embodiment of the bead guide of the present invention.

FIG. 46C shows an alternative embodiment of the bead guide of the present invention.

FIG. 46D shows an alternative embodiment of the bead guide of the present invention.

FIG. 47A shows mounting for a rotating bead guide in an embodiment of the present invention.

FIG. 47B shows mounting for a rotating bead guide in an alternative embodiment of the present invention.

FIG. 48A shows preferred locations of immersed thermocouples in the downcomer pipe and the forming apparatus inlet pipe in an embodiment of the present invention.

FIG. 48B is a cross-section through the bowl across line B—B of FIG. 48A further detailing the preferred thermocouple locations.

FIG. 48C is a cross-section through the downcomer pipe across line C—C of FIG. 48A further detailing the preferred thermocouple locations.

FIG. 48D is a cross-section through the trough inlet pipe across line D—D of FIG. 48A further detailing the preferred thermocouple locations.

FIG. 48E is a cross-section through the bowl inlet pipe across line E—E of FIG. 48A further detailing the preferred thermocouple locations.

FIG. 49A is a side view of the trough showing thermocouples located on the bottom of the trough in an embodiment of the present invention.

FIG. 49B is a top view of the trough showing thermocouples located on the bottom centerline of the trough.

FIG. 50A is a side view of the trough showing thermocouples located in an instrumentation assembly in an embodiment of the present invention.

FIG. 50B is a top view of the trough showing thermocouples located in an instrumentation assembly on the bottom centerline of the trough.

FIG. 50C shows a side view of the instrumentation assembly.

FIG. 50D shows a top view of the instrumentation assembly.

Figure 51C:
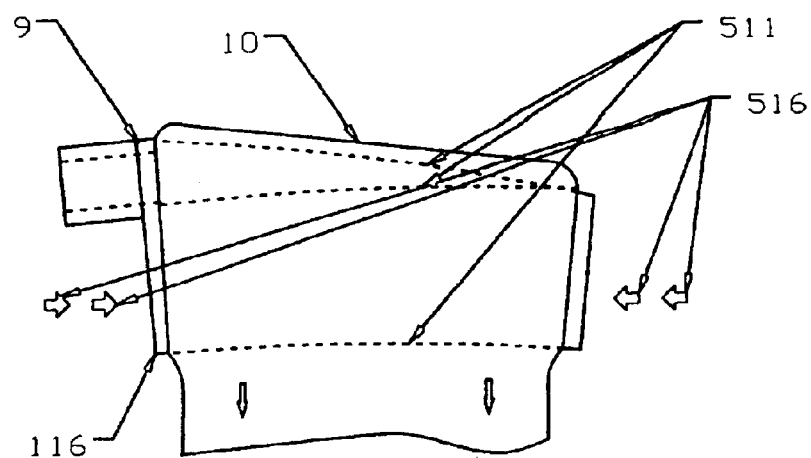
Figure 51B:
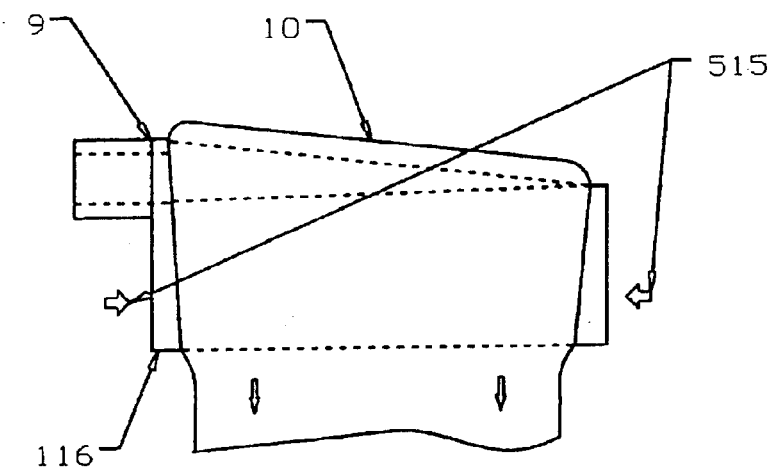
Figure 51A:
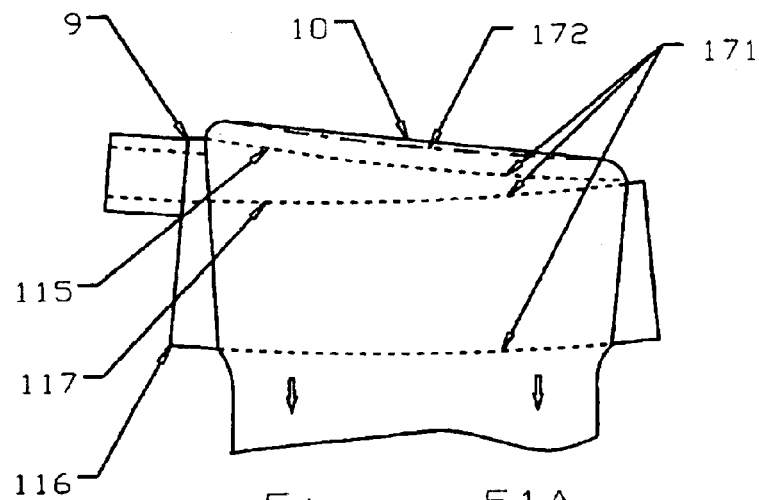

FIG. 51A is an illustration of the thermal creep deformation of the glass forming trough with no applied load.

FIG. 51B is an illustration of the thermal creep deformation of the glass forming trough under an applied load that corrects for the deformation.

FIG. 51C is an illustration of the thermal creep deformation of the glass forming trough under too large an applied load.

FIG. 52A illustrates the prior art glass forming trough support system.

FIG. 52B shows a sectional view of FIG. 52A.

FIG. 52C shows a partial view of FIG. 52A.

FIG. 52D shows a sectional view of FIG. 52A.

FIG. 53A illustrates how the prior art glass forming trough deforms as a result of thermal creep as it is stressed by the prior art trough support system.

FIG. 53B shows a sectional view of FIG. 53A.

FIG. 53C shows a partial view of FIG. 53A.

FIG. 53D shows a sectional view of FIG. 53A.

Figures 54A, 54B, 54C, 54D:
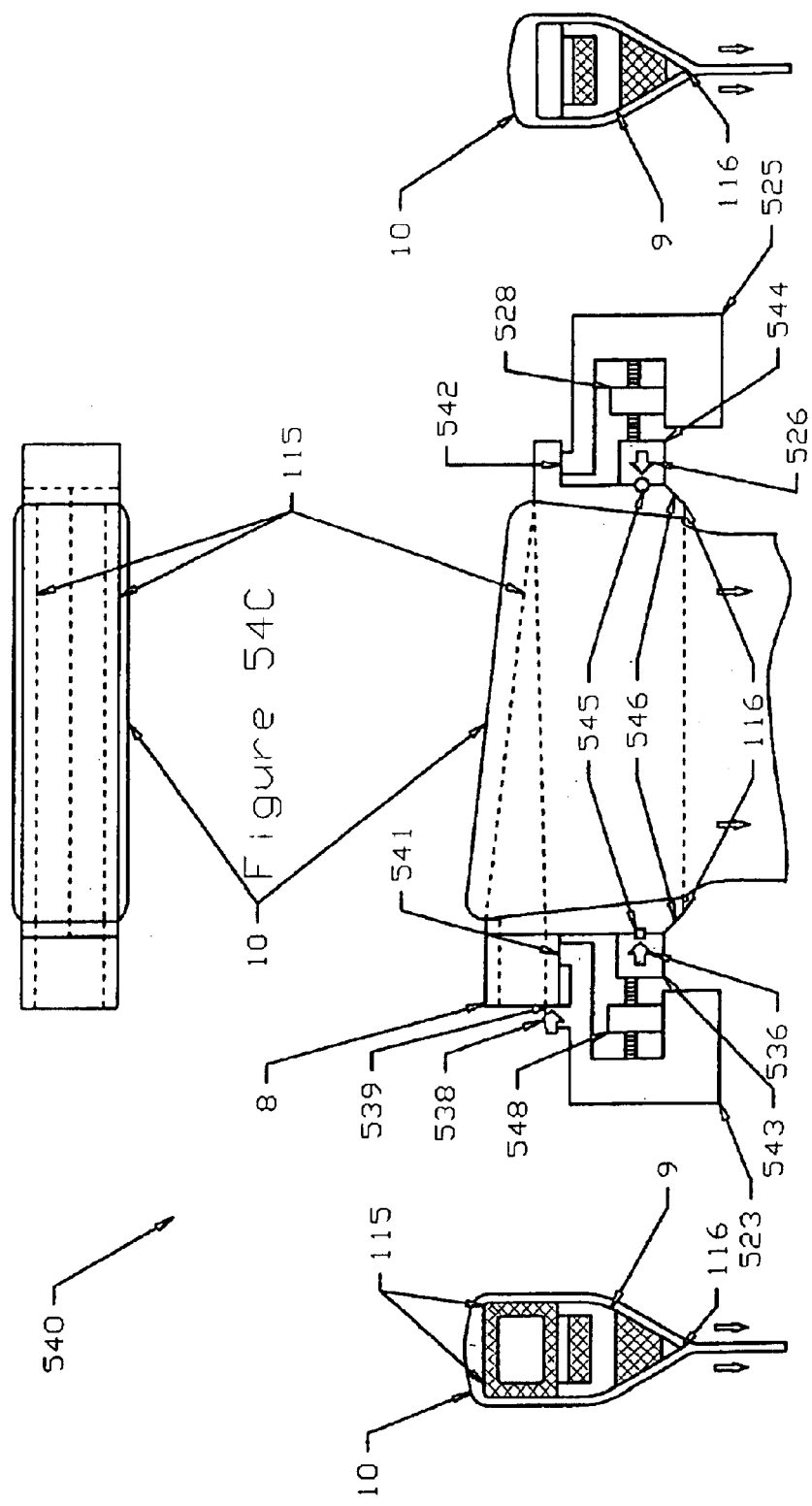

FIG. 54A shows an embodiment of present invention trough support system involving support blocks for the weight of the trough at each end and free-floating compression blocks at each end.

FIG. 54B shows a sectional view of FIG. 54A.

FIG. 54C shows a partial view of FIG. 54A.

FIG. 54D shows a sectional view of FIG. 54A.

FIGS. 55A shows a trough support system involving a support block for the weight of the trough and a floating compression block at the inlet end of the trough and a floating trough weight and trough compression block at the far end of the trough in an embodiment of the present invention.

FIG. 55B shows a sectional view of FIG. 55A.

FIG. 55C shows a partial view of FIG. 55A.

FIG. 55D shows a sectional view of FIG. 55A.

FIG. 56A shows a force motor added to the top end of the far end of the trough in an embodiment of the present invention.

FIG. 56B shows a sectional view of FIG. 56A.

FIG. 56C shows a partial view of FIG. 56A.

FIG. 56D shows a sectional view of FIG. 56A.

FIG. 57A shows a retained inlet end adjusting screw and a force motor to generate a constant sealing force for the glass seal between the inlet pipe and the trough in an embodiment of the present invention.

FIG. 57B shows a sectional view of FIG. 57A.

FIG. 57C shows a partial view of FIG. 57A.

FIG. 57D shows a sectional view of FIG. 57A.

FIG. 58A shows the inlet end and outlet end forces being equal in an embodiment of the present invention.

FIG. 58B shows a sectional view of FIG. 58A.

FIG. 58C shows a partial view of FIG. 58A.

FIG. 58D shows a sectional view of FIG. 58A.

DETAILED DESCRIPTION OF THE INVENTION

The flow dynamics of this invention are such that the outside surfaces of the glass sheet are formed from thoroughly mixed virgin glass that comes from the center of the glass stream flowing into the forming apparatus and thus has not contacted a refractory or refractory metal surface. This produces the highest possible surface quality. This pristine surface is essential for the manufacture of LCD/TFT semiconductor display devices. In addition, the flow dynamics in all embodiments of this invention are such that the flow rate of molten glass to the forming wedge at the bottom of the forming trough is substantially uniform over its width.

Referring to FIGS. 1, 11A and 11B, a typical "Overflow Process" manufacturing system (1) is shown. The glass (10) from the melting furnace (2) and forehearth (3), which must be of substantially uniform temperature and chemical composition, feeds a stirring device (4). The stirring device (4) thoroughly homogenizes the glass. The glass (10) is then conducted through a bowl inlet pipe (5), into a bowl (6), and down into the downcomer pipe (7), through the joint (14) between the downcomer pipe (7) and the forming apparatus inlet pipe (8), to the inlet of the overflow trough (9). While flowing from the stirring device (4) to the trough (9), the glass (10), especially that which forms the sheet surface, must remain homogeneous. The normal purpose of the bowl (6) is to alter the flow direction from horizontal to vertical and to provide a means for stopping the flow of glass (10). A needle (13) is provided to stop glass flow. The normal function of the joint (14) between the downcomer pipe (7) and the trough inlet pipe (8) is to allow for removal of the sheet glass forming apparatus for service as well as a means of compensation for the thermal expansion of the process equipment.

The molten glass (10) from the melting furnace and forehearth, which must be of substantially uniform temperature and chemical composition, enters the forming apparatus through the inlet pipe (8) to the sheet forming trough (9). The inlet pipe (8) is preferably shaped to control the velocity distribution of the incoming molten glass flow. The glass sheet forming apparatus, which is described in detail in both U.S. Pat. No. 3,338,696 and application Ser. No. 09/851,627 (filed May 9, 2001, U.S. patent Publication No. 2001/0039814) and Ser. No. 10/214,904 (filed Aug. 8, 2002, U.S. patent Publication No. 2003/0029199), herein incorporated by reference, is a wedge shaped forming device (9). Straight sloped weirs (115), substantially parallel with the pointed edge of the wedge (root) (116), form each side of the trough. The bottom of the trough (117) and sides of the trough (118) are contoured in a manner to provide even distribution of glass to the top of each side weir (115). The glass then flows over the top of each side weir (115), down each side of the wedge shaped forming device (9), and joins at the pointed edge of the root (116), to form a sheet of molten glass (11). The sheet of molten glass (11) is then cooled as it is pulled off the root (116) by pulling rollers (111) to form a solid glass sheet (12) of substantially uniform thickness. Edge rollers (110) may also be used to draw the molten glass sheet (11).

Referring also to FIGS. 43A through 43G, as the glass flows down the vertical portion (436) of the forming wedge, the surface tension and body forces have a minimal effect on the sheet width, whereas, when the molten glass (10) flows vertically down the inverted slope portion (437) of the forming wedge, the surface tension and body forces act to make the sheet narrower. This is shown in FIG. 43A as the glass flows on the side of the trough (9) from point (432) to point (433).

In the prior art, the forming trough (9) is encased within a muffle (119) whose purpose is to control the temperature of the forming trough (9) and the molten glass (10). It is normal practice to maintain a uniform temperature in the muffle chamber (113) surrounding the forming trough (9). Cooling the glass as it transitions from the molten state to the solid state must be carefully controlled. This cooling process starts on the lower part of the forming apparatus (9) just above the root (116), and continues as the molten glass sheet passes through the muffle door zone (114). The molten glass is substantially solidified by the time it reaches the pulling rollers (111). The molten glass forms a solid glass sheet (12) of substantially uniform thickness.

Altering Glass Flow Distribution

Referring also to FIGS. 2 through 10, a preferred embodiment of the present invention alters the flow path at the inlet of the sheet glass forming apparatus to improve surface quality. It also facilitates more uniform flow of glass through the piping that conducts the glass from the stirring device to the sheet glass forming apparatus.

U.S. Pat. No. 3,338,696 considers only the glass flow within the forming trough. U.S. Pat. No. 3,338,696 also claims that the entire sheet surface is formed from virgin glass, which has not been adversely effected by contact with a foreign surface. This is not entirely correct, as the sheet formed on the inlet end of the trough has flowed on the piping system front surface. A flow distribution device is added at the trough inlet in this invention to ensure that all of the useable sheet surface is formed from virgin glass. The piping system between the glass stirring device and the glass sheet forming apparatus is modified from traditional practice in the bowl and at the connection between the downcomer pipe and the forming apparatus inlet pipe. The flow through the bowl is altered, either eliminating or relocating the quiescent flow zone that normally forms at the front top surface of the bowl. The downcomer pipe is not submerged in the forming apparatus inlet pipe glass thus minimizing the quiescent flow zone between the pipes. The centerline of the downcomer pipe is moved off center relative to the centerline of the inlet pipe to alter the vortex flow pattern at the joint of the two pipes. The shape of the bottom of the downcomer pipe and of the top section of the inlet pipe are also preferably modified to alter the vortex flow pattern at the joint of the two pipes.

FIGS. 2A through 2C illustrate where the glass (10) flowing in the downcomer feed pipe (7) ends up in the formed glass sheet in the prior art "Overflow Process". The glass flow in proximity to the sides (21) of the downcomer pipe (7) ends up in the center of the drawn sheet. The flow (23) in proximity to the front surface of the downcomer pipe (7) is distributed over the entire glass surface, however, it is most concentrated on the approximate one third of the sheet at the inlet end. This surface glass (23) is subject to disruption by the downcomer pipe surface and by the glass in the quiescent zones in the bowl (6) and at the downcomer pipe (7) to inlet pipe (8) connection (14). The surface of the remaining substantially two thirds of the sheet is formed from virgin interior glass (22). Two other portions of the glass flow (24) which are symmetrically offset from the front surface at an angle of approximately 45 degrees end up forming the near end unusable edge section (25) at the inlet end of the sheet. Another portion (26) centered at the back surface at an angle of approximately 180 degrees proceeds to the far end unusable edge section (27).

FIGS. 3A and 3B show an embodiment of the glass sheet forming apparatus (31) with an inflow pipe (8), a flow distribution device (32) (which is a subject of this invention) located at the trough inlet surface, and the glass sheet forming apparatus body (9). The flow distribution device (32) interrupts the glass surface flow and diverts it to the surface in the edge of the sheet. Glass from the center of the downcomer pipe flow stream then comes to the surface of the forming trough to form the surface of the useable portion of the glass sheet (11). Note that ten to twenty percent of the sheet at each edge is normally unusable for various reasons.

FIGS. 4A and 4B show an alternative embodiment of the glass sheet forming apparatus (41), which performs the same function as the embodiment in FIG. 3 except that the surface flow distribution device (42) is located under the surface of the glass (10) and redistributes the surface flow in a more subtle but equally effective manner. The glass flow (10) that forms the unusable inlet edge of the sheet, flows through the center slot (43) in the flow distribution device (42). The glass (which flows through this center slot) is the glass that has been in proximity to the front surface of the downcomer pipe. Glass from the center of the downcomer pipe then flows to the trough surface to form the surface of the useable portion of the sheet (11). Other glass that flows in proximity to the surface of the downcomer pipe remains submerged.

FIGS. 5A through 5C illustrate where the glass (10) flowing in the downcomer feed pipe (7) ends up in the formed glass sheet for the inventions described in FIGS. 3 and 4. The glass flow to the center of the sheet (21) is virtually identical to that in the prior art. However, the flow (52) which forms the outside surface of the formed glass sheet does not flow in proximity to the front surface of the downcomer pipe (7). The two portions of the glass flow (24) which are symmetrically offset from the front surface at an angle of approximately 45 degrees and which end up forming the unusable edge section (25) at the inlet end of the sheet are substantially unaffected, as is the glass flow (26) which ends up in the unusable edge section (27).

Figure 6:
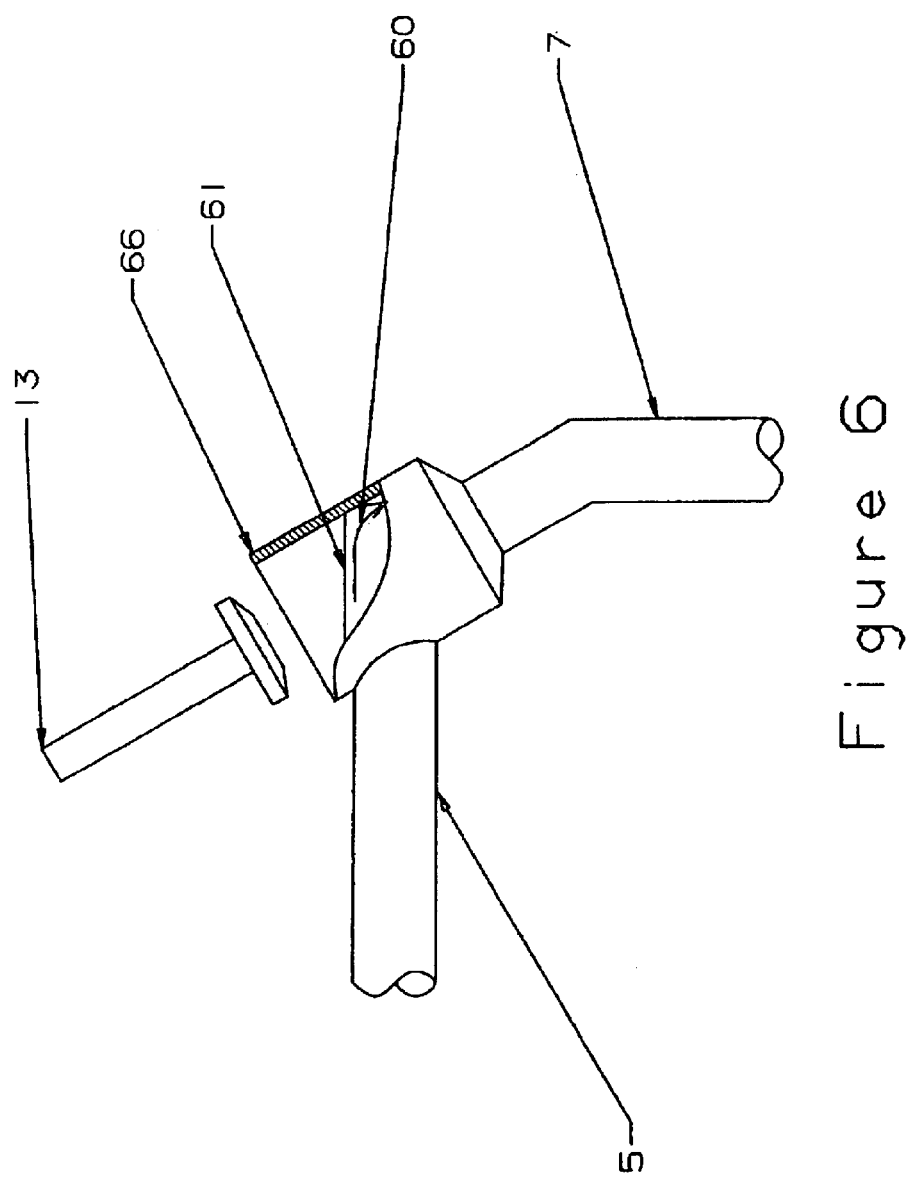
FIG. 6 shows a bowl with an inclined axis which diffuses the quiescent flow zone at the bowl nose in a preferred embodiment of the present invention.

FIG. 6 is an embodiment that shows the axis of the bowl (66) inclined at an angle such that the main process stream passes through the front of the bowl. This active flow (60) entrains the surface glass (61), overcoming the surface tension forces that would normally create a quiescent zone of glass flow located at the bowl nose (FIG. 8). A needle (13) is present to stop glass flow.

FIGS. 7A through 7D show an embodiment of the present invention where a crossways motion of the glass in the bowl (76) is facilitated by feeding the glass in the pipe coming from the stirring device to the bowl (75), into the side of the bowl (76) at an angle (74) with respect to the centerline (73) of the forming apparatus (9). This effectively changes the flow pattern (70) in the bowl such that the quiescent zone normally located at the bowl nose (81, FIG. 8) is moved to the side of the bowl (71). Referring back to FIGS. 2A–2C and 5A–5C, depending on the angle (74) of the flow in the bowl with respect to the centerline (73) of the forming apparatus (9), the glass from the quiescent zone (71) ends up in either the unusable portion of the edges (25), (27) or is submerged in the center of the glass sheet (21) instead of on the surface of the glass sheet (23). The glass free surface (72) in the bowl is also shown.

FIG. 8 illustrates the prior art with a bowl (6) which shows the quiescent zone (81) of glass that is located at the front of the bowl (6). This glass is kept in place by a combination of low process stream flow (80) at the front of the bowl and surface tension.

FIGS. 9A through 9C show an embodiment of the present invention where the bottom end (94) of the downcomer pipe (97) is located substantially above the glass free surface (90) in the forming apparatus inlet pipe (98). The bottom end of the downcomer pipe (97) and the forming apparatus inlet (98) also have a specific size and shape, (95) and (92), respectively. The vertical distance (93) and the size and shape (92) of the forming apparatus inlet (98) is specifically designed to minimize any zone of quiescent or vortex flow in the glass flow path (91). Thus, the molten glass (10) forms a more homogenous sheet (11). This design is determined by solution of the fluid flow equations (Navier-Stokes Equations) and by experimental tests.

FIGS. 10A through 10C show a downcomer pipe (7) submerged in the molten glass surface (100) in the forming apparatus inlet pipe (8) as known in the prior art. There is a quiescent zone (101) between the two pipes (7) and (8). The glass flow path (103) produces an annular vortex (102) of glass between the downcomer pipe (7) and the trough inlet pipe (8). The vortex exchanges little material with the main process stream except during flow transients at which time it produces defects in the glass sheet. The minimization of the vortex between the downcomer pipe (7) and the inlet pipe (8) requires accurate centering of the two pipes as does accurate relative vertical positioning (93) of the two pipes. This is a difficult condition to maintain in production operations. The sensitivity of the process to the vertical position (93) can be reduced by the embodiments discussed relative to FIGS. 33 through 42.

Referring back to FIGS. 2A through 2C, and also to FIGS. 33A through 42B, a preferred embodiment of the present invention substantially alters the vortex flow at the inlet of the sheet glass forming apparatus to improve quality. The vortex flow between the downcomer pipe and the inlet pipe at the inlet to the apparatus is altered from a single vortex to multiple vortices.

The streamlines of glass flow shown in FIGS. 33B, 34B, 36B, 37B, 39B, 41B, and 42B in this application are calculated using a technology termed "computational fluid dynamics", which uses computers to predict the motion of gases and liquids. The particular product used for the calculations herein was CFD2000®, which is one of several products that are commercially available.

FIGS. 10A through 10C and FIGS. 33A and 33B show the prior art, where the downcomer pipe (7) has a flat bottom (94) which is immersed below the free surface of the glass (100) in the inlet pipe (8). There is a quiescent zone (101) between the two pipes which has a continuous vortex (102) which surrounds the bottom of the downcomer pipe (7).

Figures 33A, 33B:
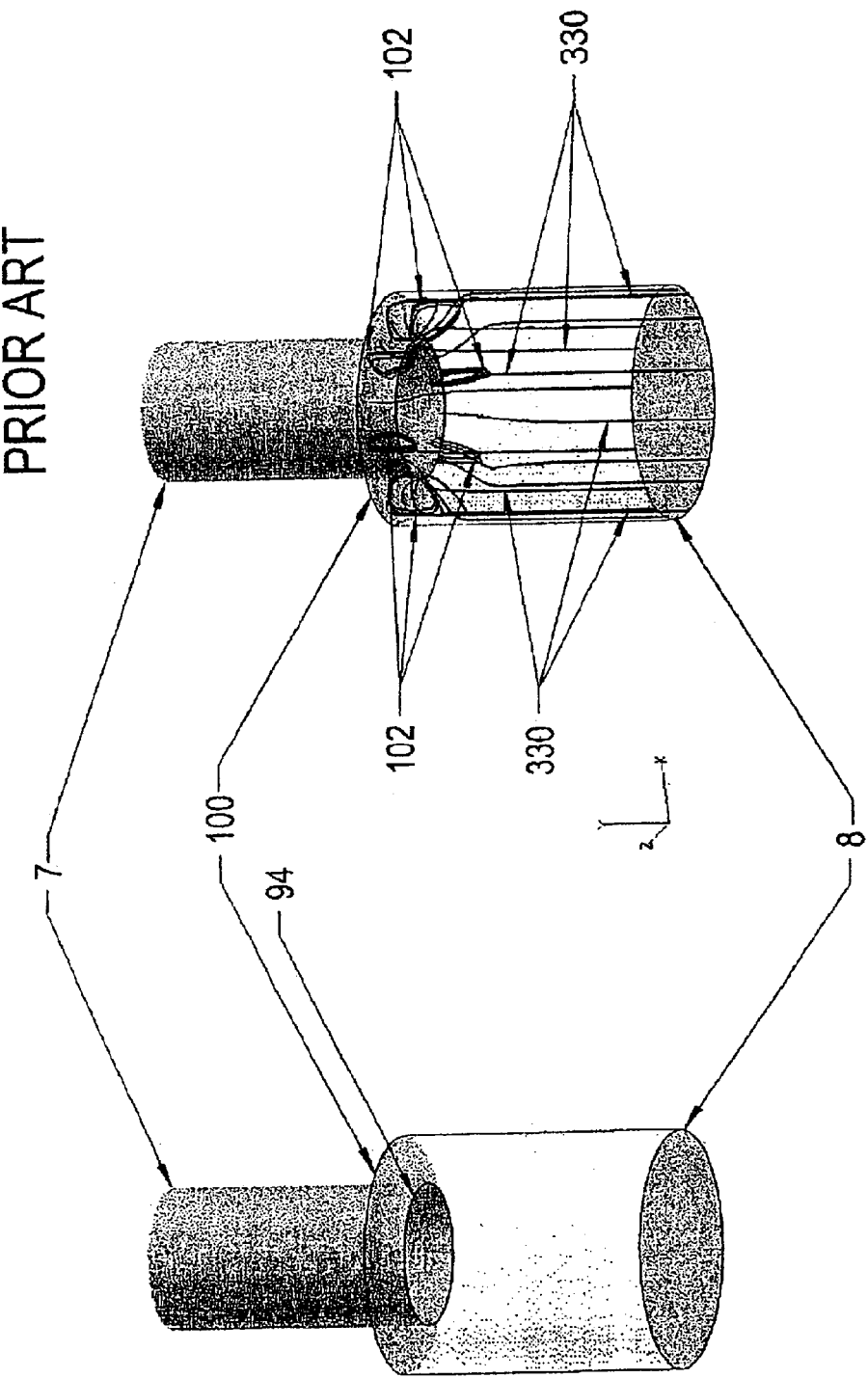
FIG. 33A shows a downcomer pipe and inlet pipe as known in the prior art.
FIG. 33B shows streamlines of glass flow as known in the prior art.

FIG. 33B shows streamlines of glass flow (330) from this vortex (102) as experienced in the prior art when the centerline of the downcomer pipe (7) is centered with the centerline of the inlet pipe (8). The flow of glass (330) from the vortex (102) is evenly distributed around the inside surface of the inlet pipe (8).

Figures 34A, 34B:
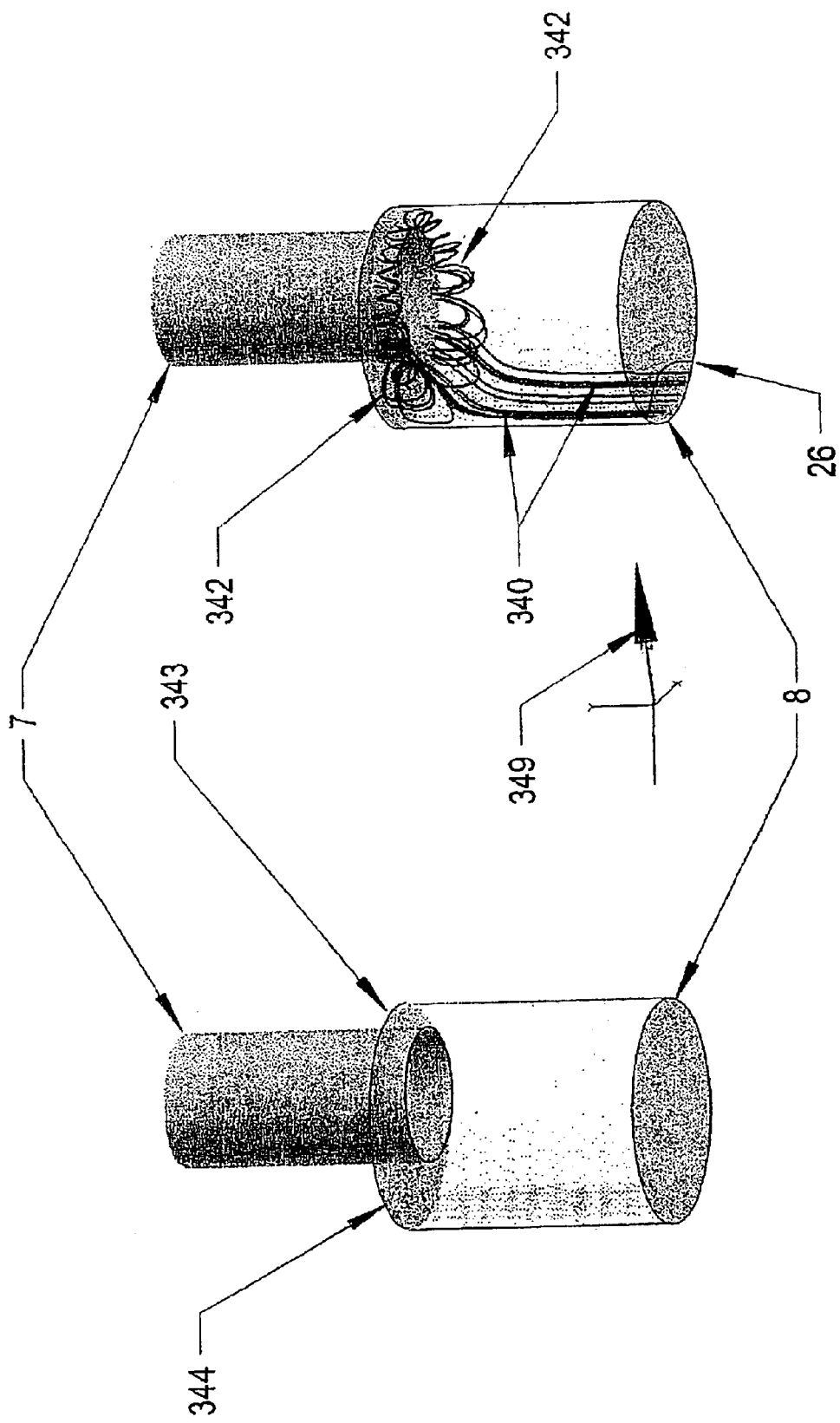
FIG. 34A shows a downcomer pipe and an inlet pipe which are not concentric in an embodiment of the present invention.
FIG. 34B shows streamlines of glass flow when the downcomer and inlet pipes are not concentric in the embodiment of FIG. 34A.

FIGS. 34A and 34B show an embodiment of the present invention where the centerline of the downcomer pipe (7) is not centered with the centerline of the inlet pipe (8). The single vortex divides into two vortices (342), one on each side of the downcomer pipe (7). The flow in these vortices is no longer isolated from the main stream of glass flow. Glass enters each vortex where the pipes are closest (343) and exits where they are widest apart (344). In addition to the rotational flow of the vortices, there is a migration of flow in the direction to where the pipes are widest apart (344). This migration of flow is not as strong as is discussed in subsequent embodiments of this invention, however, the phenomenon may be used as a method of altering the flow of glass when used with prior art downcomer and inlet pipes. Direction arrow (349) shows the orientation of the trough from the inlet end to outlet end. The off center orientation of the downcomer pipe (7) relative to the inlet pipe (8) is such that the glass exiting the vortices (340) passes through area (26), thus it will flow along the bottom of the trough (9) to the unusable far end (27) of the sheet.

Figures 35A, 35B, 35C:
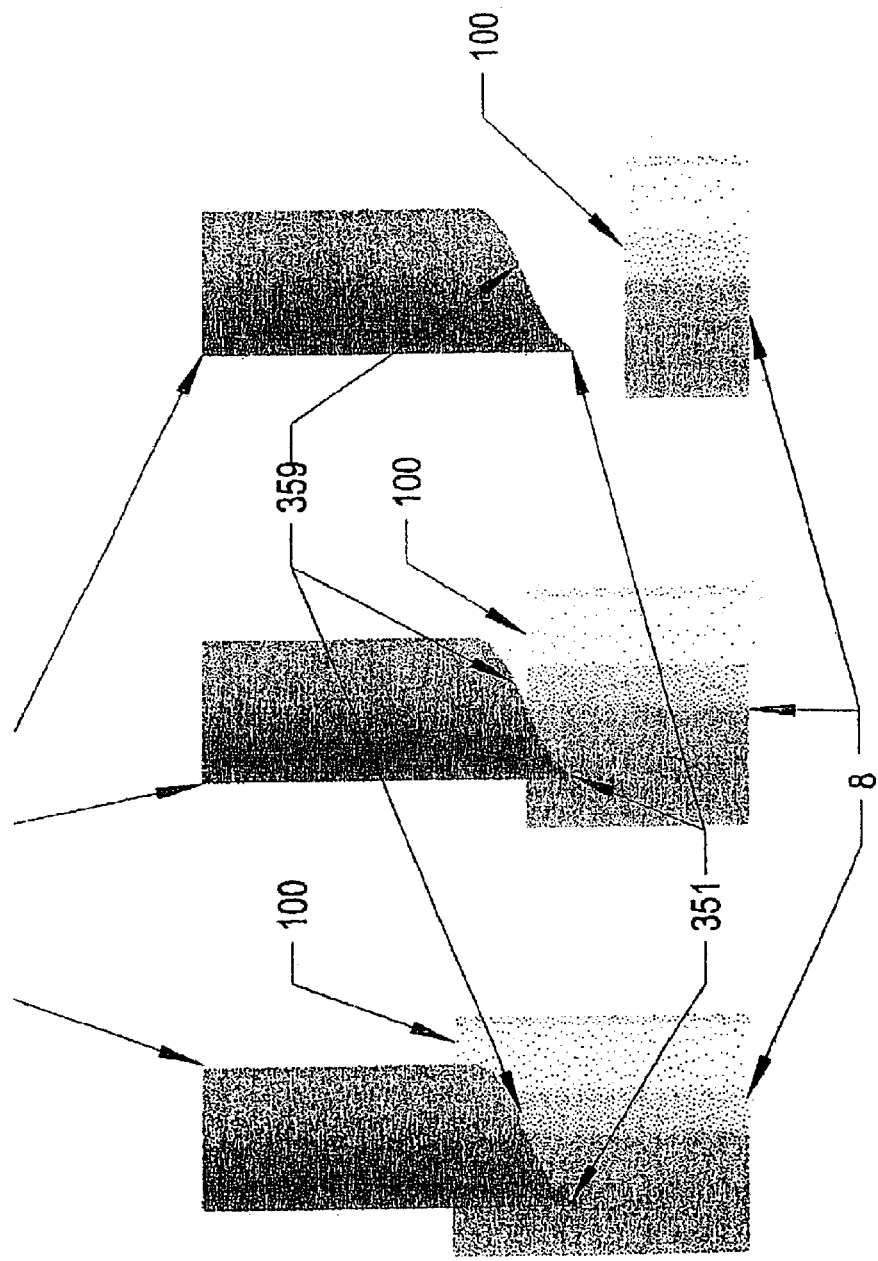
FIG. 35A shows a downcomer pipe with a single downward extension submerged in the inlet pipe glass in an embodiment of the present invention.
FIG. 35B shows a downcomer pipe with a single downward extension partially submerged in the inlet pipe glass in an embodiment of the present invention.
FIG. 35C shows a downcomer pipe with a single downward extension substantially above the glass free surface in the inlet pipe glass in an embodiment of the present invention.
Figures 36A, 36B:
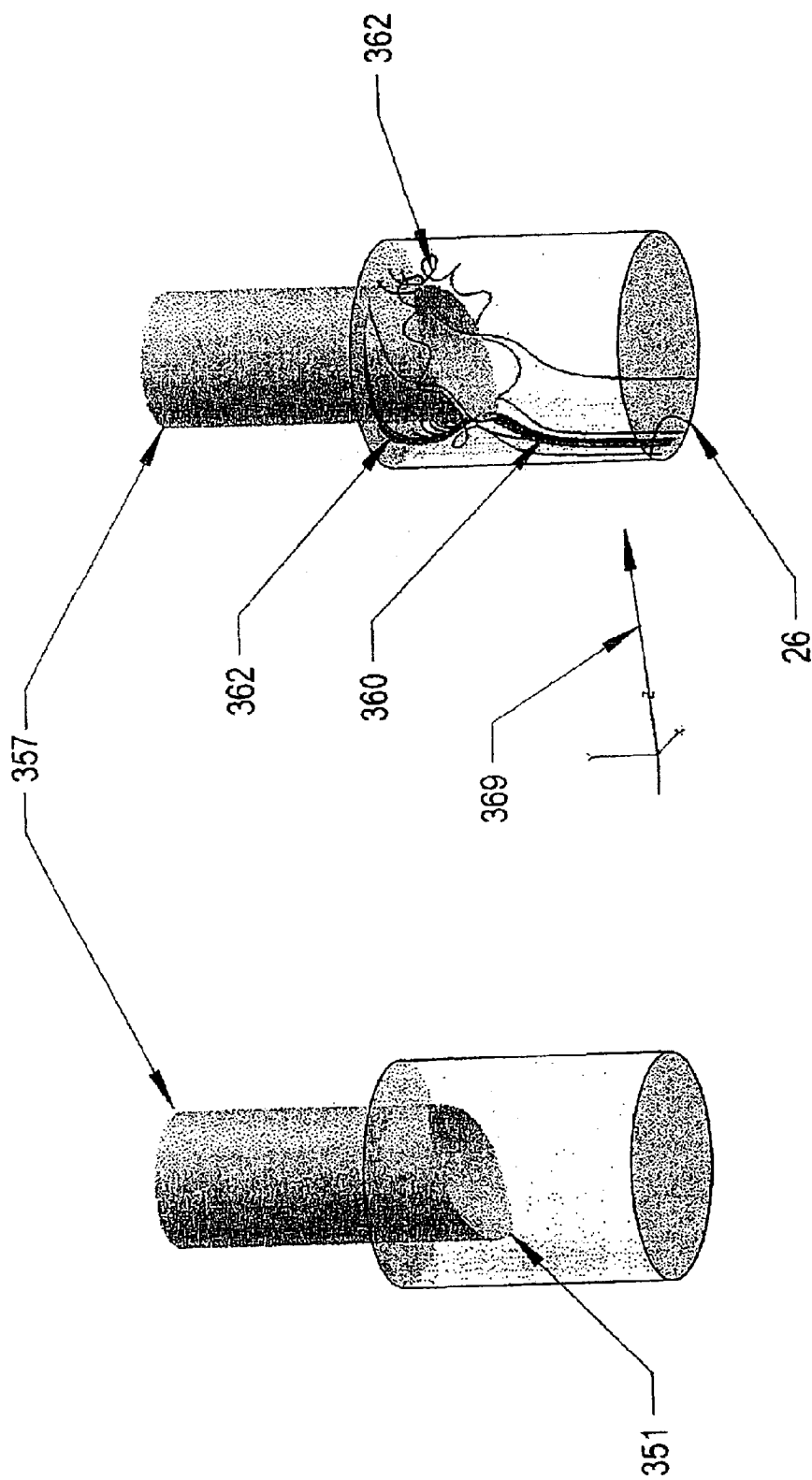
FIG. 36A shows a downcomer pipe with a single downward extension submerged in the inlet pipe glass in an embodiment of the present invention.
FIG. 36B shows the streamlines of glass flow in the embodiment shown in FIG. 36A.

FIGS. 35A, 36A and 36B show an embodiment of the present invention where the centerline of the downcomer pipe (357) is centered with the centerline of the inlet pipe (8), but where the bottom (359) of the downcomer pipe (357) is cut at an angle to the centerline as illustrated in FIG. 35A. The single vortex divides into two vortices (362), one on each side of the downcomer pipe (357). The migration of flow in the vortices is toward the downward extending tip (351) of the downcomer pipe. Direction arrow (369) shows the orientation of the trough from the inlet end to outlet end. The orientation of the downward extending tip (351) of the downcomer pipe (357) relative to the inlet pipe (8) is such that the glass exiting the vortices (360) passes through area (26), thus it will flow along the bottom of the trough (9) to the far end (27) of the sheet.

In FIG. 35A, the bottom (359) of the downcomer pipe (357) is immersed below the free surface of glass (100) in the inlet pipe (8). FIG. 35B shows an additional embodiment of this invention whereby the bottom (359) of the downcomer pipe (357) is partially immersed in the free surface of glass (100) in the inlet pipe (8). FIG. 35C shows an additional embodiment of this invention whereby the bottom (359) of the downcomer pipe (357) is substantially above the free surface of glass (100) in the inlet pipe (8).

Figures 37A, 37B:
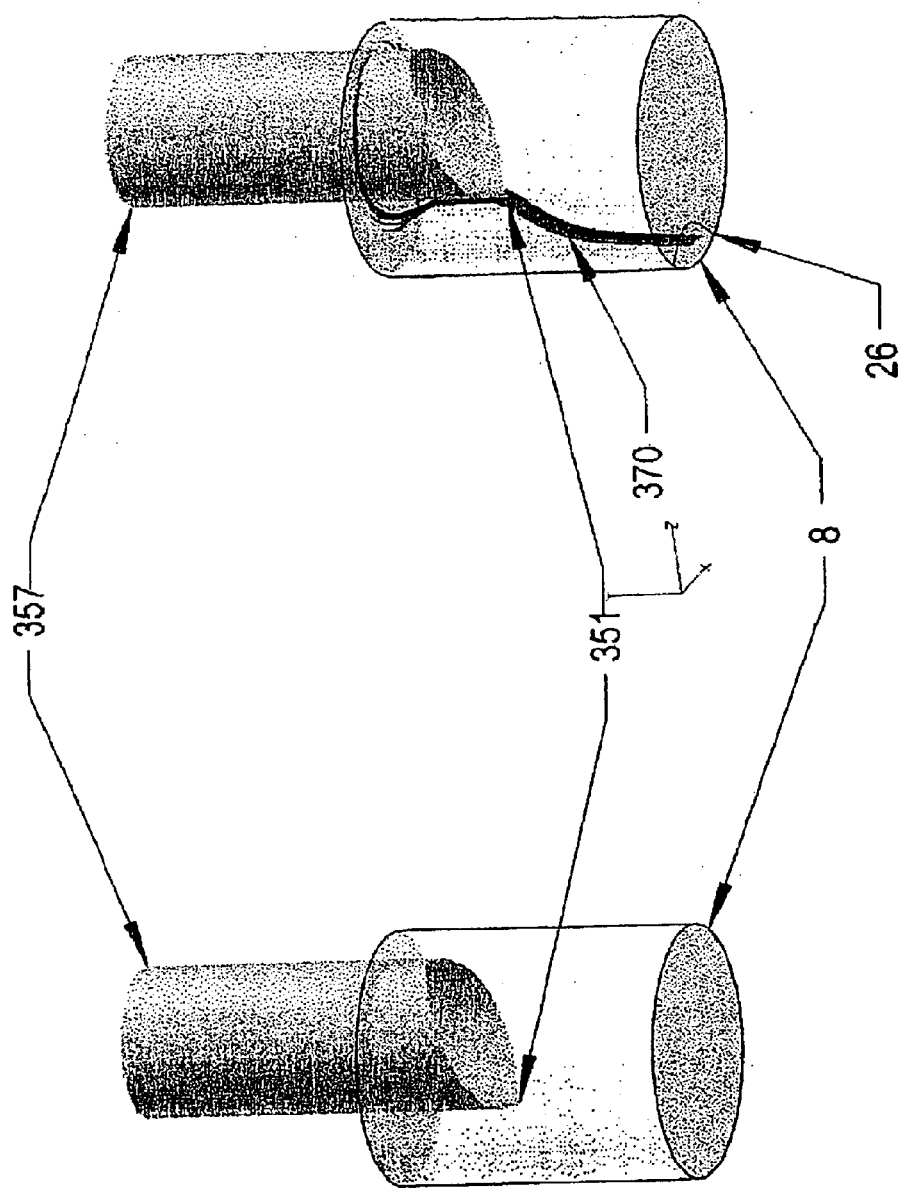
FIG. 37A shows a downcomer pipe with a single downward extension off center and submerged in the inlet pipe glass in an embodiment of the present invention.
FIG. 37B shows the streamlines of glass flow for the embodiment of the present invention shown in FIG. 37A.

FIGS. 37A and 37B show a downcomer pipe (357) with a single downward extending tip (351) located off center with respect to the inlet pipe (8). The glass exiting the vortices (370) is further concentrated into zone (26).

The altered shape of the bottom end of the downcomer pipe and/or the inlet pipe could also be utilized in combination with the embodiment shown in FIGS. 9A through 9C. In that embodiment, the bottom end (94) of the downcomer pipe (97) is located substantially above the glass free surface (90) in the forming apparatus inlet pipe (98).

FIG. 38A and FIGS. 39A and 39B show an embodiment of the present invention where the bottom end (389) of the downcomer pipe (387) is shaped to influence the shape of the vortices in the quiescent zone (101) between the downcomer pipe (387) and the forming apparatus inlet pipe (8). The bottom end (389) has a non-flat and non-linear shape. In a preferred embodiment, there are three V shaped downward extensions (391). Direction arrow (399) shows the orientation of the trough from the inlet end to outlet end. The three downward extensions (391) effectively divide the single vortex into three sets of two separate vortices (392). The downward extensions are oriented relative to the trough such that the flow dynamics of the glass exiting the sets of vortices (392) is directed to the unusable ends of the sheet (25) and (27). Although a V shape or a scallop shape is preferred, any shape that induces a vortex, or any downcomer pipe discontinuity would work in the present invention.

FIG. 39B shows streamlines of glass flow (394) and (396) from these three sets of vortices. Referring also back to FIG. 2, the flow of glass (394) from the two front sets of vortices is concentrated such that it flows to regions (24) in the inlet pipe and thus ends up in the inlet end (25) in the sheet. The flow of glass (396) from the back set of vortices is concentrated such that it flows to region (26) in the inlet pipe and thus ends up in the outlet end (27) in the sheet. The downcomer pipe bottom preferably has a V shape with the three extended V shapes (391) coincident with the exit glass flow (394) and (396) from the vortices (392).

In FIG. 38A, the bottom (389) of the downcomer pipe (387) is immersed below the free surface of glass (100) in the inlet pipe (8). FIG. 38B shows an additional embodiment of this invention whereby the bottom (389) of the downcomer pipe (387) is partially immersed in the free surface of glass (100) in the inlet pipe (8). FIG. 38C shows an additional embodiment of this invention whereby the bottom (389) of the downcomer pipe (387) is substantially above the free surface of glass (100) in the inlet pipe (8). Having the option to either submerge the bottom end (389) in glass, partially submerge the bottom end (389) in glass, or locate the bottom end (389) substantially above the free surface provides versatility in the control of the size, location, and activity of the vortices. Additionally, the downcomer pipe (387) may be displaced horizontally relative to the inlet pipe (8) or (408) such that they are not concentric as shown in FIGS. 34A.

Figure 40A:
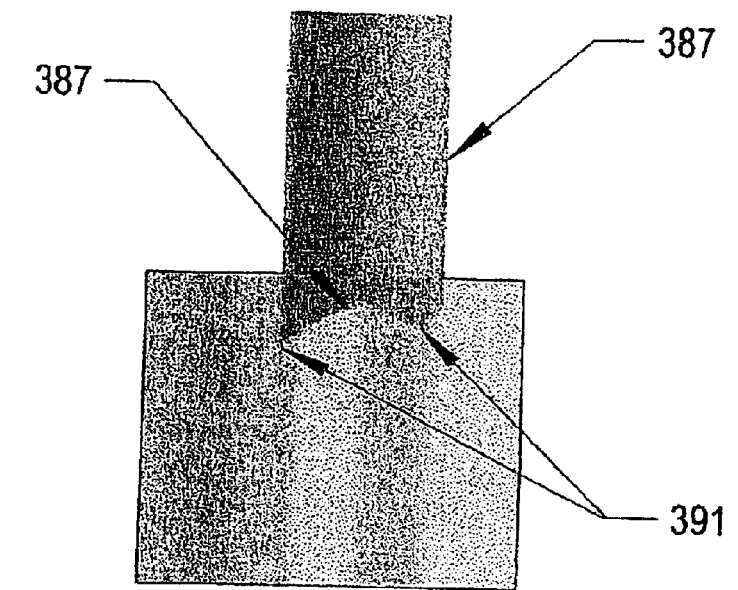
FIG. 40A shows another embodiment of the present invention whereby the shape of the inlet pipe is modified.
Figure 40B:
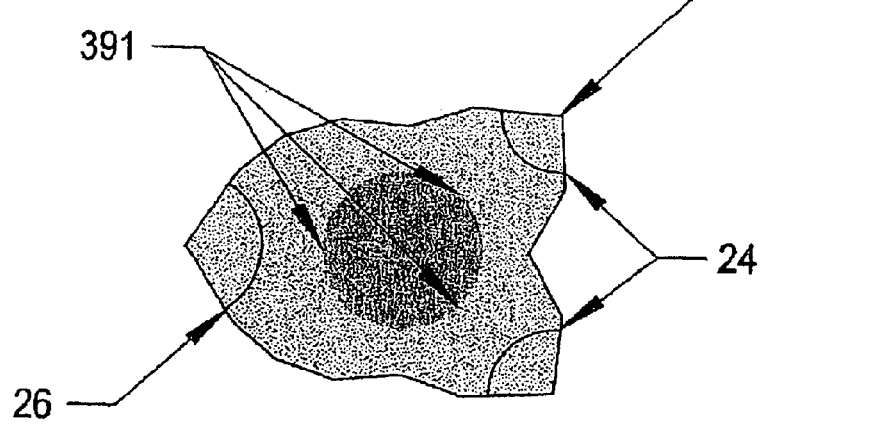
FIG. 40B shows a view looking down on the inlet pipe of FIG. 40A.

FIGS. 40A, 40B, 41A and 411B show an alternative embodiment with a modification to the shape of the inlet pipe. In this embodiment, the inlet pipe (408) is radially extended, in three locations, each adjacent to and corresponding to the three V shapes (391) at the bottom end of the downcomer pipe (387). FIG. 40B shows top view of the altered shape of the inlet pipe (408). This modification to the inlet pipe creates a set of vortices for each extension much like what is created when the downcomer pipe is off center as discussed earlier.

Figures 41A, 41B:
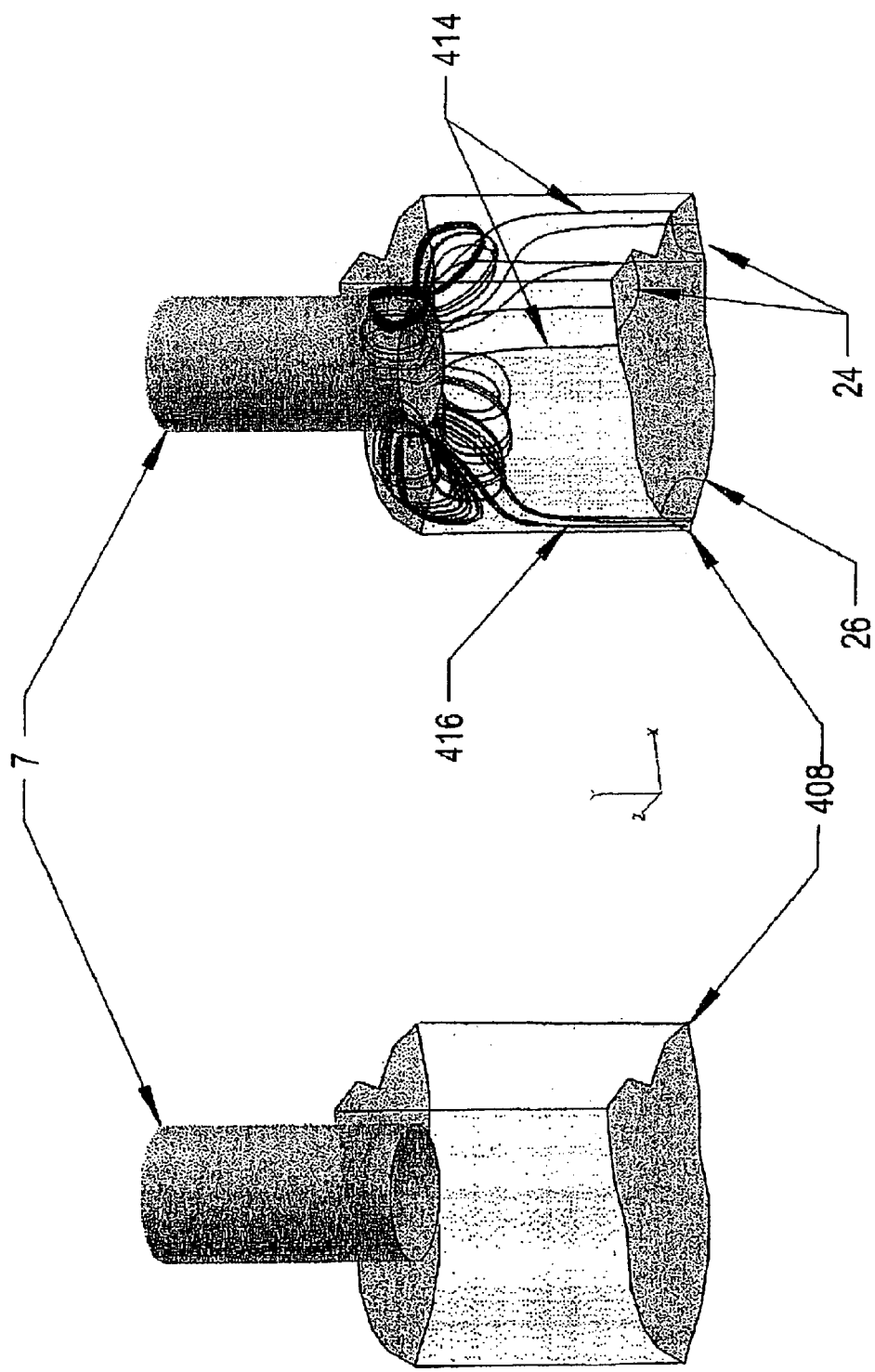
FIG. 41A shows another view of the inlet pipe of FIG. 40A.
FIG. 41B shows the streamlines of glass flow in the embodiment shown in FIGS. 40A, 40B and 41A.

FIG. 41B shows streamlines of glass flow (414) and (416) from these three sets of vortices. Referring also back to FIG. 2, the flow of glass (414) from the two front sets of vortices is concentrated such that it flows to regions (24) in the inlet pipe and thus ends up in the inlet end (25) in the sheet. The flow of glass (416) from the back set of vortices is concentrated such that it flows to region (26) in the inlet pipe and thus ends up in the outlet end (27) in the sheet. Although the modification to the inlet pipe (408) is only shown with respect to three downward extensions, the inlet pipe could be similarly modified to correspond to either one or two downward extensions in the bottom of the downcomer pipe.

FIGS. 42A and 42B show an alternative embodiment with a modification to the shape of the bottom of the downcomer pipe (387) and a modification to the shape of the inlet pipe (408). FIG. 42B shows streamlines of glass flow (424) and (426) from these three sets of vortices. The simultaneous incorporation of modifications to the downcomer pipe (387) and the inlet pipe (408) further concentrate the streamlines of glass flow (424) and (426) in areas (24) and (26), respectively. Shaping both the downcomer pipe (387) and the inlet pipe (408) facilitates additional versatility in the shape and performance of the vortices, so that the vortices may be larger and thus more active.

The altered shape of the bottom end of the downcomer pipe and/or the inlet pipe could also be utilized in combination with the embodiment shown in FIGS. 9A through 9C. In that embodiment, the bottom end (94) of the downcomer pipe (97) is located substantially above the glass free surface (90) in the forming apparatus inlet pipe (98).

Although not shown, the invention also contemplates the use of two downward extensions. For each extension, or V shape, two vortices are formed. So, a total of four vortices would be formed if two downward extensions were utilized. The downward extensions would be oriented to concentrate the flow exiting the vortices in either both zones (24) or zone (26) and one zone (24).

Reducing Degradation of Sheet Glass Forming Apparatus

Referring now to FIGS. 12 through 16, another embodiment of the present invention controls the flow distribution of glass on the forming apparatus in a manner such that the degradation of the production apparatus and the deformation of the forming trough that results from thermal creep is compensated by thermal control of the glass flow distribution.

U.S. Pat. No. 3,338,696 relies on a specifically shaped forming trough to distribute the glass in a manner to form a sheet of uniform thickness. The basic shape of this forming trough is described in detail in U.S. Pat. No. 3,338,696. The flow of glass on the sides of the forming apparatus is strongly influenced by surface tension and body forces. The sheet glass forming process is conducted at elevated temperatures, typically between 1000° C. and 1350° C. At these temperatures, the refractory materials used for construction of the forming trough exhibit a property called thermal creep, which is deformation of the material cause by applied stress. Thus, the trough deforms under the stress caused by its own weight and the stress caused by the hydrostatic pressure of the glass in the trough.

The materials used in the construction of the other parts of the forming apparatus also degrade (warp, crack, change thermal properties, etc.) in an indeterminate way, which has an adverse effect on thickness distribution. The thickness control system of U.S. Pat. No. 3,682,609 can compensate for small thickness errors, but it can only redistribute the glass over distances on the order of 5–10 cm. To significantly effect thickness distribution over the entire width of the glass sheet, the flow of the molten glass over the weirs must be controlled.

This embodiment of the invention solves this problem by introducing a precise thermal control system to redistribute the flow of molten glass at the weirs, which is the most critical area of the forming process. This thermal control effectively counteracts the degradation of the sheet forming apparatus which inevitably occurs during a production campaign.

FIG. 12A shows the side view of the forming trough (9) with arrows showing the flow of molten glass (10) through the forming trough (9) to the side weirs (115). FIG. 12B shows a section through the center of the forming trough (9) which shows the different zones for the control of molten glass (10) as it flows through the forming apparatus. Zone (121) is the flow from the inlet end of the trough to the far end, zone (122) is the flow over the weirs, zone (123) is the flow down the outside of the forming trough, and zone (124) is the molten glass (11) being pulled off the root (116) and cooling into a solid sheet (12). The effect on the solid glass sheet (12) thickness caused by heating or cooling the molten glass (10) as it passes through each zone is different. Adding energy to (raising the temperature of) or removing energy from the molten glass (10) as it flows from the inlet end to the far end of the forming trough (9) in zone (121) produces concave or convex sheet thickness profiles respectively. The period of the thickness profile changes effected in zone (121) is on the order of the length of the trough.

Changes to the energy flux to the molten glass (10) as it flows over the weirs (115) in zone (122) has a powerful effect on the resultant solid glass sheet thickness distribution. Localized cooling of the glass in zone (122) effectively produces a dam, which has a large effect on glass flow. This is an extremely sensitive zone, and any control strategy other than isothermal must be carefully designed. Zone (123) is important to return the glass to a uniform temperature distribution, substantially linear in the longitudinal direction, in order that the drawing process at the root (116) is consistent. Differential cooling in zone (124) is the object of U.S. Pat. No. 3,682,609 and is effective in making small thickness distribution changes. Cooling at given longitudinal location affects the thickness at that location in one direction and conversely to the glass on each side of the location. The effect is longitudinal redistribution of the glass over a distance on the order of centimeters.

FIGS. 13A and 13B show an embodiment of this invention whereby the top and sides of the muffle (132) are shaped more closely to the outside surface of the molten glass (10) that is flowing in and on the forming trough (9). The muffle (132) is heated by heating elements in heating chamber (131). The primary heat transfer medium in the muffle chamber (113) is radiation. By designing the muffle (132) to conform closely to the outside shape of the molten glass (10), energy may be directed to targeted areas of the molten glass (10), thereby effecting greater control of temperature distribution. The heating elements in the heating chamber (131) have adequate power to balance the energy flux to the forming trough (9) and thus create suitable temperature conditions.

FIGS. 14A and 14B show an embodiment of this invention which effects localized cooling of the molten glass (10) as it passes over the weirs (115) in zone (122). The muffle (132) configuration of FIGS. 13A and 13B is used. Air cooling tubes (142), similar in function to those air cooling tubes (141), which are described in U.S. Pat. No. 3,682,609, are directed at the heating chamber side of the muffle (143) just above the molten glass (10) flowing over the weirs (115). Localized cooling of the glass in this location effectively produces a localized dam, which has a significant effect on the thickness distribution of the solid glass sheet.

Figures 15A, 15B:
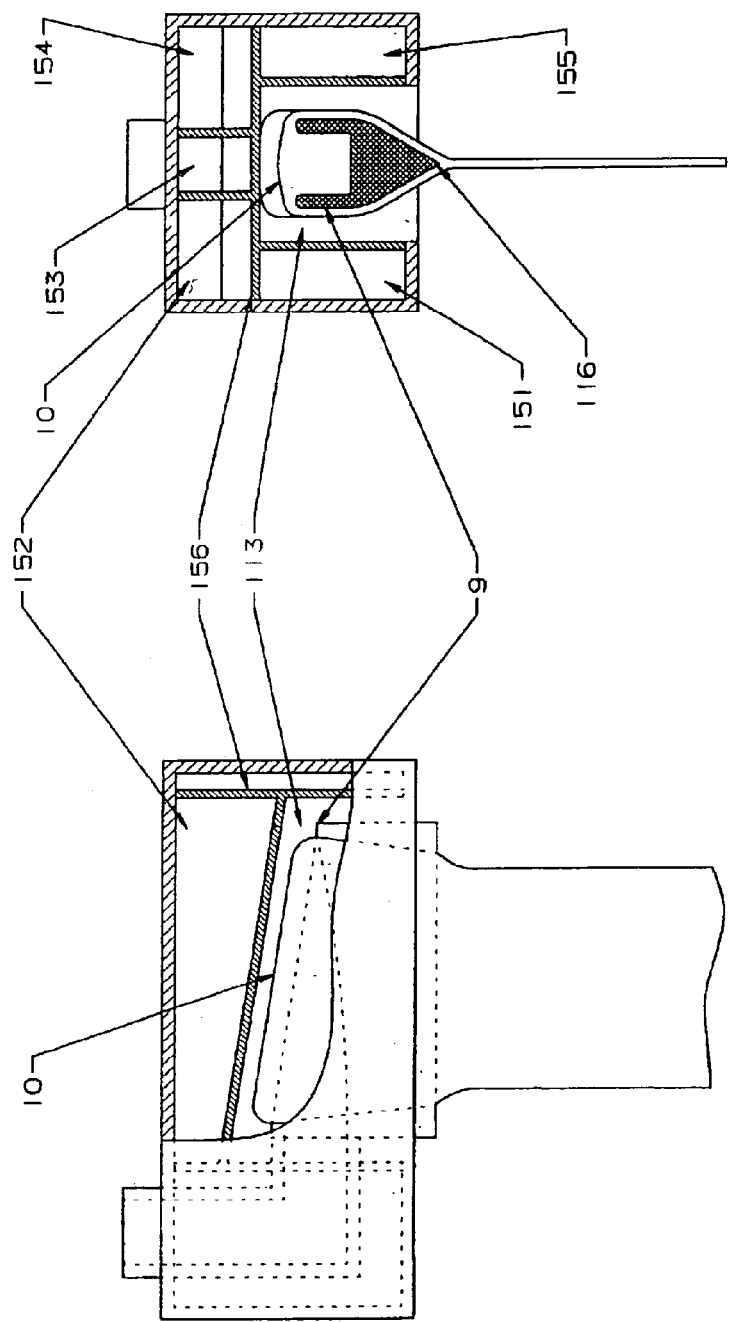
FIG. 15A shows a muffle with multiple heating chambers in a preferred embodiment of the invention.
FIG. 15B shows a section of FIG. 15A.
Figure 23B:
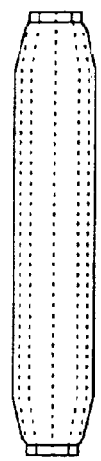
FIG. 23B shows a top view of FIG. 23A.
Figures 23C, 23D, 23E, 23F, 23G:
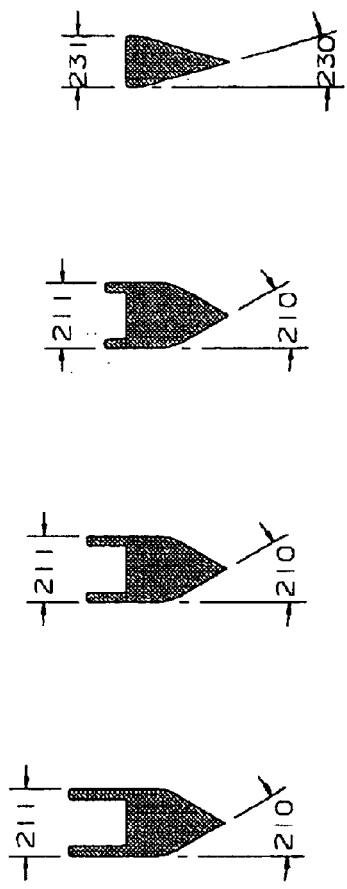
FIG. 23C shows a cross-section of the trough design shown in FIG. 23A across lines C—C.
FIG. 23D shows a cross-section of the trough design shown in FIG. 23A across lines D—D.
FIG. 23E shows a cross-section of the trough design shown in FIG. 23A across lines E—E.
FIG. 23F shows a cross-section of the trough design shown in FIG. 23A across lines F—F.
FIG. 23G shows a cross-section of the trough design shown in FIG. 23A across lines G—G.
Figure 23A:
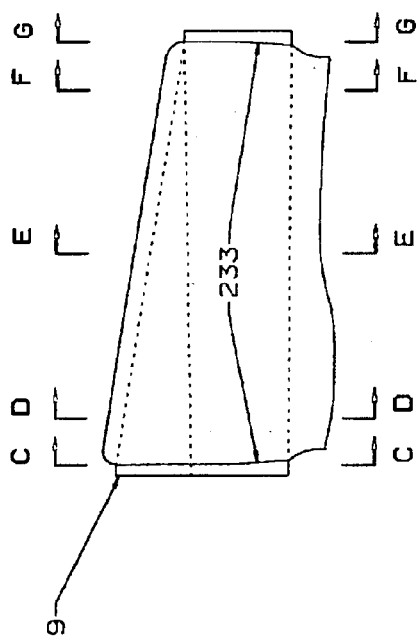
FIG. 23A shows an alternate embodiment of the present invention with further modified ends.
Figures 28A, 28B:
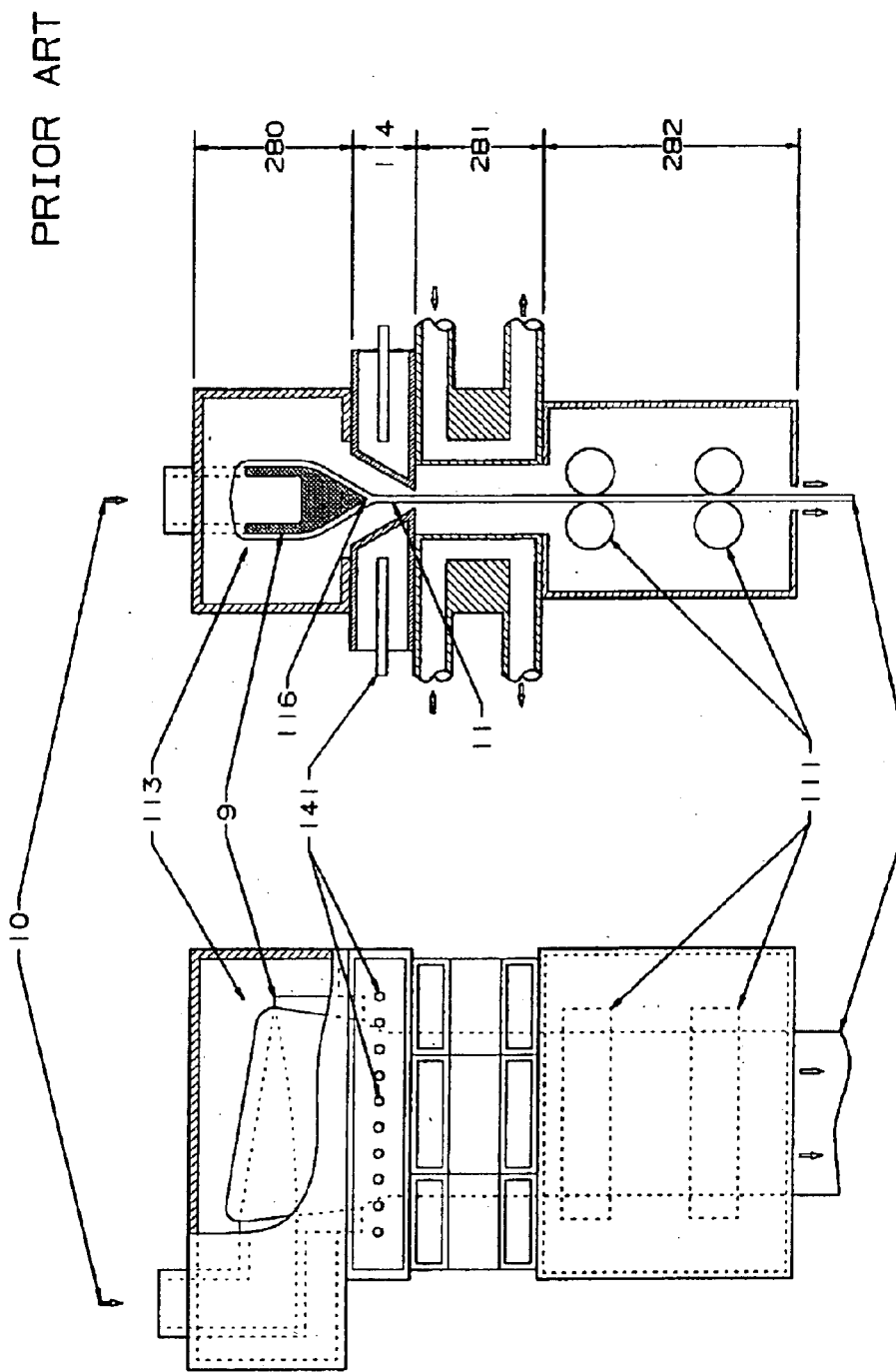
FIG. 28A illustrates the cooling process in "The Overflow Process" glass sheet forming system as known in the prior art.
FIG. 28B shows a section of FIG. 28A.

FIGS. 15A and 15B show an embodiment of this invention whereby the multi-chamber muffle (156) is designed with separate heating chambers (151–155) to control the temperature of the molten glass (10) as its passes through the various individual zones of the forming process. These zones (121–124) are described in FIGS. 12A and 12B. The multi-chamber muffle (156) has five heating chambers (151–155). Heating chamber (153), located over the top of the forming trough (9), effects the flow of glass from the inlet end to the far end of the forming trough (9), (zone (121)). The heating chambers (152) and (154) over the top of the weirs (115) effect the flow over the weirs (115) (zone (122)), and the heating chambers (151) and (155) on each side of the trough (9) are used to balance the temperature longitudinally (zone (123)). All the heating chambers (151–155) have heating elements with adequate power to balance the energy flux to the forming trough (9) and thus create suitable temperature conditions.

FIGS. 16A and 16B show an embodiment of this invention which affects localized cooling to the molten glass (10) as it passes over the weirs (115). This is zone (122) shown in FIG. 12B. The multi-chamber muffle (156) configuration of FIGS. 15A and 15B is used. Specially designed radiant coolers (161), installed in heating chambers (152) and (154), have the ability to selectively cool the heating chamber side of the muffle surface (162) opposite the weirs (115). The radiant cooler has multiple adjustments (164) such that the temperature of its bottom surface can be varied in the longitudinal direction. The distribution of the heat transfer between the radiant cooler (161) and the muffle surface (162) is a function of the distance (163). By varying the distance (163) between the cooling device (161) and the muffle surface (162), the cooling effect may be attenuated to adjust sensitivity. Although it is not illustrated, the cooling devices (161) are replaceable during operation. The radiant coolers (161) could alternately be inserted from the side instead of the top with a suitable change in the design of the heating chambers (152), (153) and (154).

In an alternative embodiment, the air cooling tubes (142) of FIG. 14A and 14B could be used with the muffle (156) design of FIGS. 15A and 15B, and the radiant coolers (161) of FIGS. 16A and 16B could be used with the muffle (132) configuration of FIGS. 13A and 13B.

Reducing Thickness Variations in the Glass Sheet

Referring to FIGS. 17 through 20, another embodiment of the present invention supports and stresses the forming apparatus in a manner such that the deformation that results from thermal creep has a minimum effect on the thickness variation of the glass sheet. This embodiment introduces a counteracting force to these stresses on the trough in a manner such that the thermal creep which inevitably occurs has a minimum impact on the glass flow characteristics of the forming trough. The invention is designed such that this counteracting force is maintained through an extended period of the production campaign. Thus, sheet glass may be manufactured for a longer time with the same forming trough.

The refractory materials from which the forming trough and its support structure are made have high strength in compression and low strength in tension. Like most structural materials, they also change shape when stressed at high temperature. This embodiment was developed due to the material characteristics and how these characteristics affect the manufacturing process.

There are two fundamental concepts in this embodiment of the invention. First, applying a force and/or moment to the ends of the trough counteracts stress caused by the forces of gravity, thus minimizing the effect on molten glass flow caused by thermal creep. Second, the invention uses compression members shaped such that thermal creep, to which the compression members are also subject, does not substantially alter the application of said force and/or moment.

FIGS. 17A and 17B illustrate the typical effects of thermal creep on the shape of the trough. FIG. 17A shows that the forming trough (9) sags in the middle such that the top of the weirs (115), and the root (116) are now curved (171) and the trough bottom (117) has a change in curvature (171). This curvature (171) causes the molten glass (10) to no longer flow with constant thickness (172) over the weirs (115). This curvature (171) allows more glass to flow over the middle of the weirs resulting in an uneven sheet thickness distribution. FIG. 17B shows how the hydrostatic force (174) from the molten glass (10) in the forming trough (9) forces the weirs (115) to move apart at the top. This allows more glass to flow to the middle of the forming trough (9) making the thickness in the middle even greater.

FIGS. 18A through 18D show a sheet glass forming apparatus (180) as known in the prior art. The forming trough (9) is supported by an inlet end supporting block (181) and a far end supporting block (182). The forming trough (9) is the equivalent of a beam, which is subject to a bending stress from its own weight, from the weight of the glass in and on the trough, and from drawing forces. Because of the low tensile strength of the trough material, a compressive force (183) is applied to the lower half of the forming trough (9) to force the material at the root (116) of the forming trough (9) into compression. Typically the inlet end support block (181) is restrained in the longitudinal (horizontal) direction and the compression force (183) is applied to the far end support block (182). The prior art considers only preventing tension at the root (116) of the forming trough (9), and then only the stress at start-up. Little consideration is made for the effects on stress of the thermal creep of the forming trough (9) and its support blocks (181) and (182).

FIGS. 19A through 19D show an embodiment of a sheet glass forming apparatus (190) that has shaped end support blocks (191) and (192). The inlet end shaped support block (191) is restrained in the longitudinal direction. A compression force (193) is applied to the far end shaped support block (192). The shape of the support block is designed in a manner to produce a force distribution in the forming trough (9) to substantially counteract the effect of the weight of the forming trough (9) and the molten glass (10). The applied force (193) is such that all material in the forming trough (9) is under substantially equal compression stress in the longitudinal direction. This stress causes the thermal creep to occur primarily in the longitudinal direction with little of the sagging shown in FIG. 17A. The forming trough (9) gets shorter due to the equal compressive stress in the longitudinal direction. The shaped support blocks are also subject to thermal creep. The cross section of the shaped support block is the same over substantially its entire length with equal compressive stress across its section. Thus as the shaped support block deforms from thermal creep, it continues to apply substantially the same force distribution to the forming trough (9).

FIGS. 20A through 20D show an embodiment of a sheet glass forming apparatus (200) that has four shaped end support blocks (201), (202), (204), and (205). The inlet end has three shaped support blocks (201), (204), and (205), all of which have longitudinal compression forces (206), (207), and (208) applied. A compression force (203) is applied to the far end shaped support block (202). The shape and loading of the support blocks (202) and (203) are designed to the same criteria as support blocks (191) and (192) in FIGS. 19A–19D. The two upper shaped support blocks (204) and (205) are attached to the inlet end of the weirs and are angled such that they exert an additional force on the weirs to counteract the affect of the hydrostatic forces which tend to spread the weirs apart. Although the blocks (204) and (205) are shown with an inward angle in the figures, they also could be angled outward without deviating from the spirit of the invention.

In a preferred embodiment, short (10–25% of length) transition zones (not shown) are at the trough ends of the shaped support blocks. In these transition zones, the cross-section of the shaped support block will change from that of the shaped support block to a shape that will suitably apply the design load to the trough block.

Referring back to FIGS. 17A through 20D, and also to FIGS. 51A through 55D, additional embodiments of the present invention support and stress the forming apparatus in a manner such that the deformation that results from thermal creep has a minimum effect on the thickness variation of the glass sheet. These embodiments introduce a counteracting force to stresses on the trough in a manner such that the thermal creep, which inevitably occurs, has a minimal impact on the glass flow characteristics of the forming trough. The invention is designed such that this counteracting force is maintained through an extended period of the production campaign. Thus, sheet glass may be manufactured for a longer time with the same forming trough.

FIGS. 51A through 51C illustrate the typical effects of thermal creep on the shape of the trough when the end support blocks impart different compression stress in the bottom of the trough. FIG. 51A shows that, with no compression loading, the forming trough (9) sags in the middle such that the top of the weirs (115) and the root (116) are now curved (171) and the trough bottom (117) has a change in curvature (171). This curvature (171) causes the molten glass (10) to no longer flow with constant thickness (172) over the weirs (115). This curvature (171) allows more glass to flow over the middle of the weirs resulting in an uneven sheet thickness distribution. FIG. 51B shows that sagging of the trough is minimized under the optimum compression loading (515) of the bottom of the trough. FIG. 51C shows that if too much load (516) is applied to the bottom of the trough the bottom is compressed excessively, thus producing a convex shape (511) to the trough weirs and bottom.

FIGS. 52A through 52D show a sheet glass forming apparatus (520) that represents prior art. The forming trough (9) is supported by an inlet end supporting block (521) and a far end supporting block (522). The inlet end support block (521) rests on the inlet end structure (523) and is restrained in the longitudinal (horizontal) direction by an adjustment screw (524). The far end support block (522) rests on the far end structure (525), and an far end compression force (526) is applied to the far end of the trough by support block (522) at surface (527). The force (526) is generated by the far end force motor (528) acting between the support block (522) and the far end structure (525). "Force motor" as used herein, represents a device that generates a substantially constant force and is adjustable. For example, the force motor may be in the form of an adjustable spring, an air cylinder, a hydraulic cylinder, an electric motor, an adjustment screw, or a weight and lever system. Present practice considers primarily preventing tension at the root (116) of the forming trough (9), and only the stress at start-up.

FIGS. 53A through 53D show the typical shape of a prior art sheet glass forming apparatus (520) resultant from the effects of thermal creep under the influence of the far end compression force (526). The inlet end shaped support block (521) is restrained in the longitudinal direction by the adjusting screw (524) and applies an inlet end compression force (536) to surface (537). The trough (9) sits on inlet block (521) at surface (531). The trough (9) sits on far block (522) at surface (532). The trough inlet pipe (8) is also constrained in the horizontal direction in order to maintain a seal between the inlet pipe (8) and the trough (9). Thus, the inlet end structure (523) applies an additional inlet end compression force (538) at surface (539). At the start of a production campaign the adjusting nut (524) is set such that the inlet end force (536) and the far end force (526) are substantially equal and opposite. As the production campaign progresses, the trough (9) starts to deform via thermal creep under the influence of gravity and the applied horizontal compression forces. The distance between surfaces (527) and (537) becomes less. As this occurs, the force (538) at surface (539) between the inlet pipe (8) and the inlet end structure (523) becomes greater as it absorbs a portion of the horizontal force from the force (526) applied at the far end of the trough. As the sum of the horizontal forces must be zero, force (536) at surface (537) decreases. The loading on the trough is no longer symmetrical, thus contour of the weirs (115), trough bottom (117), and root (116) take an S-shape (533). The S-shape is typical, however, it can vary significantly depending on the rigidity of the inlet end structure (523) at surfaces (537) and (539).

There are three different groups of embodiments to correct the design short-comings of the prior art.

The first embodiment, which may be used with a prior art apparatus, periodically adjusts the inlet end adjustment screw (524) to compensate for the shortening of the distance between surfaces (527) and (537). The horizontal displacement of surface (537) may be measured and a corresponding adjustment of the screw (524) is made. Ideally the horizontal displacement of surface (537) will be halved and there will be a corresponding negative horizontal displacement of surface (527). The torque on the adjustment screw (524) may also be monitored, however, the friction at surface (521) will degrade the accuracy of torque as a indicator of the force (536) actually applied to the trough (9). This embodiment of the invention is counter intuitive as adjusting the adjustment screw (524) in a direction to lessen the integrity of the glass seal between the inlet pipe (8) and the trough (9) will make operating personnel nervous.

A second and better embodiment of the invention, which requires a design and construction change to the forming apparatus, controls the relative horizontal rigidity and resistance to thermal creep of the inlet end structure (523) at points (537) and (539). This embodiment changes the design to make the inlet end structure (523), which supports the adjusting bolt or screw (524) and applies the force (536) to the trough at point (537), substantially more resistant to thermal creep than the structure at point (539), which effects a glass seal between the inlet pipe (8) and the trough (9). This causes the force (536) at the inlet face of the trough (537) to remain more equal to the far end force (526), thus maintaining the primary compression force near the root (116) of the trough (9). The force at point (539) rises but is limited such that it does not rise significantly above the level required to effect a satisfactory glass seal between the inlet pipe (8) and the trough (9).

In this embodiment, the refractory structure (523) at the point (539), that comprises the support force (538) for the glass seal, is designed to accommodate a sufficient amount of thermal creep such that the inlet pipe (8) and point (539) move in the same direction as the far end of the trough (527), thus allowing the adjustment bolt (524) to continue to provide a compressive force to the bottom of the trough inlet end at point (537) as points (527) and (537) move closer together. The structure (523) at point (539) must be sufficiently stiff to maintain the glass seal, yet yield enough such that force (538) does not increase significantly, thus subtracting from force (536).

The third and best improvement over the prior art is a group of embodiments, which represent a substantial design change, and, with the use of multiple force motors and low friction design concepts, enable the compressive forces (526) and (536) at the root (116) of the trough (9) to remain consistently at the desired levels throughout the production campaign.

This group of embodiments applies a substantially equal and opposite compression force to each end of the bottom of the trough to negate the thermal creep, thus minimizing the sagging of the trough and its effect on molten glass flow. This is accomplished in a manner which has low frictional forces over the life of the production campaign.

FIGS. 54A through 54D show a sheet glass forming apparatus (540), where the weight of the trough is supported at the inlet end by the inlet end structure (523) at surface (541). Additionally, it is constrained horizontally by a small compression force (538) at surface (539). The weight of the trough is supported at the far end by the far end structure (525) at surface (542). Surface (542) is designed to have very low friction in the horizontal direction, thus contributing negligible force in the horizontal direction. The inlet end compression force (536) is applied to the bottom of the trough by a compression block (543), which is designed to have low friction in the direction of the applied force, designated as "free-floating" herein. The inlet end compression force (536) is generated by the inlet end force motor (548). The far end compression force (526) is applied to the bottom of the trough by the free-floating compression block (544). The far end compression force (526) is generated by the far end force motor (528). The far end compression force (526) must be slightly greater than the inlet end compression forces (536) to compensate for the inlet pipe compression force (538). The trough bottom compression forces (526) and (536) are applied friction free and can be maintained at the same and/or any preprogrammed level throughout a production campaign. Note that the cross-sectional shape of the inlet end compression block (543) and the far end compression block (544) is the same as that of the trough where the forces are applied to the trough. This minimizes the stress concentrations where the forces are applied. There are keys (545) between the compression blocks and the trough to insure correct alignment of the compression blocks to the trough. These keys may be rectangular, as shown at the inlet end, or circular as shown at the far end. Also shown are chamfers (546) between the pointed end of the root (116) and the bottom edge of the compression blocks (543) and (544) at each end of the trough. These chamfers (546) are not in the glass contact area of the trough. The chamfers (546) reduce a small area of tension stress at this location.

FIGS. 55A through 55D show a sheet glass forming apparatus (550), where the weight of the trough is supported at the inlet end by the inlet end structure (523) at surface (541). Additionally, it is constrained horizontally by a small compression force (538) at surface (539). The weight of the trough is supported at the far end by the free-floating far end compression block (554), which has been set at an angle (551) to the horizontal. Although not shown, either (or both) free-floating compression block (553) or (554) can be set at an angle to the horizontal. If both compression blocks (553) or (554) are at an angle, the compression force at the bottom of the trough is generated by the weight of the trough.

The compression force (556) on the trough contains vertical and horizontal components such that the horizontal compression force (526) equals the weight of the trough at the far end divided by the tangent of the angle (551). The compression force (556) is generated by the force motor (558) acting on the far end structure (555). The inlet end compression force (536) is applied to the bottom of the trough by the free-floating compression block (553). The inlet end compression force (536) is generated by the inlet end force motor (558). The compression force (556) must be such that the far end compression force (526) is slightly greater than the inlet end compression forces (536) to compensate for the inlet pipe compression force (538). The trough bottom compression forces (556) and (536) are applied friction free and can be maintained at the same and/or any preprogrammed level throughout a production campaign. The compression block (554) is keyed to the trough at points (557) to insure correct alignment of the compression blocks to the trough. A boss (559) is preferably formed into the inlet end of the trough to better distribute the inlet end compression force (556) into the trough. The boss (559) is not in the glass contact area of the trough and therefore has no adverse effect on the glass flow. The inlet end compression block (553) is reshaped to have the same cross-section shape as the boss (559) where the two contact each other.

FIGS. 56A through 56D is an embodiment of a sheet glass forming apparatus (560) much like that shown in FIGS. 54A through 54D except that a force motor (568) is added to far end structure (565) at the top end of the far end of the trough (10). The force motor (568) adds a force (566) that is equal and opposite to the glass sealing force (538). This allows the compression force (526) on the far end to be equal to the compression force (536) on the inlet end.

In FIGS. 56A through 56D, forces (538) and (566) as well as forces (536) and (526) are not precisely equal and opposite. Since the trough is heavier and has a larger cross-section on the inlet end, these forces may be adjusted to provide a couple to compensate for the effect of this additional weight and cross-section on thermal creep.

FIGS. 57A through 57D show an embodiment of a sheet glass forming apparatus (570) whereby the inlet end adjusting screw (524) is retained and a force motor (578) is added to the inlet pipe at surface (539) to generate a constant sealing force (538) for the glass seal between the inlet pipe (8) and the trough (10).

FIG. 58A through 58D show an embodiment of a sheet glass forming apparatus (580) where the forces (526) and (536) are equal by design. The inlet end structure (583) supports the weight of the trough at surface (541). The far end structure (585) supports the weight of the trough at surface (542). The cage (588) has a low friction support (589) such that it is free to move in the horizontal direction. Some examples for the support (589) include, but are not limited to, anti-friction bearings, suspension cables, flexures. The cage (588) connects to and applies a force to the inlet end compression block (543) and mounts the far end force motor such as to apply an equal and opposite force to the far end compression block (544).

Effects of Surface Tension on the Sheet

In an alternative embodiment of the invention, the width and the angle of the inverted slope of the forming wedge may be changed to alter the effect of surface tension and body forces on the narrowing of the sheet. In addition, the width and the inverted slope angle may be increased to make the structure stiffer and thus more resistant to thermal creep.

FIGS. 21A through 21G show the prior art shape of the forming trough. The cross-section of the wedge shaped portion, FIGS. 21C through 21G, is uniform over the entire useable length of the trough. The width of the trough (211) and the angle of the inverted slope (210) are identical at each section. As the molten glass (10) flows down the vertical portion (211) of the forming wedge (9), the surface tension and body forces have a minimal effect on the sheet width (212), whereas, when the molten glass (10) flows vertically down the inverted slope portion (210) of the forming wedge, the surface tension and body forces act to make the sheet narrower (213).

FIGS. 22A through 22G show an identical width of the trough (211) over its entire length, whereas the angle of the inverted slope (210) is the same in the center of the trough (FIGS. 21D–21F) and the angle of the inverted slope (220) at each end is reduced. This reduced inverted slope (220) has a counterbalancing effect on the surface tension and body force stresses and thus reduces the narrowing of the sheet (223).

FIGS. 23A through 23G show the width of the trough (211) and the angle of the inverted slope (210) being the same in the center of the trough (FIGS. 21D through 21F and FIGS. 22D through 22F), whereas, the width of the trough (231) and the angle of the inverted slope (230) at each end are reduced. This reduced width (231) and inverted slope (230) have a counterbalancing effect on the surface tension and body force stresses over the effect of FIGS. 22A through 22G and thus further reduces the narrowing of the sheet (233).

FIGS. 24A through 24G show another embodiment of this invention, wherein the width of the trough (211) and (231) and the angle of the inverted slope (210) and (230) are the same as in the embodiment of FIGS. 23A through 23G except that the angle of the inverted slope (240) at the center of the trough, FIG. 24E is substantially greater than the other inverted slopes (210) and (230). This greater angle increases the section modulus of the structure making it stiffer and thus less prone to thermal creep. Keeping the configuration of the ends the same as FIGS. 23A through 23G has substantially the same effect on the surface tension and body force stresses as FIGS. 23A through 23G and thus has little effect on the narrowing of the sheet (243).

Reducing Surface Tension with a Bead Guide

FIGS. 43A through 43G show the prior art shape of the wedge shaped forming device (9). The outside cross-section of the wedge shaped portion, FIGS. 43C through 43G, is uniform over the entire useable length of the trough. The angle of the inverted slope (430) and the width of the trough (431) are identical at each section. As molten glass (10) flows vertically down on the inverted slope portion (433) of the forming wedge (9), the surface tension and body forces act to make the sheet narrower, (432) to (433), at the forming wedge bottom (5). When the sheet leaves the bottom of the trough (116) it contracts further, (433) to (434), in the longitudinal direction. This contraction causes the glass to form large thick beads (435) at each end as shown in FIG. 43B.

FIGS. 44A through 44G show an embodiment of this invention with a bead guide (446) located below the bottom of the trough. The glass width (433) at the bottom (116) of the inverted slope portion of the wedge is not affected. When the glass leaves the trough bottom it contracts further, (433) to (447), until it reaches the bead guide (446). The width, (447) to (448), remains substantially constant in the region of the bead guide (446) but further contracts, (448) to (444), beneath the bead guide. When the glass sheet (12) is moving past the bead guide (446), the center of the sheet is solidifying, thus nullifying the surface tension effects in this region. The subsequent sheet width (444), with a bead guide, shown in FIG. 44A, is greater than the sheet width (434), shown in FIG. 43A, without the bead guide (446). The beads (445) shown in FIG. 44B (with a bead guide (446)) are smaller than the beads (435) shown in FIG. 43B (without a bead guide).

In an alternative embodiment of the invention, the width and the angle of the inverted slope of the forming wedge is changed to alter the effect of surface tension and body forces on the narrowing of the sheet. In addition, the width and the inverted slope angle may be increased to make the structure stiffer and thus more resistant to thermal creep. A bead guide is added to the apparatus to reduce the size of the beads at each end of the sheet.

FIGS. 45A through 45G show an embodiment of the present invention with an altered trough design. In this embodiment the width of the trough (431) is identical over its entire length, the angle of the inverted slope (430) is the same in the center of the trough (FIGS. 45D through 45F) whereas the angle of the inverted slope (450) at each end (FIGS. 45C and 45G) is reduced. The wedge shaped forming trough (9) has a bottom edge (116) which has a concave down shape (459) at each end primarily to facilitate the reduced angle of slope. The reduced inverted slope (450) introduces a gravitational force which has a countermanding effect on the surface tension and body force stresses in the center of the glass flow stream and thus reduces the narrowing of the sheet, (432) to (453), to substantially zero as it flows down the inverted slope of the trough.

In a preferred embodiment, the angles of the slopes (430) and (450) are in the range of 10° to 25°, with the angles (430) generally being larger than the angles (450). This range is only provided as an example, and other angles are also contemplated by the present invention.

When the glass leaves the trough bottom it contracts further, (453) to (457), until it reaches the bead guide (456). The bead guide in this embodiment is preferably a rotating disk. The rotation of the disk imparts a stretching force to the glass sheet, which actually increases the width of the sheet, (457) to (458), in the region of the bead guide (456). The sheet further contracts, (458) to (454), beneath the bead guide. When the glass sheet (12) is moving past the bead guide (456) the center of the sheet is solidifying, thus nullifying the surface tension effects in this region. The subsequent sheet width (454) is substantially the same as the width on the side of trough (432) and the width (453) at the bottom of the trough. With suitable development of the size, shape, location, rotation speed, and heating of the bead guide (456), the beads (455) shown in FIG. 45B are substantially eliminated, thus the beads have the same or lesser thickness than the useable portion of the sheet.

FIGS. 46A through 46D illustrate various configurations of the bead guide. FIG. 46A shows a simple wedge shaped device (461), which is attached to an X-Y-Z adjusting mechanism (463). The X-Y-Z mechanism (463) is a mechanism that moves the bead guide (461). The mechanism (463) allows the bead guide (461) to be moved around and adjusted as needed. The glass attaches itself to the front surface (462) of the wedge shaped device (461). FIG. 46B shows a bead guide with the same shape as that in FIG. 46A, but with provisions for heating by passing electrical energy through a platinum sheet (464) wrapped around the wedge shaped portion of the bead guide (461). Provision for electrical connections (465) are attached to the platinum sheet (464). The bead guide in FIG. 46C is similar to that in FIG. 46A but with a rounded top (466). FIG. 46D shows the bottom of the bead guide angled (467) away from the center of the sheet. The exact shape of a bead guide for a specific manufacturing process is preferably developed by simulation and by test in operation.

FIGS. 47A through 47B illustrate an active bead guide, which includes a rotating disk (471), the rotation of which actively pulls the glass from the center of the sheet toward the bead area. This bead guide is also shown in FIG. 45A. FIG. 47A illustrates a system whereby the rotating disk (471) is supported from the end of the chamber containing the sheet forming apparatus. FIG. 47B illustrates a system where the rotating disk is supported by a shaft (472) inserted in through a side of the chamber containing the sheet forming apparatus. In both cases the rotating disk is attached to a shaft (472), which connects it to the rotating drive and the X-Y-Z adjusting mechanism (473).

Producing a Flat Sheet

U.S. Pat. No. 3,338,696 considers only the glass flow in the forming trough and assumes that the drawn glass from the bottom of the forming trough will be of uniform thickness and flatness because of the uniform thickness of the flow of glass to the critical point of solidification. In practice, glass must be preferentially cooled across its width to create forming stresses during solidification that create a flat sheet. The present invention alters the forming stresses and cooling distribution such that the formed sheet is inherently flat.

FIGS. 25A through 25D show an embodiment of this invention where the shape of the bottom of the forming wedge (116) is not straight but is formed convex upward (250). This causes the glass that is drawn from the center of the forming wedge (251) to cool faster than the glass drawn from each edge (252) of the forming wedge. The strategy is to impose stresses on the partially solidified glass (251) in the center of the sheet to cause the sheet to be flatter, having less warp.

FIGS. 26A through 26D show another embodiment of this invention where the shape of the bottom of the forming wedge (116) is not straight but is formed convex downward (260). This causes the glass that is drawn from the center of the forming wedge (261) to cool slower than that drawn from each edge (262) of the forming wedge. The strategy is to hold the more solidified edges (262) apart, primarily with the edge rollers (110), such that stresses caused by the shrinkage of the partially solidified glass (261) in the center of the sheet cause the sheet to be flatter, having less warp.

FIGS. 27A through 27D show an embodiment of this invention where the shape of the bottom of the forming wedge (116) is not straight but has complex shape across its width (270). This causes the glass that is drawn from the forming wedge (9) to have an equivalent cooling profile. The cooling strategy from this configuration would be a combination of that shown in FIGS. 25A through 25D and 26A through 26D.

Reducing Air Leakage

U.S. Pat. No. 3,338,696 relies primarily on careful design and matching of materials to prevent any material cracks and openings. These cracks and openings are the sources of air leakage, for both initial operation and for operation during the course of a manufacturing campaign. This embodiment of the invention provides individual pressure balancing technology such that even if a leakage path exists at start-up or develops during operation, a minimum quantity of air will flow through the leakage paths.

The glass sheet is formed by drawing the glass from the bottom of the overflow forming trough. The molten glass is cooled and is solidified in a carefully controlled manner. The most desirable cooling phenomena is radiation, which cools the glass substantially evenly through its entire thickness. Convective cooling, which cools only the glass surface, is also a factor. The convective cooling must be minimized as it has a destabilizing effect on the drawing process. The observed phenomena is a cyclic variation in sheet thickness as it is drawn. This is termed "pumping" and is a phenomena noted in all glass drawing processes.

The operating temperature of the forming zone of "The Overflow Process" is typically 1250° C. and is at the top of an open bottom chamber, typically 3 meters high, containing an atmosphere of hot air. Because of the approximately 3 meter column of high temperature air, the atmosphere in the zone where the sheet is formed has a pressure higher than the pressure outside of the forming apparatus. Therefore, any crack or opening creates an airflow path whereby air flows into the open bottom of the chamber, up the chamber and out the cracks or openings. This leakage substantially increases the convective cooling in the forming zone and subsequently produces a cyclic variation in the sheet thickness.

For air to flow through an opening there must be a difference in pressure from one side of the opening to the other. This invention involves adjusting the internal pressure in each of the major components of the forming apparatus such that the pressure difference across any leakage path to the forming zone is essentially zero. Therefore, if an opening either exists or develops, no air leakage will occur as there is no differential pressure to force airflow.

The air pressure in the internal chambers of the forming system is substantially higher than the ambient pressure in the factory. This is because of the low density of the heated air contained in the forming system. This elevated pressure forces the internal air to leak through any openings or cracks in the membranes which separate the forming zones from the heating and cooling zones. The leakage can be minimized by equalizing the air pressure on each side of any leakage path.

Referring now to FIGS. 28A through 32B, FIGS. 28A and 28B show cooling of the glass as it transitions from the molten state to the solid state. This process must be carefully controlled. This cooling process starts on the lower part of the forming apparatus (9) just above the root (116), in the muffle zone (280), continues as the molten glass sheet (11) passes through the muffle door zone (114), and is substantially solidified by the time it leaves the transition zone (281). The controlled cooling process continues in the annealer and pulling machine zone (282) to relieve internal stress in the solidified glass sheet (12).

Four embodiments for controlling forming chamber pressure differentials are shown in FIGS. 29A through 32B. These are a) adding flow to pressurize, b) restricting outflow, c) flowing to a vacuum, and d) encasement by a pressurizing chamber, respectively. Any of these control methods may be used to control the pressure in either the muffle zone (280), the muffle door zone (114), the transition zone (281), or the annealing and pulling machine zone (282) depending on unique design requirements. The critically important objective, however, is to equalize the pressure on each side of the membrane separating either the factory atmosphere or a heating zone or a cooling zone from the forming chamber.

This invention also applies to implementations of "The Overflow Process" where the gas in the forming chamber is a gas other than air, i.e. nitrogen, etc.

Figures 29A, 29B:
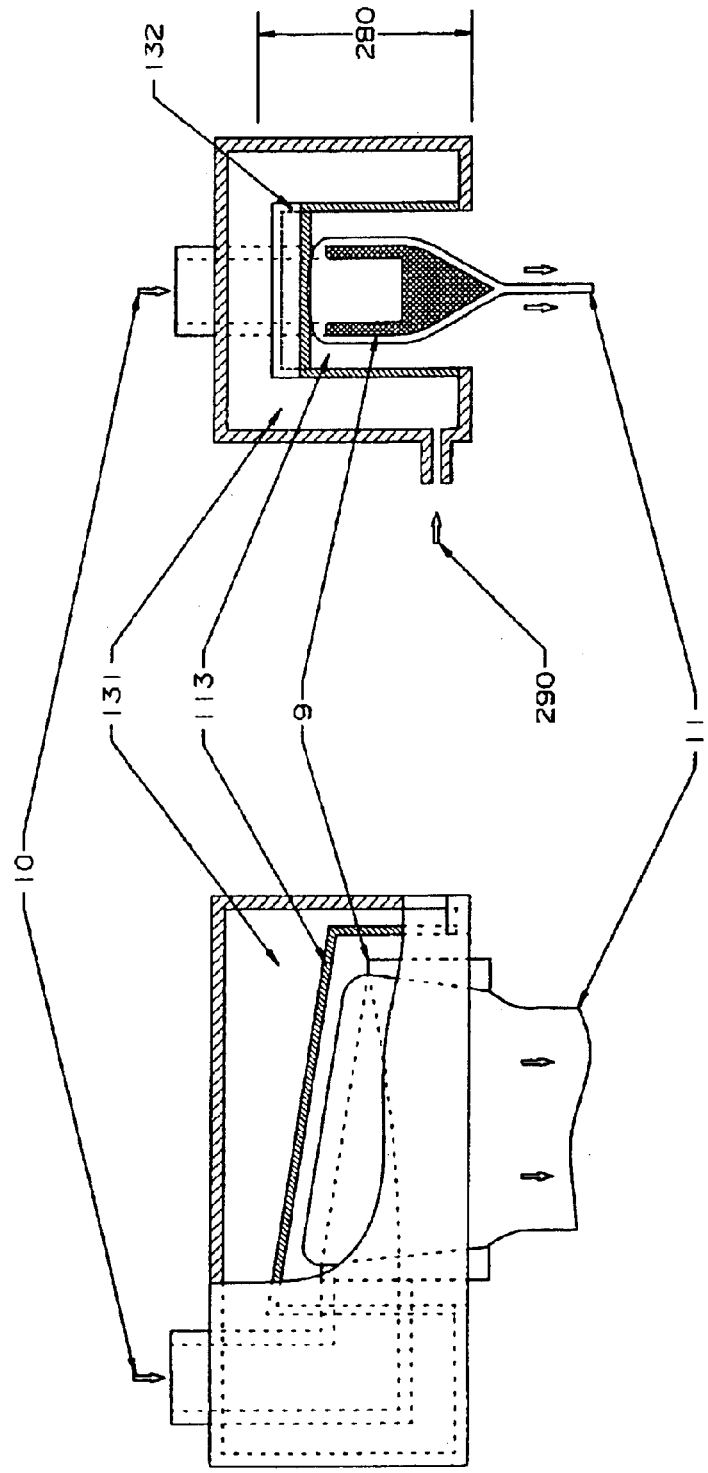
FIG. 29A shows how the pressure in the muffle zone may be controlled to minimize leakage in a preferred embodiment of the present invention.
FIG. 29B shows a section of FIG. 29A.

More specifically, FIGS. 29A and 29B show an embodiment of the muffle zone (280) which shows air (290), which is preferably preheated, introduced into the muffle heating chamber (131) to make the pressure in the heating chamber (131) equal to that in the adjacent forming chamber (113). The wall (132) separating the two chambers in the muffle is normally constructed of many pieces and is therefore susceptible to random leaks. Equalizing the pressure between the two chambers minimizes the leakage flow.

Figures 30A, 30B:
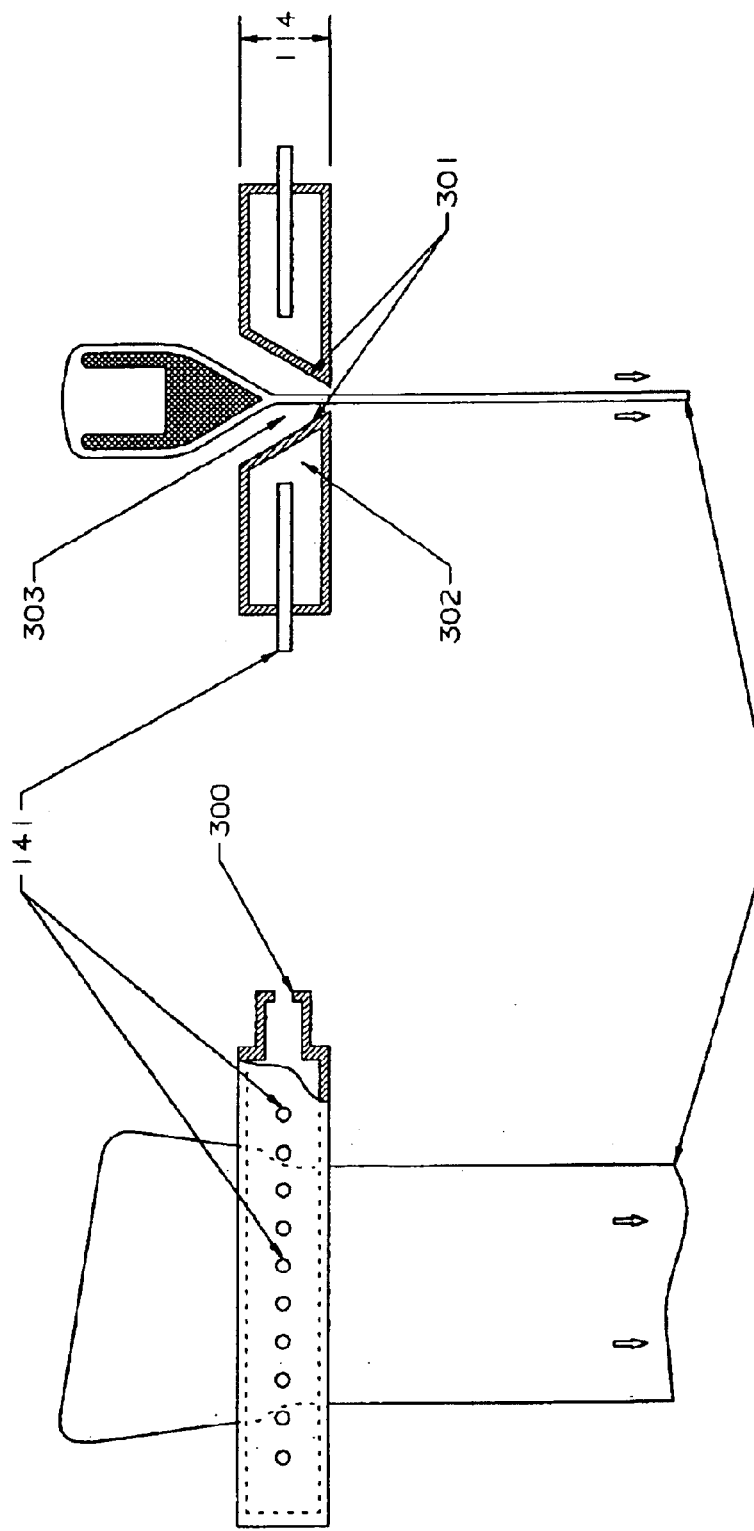
FIG. 30A shows how the pressure in the muffle door zone may be controlled to minimize leakage in a preferred embodiment of the present invention.
FIG. 30B shows a section of FIG. 30A.

FIGS. 30A and 30B show an embodiment of the muffle door zone (114), which includes an exit restriction (300) to the flow of air exiting each muffle door (301) to factory ambient pressure. The size of this restriction is varied to regulate the pressure inside the muffle door (302) equal to that in the pressure in the adjacent forming chamber (303). The flow of air into the muffle doors (301) through the cooling tubes (141) would normally be adequate to overcome any leakage paths and thus raise the muffle door internal pressure (302) to that of the adjacent forming chamber pressure (303).

FIGS. 31A and 31B show an embodiment of the transition zone (281), which has the cooling air at elevated pressure (310) entering the cooling chamber (311) and exiting (312) each of the transition coolers (313) into a regulated vacuum source (314). The large volume of air required for cooling in the transition zone would normally raise the pressure in the transition cooling chamber (311) above that of the adjacent forming chamber (315). A vacuum source (314) is therefore required to lower the pressure and is adjusted to equalize the pressure in the transition cooling chamber (311) to the pressure in the adjacent forming chamber (315).

FIGS. 32A and 32B show an embodiment of the annealer and pulling machine zone (282), which includes a pair of pressure balancing chambers (320) on each end of the annealer and pulling machine (282). The pressure in the balancing chamber (321) is adjusted to be equal to the pressure in the annealing chamber (322). A chamber at each end was chosen because the bearings and adjustment mechanisms for the pulling rollers (111) are on the ends. Alternate configurations would be one single pressure balancing chamber (320) encasing the entire annealer and pulling machine (282) or a multitude of individual pressure balancing chambers (320) as would be required by particular design considerations.

Placement of Thermocouples in the Incoming Glass Stream and in the Trough

In the process shown in FIGS. 1, 2A through 2C and 11A through 11B, and discussed above, it is normal practice to construct the entire glass contact surface from the stirrer to the trough from sheets of platinum. These sheets are welded together and the welds carefully ground smooth. Discontinuities in the platinum surface adversely effect the glass flowing in proximity to the discontinuity and result in defects in the glass sheet. Additionally it is normal practice that no thermocouples are permitted to mar this carefully finished internal surface. The thermocouples which are required for the control of the process are typically either placed against the outside surface of the platinum or welded to tabs which are welded to the outside surface. The actual temperature of the glass stream is not measured and those skilled in the art of temperature measurement know the inaccuracies inherent in this practice. The rule of thumb, proven in practice, for measuring a process stream temperature is to immerse the thermocouple into the process stream at least four times its diameter. Typically a hollow cylindrical protrusion, made of platinum and with a length four times its diameter, is welded into the side of the platinum pipe which contains the flowing glass. The thermocouple is inserted into this protective cylinder and contacts its closed end, which is in intimate contact with the flowing glass stream.

A preferred embodiment of the present invention immerses thermocouples directly in the process stream to accurately measure the glass temperature in the bowl inlet pipe, the bowl, the downcomer pipe and the trough inlet pipe, thus facilitating accurate control of glass temperature and subsequently glass flow. These thermocouples are placed in locations such that they will not have an adverse effect on the sheet glass quality. The glass passing in proximity to these thermocouples is the glass that forms the unusable edges of the sheet. Typical glass thermocouples are made from platinum wire or platinum/10% rhodium wire. These thermocouples are often fabricated on site, or optionally purchased from suppliers including, but not limited to, Engelhard-Clal or Johnson Matthey.

FIGS. 48A through 48E show an embodiment of the present invention. The thermocouples are preferably placed in one or more of the following locations: the bowl inlet pipe, the bowl, the downcomer pipe, a bottom centerline of the trough, and the trough inlet pipe. They are preferably placed in locations where the glass defects caused by the flow of glass in proximity to the thermocouples end up in the unusable beads at each end of the formed sheet. These thermocouples are immersed in the glass stream. Thermocouples (481), (483), (485) and (487) are located such that any glass streaks (cord) produced by their disturbance of the glass passing in proximity forms part of the unusable glass bead (27) at the far end of the formed sheet. The offset angle of thermocouples (481), (483), (485) and (487) from the centerline preferably ranges from 150 to 210 degrees, and is optimally 180 degrees for a symmetrical trough design. Thermocouples (482), (484), (486) and (488) are located such that any glass streaks (cord) produced by their disturbance of the glass passing in proximity forms part of the unusable glass bead (25) at the inlet end of the formed sheet. In a preferred embodiment, the offset angle of thermocouples (482), (484), (486) and (488) from the centerline preferably ranges from 30 to 60 degrees, and is optimally 45 degrees; however, the optimal angle may vary considerably based on the design of the bowl inlet pipe, the bowl, the inlet pipe and the configuration of the inlet end of the trough.

An exception to these defined angles occurs if the bowl inlet pipe (5) is not directly aligned with the trough centerline (9). The optimal angles for thermocouples (487) and (488) are rotated and must be reoriented for this special case.

FIGS. 49A and 49B show the placement of thermocouples (491), seven in this example, on the bottom longitudinal centerline (492) of the trough. The number of thermocouples is determined by the required information for measurement and/or control. The thermocouples (491) are optionally imbedded in the trough floor by grinding slots in the trough bottom, placing a matrix of thermocouples in the slots and then sealing them with a suitable cement. Imbedding the thermocouples (491) in the refractory floor of the trough is not a precise measurement of the glass temperature, however, it is far superior to a measurement inferring glass temperature by measuring the temperature of the air in the trough muffle chamber (113).

Alternately, as shown in FIG. 50A through 50D, an instrumentation assembly (503) which contains multiple thermocouples (501) may be secured to the trough floor at its longitudinal centerline (502). The design of this assembly (503) is such that the thermocouples (501) project into the glass stream and give a more accurate measurement. The cross-section of the assembly (503) is preferably uniform in the longitudinal direction so as not to influence the flow of glass to the weirs (115). In either design, the lateral location of the thermocouples (491), (501) is substantially on the bottom longitudinal centerline (492), (502) such that any glass streaks (cord) produced by their disturbance of the glass passing in proximity forms part of the unusable glass bead (27) at the far end of the formed sheet.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An improved apparatus for forming sheet glass, wherein the apparatus includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises:

a downcomer pipe inserted vertically downward into an end of the inflow pipe opposite the trough, wherein a bottom of the downcomer pipe comprises at least one downward extension including one or more V-shaped or curved extensions, which produces a controlled vortex flow of at least a portion of a glass stream exiting the downcomer pipe, directing at least a portion of the glass stream into a specific location.

2. The apparatus of claim 1, wherein a top of the inflow pipe comprises at least one radial extension corresponding to the downward extension of the bottom of the downcomer pipe.

3. The apparatus of claim 1, wherein the bottom of the downcomer pipe comprises a plurality of curved extensions, wherein the curved extensions project into the inflow pipe.

4. The apparatus of claim 3, wherein each of the curved extensions divides a single vortex of glass flow into two vortices such that glass exiting the vortices is directed to at least one unusable edge of the sheet.

5. The apparatus of claim 3, wherein the curved extensions comprise a plurality of V-shaped extensions.

6. The apparatus of claim 5, wherein the curved extensions comprise three V-shaped extensions.

7. The apparatus of claim 5, wherein the curved extensions comprise two V-shaped extensions.

8. The apparatus of claim 1, wherein the bottom of the downcomer pipe comprises a single V-shaped extension.

9. The apparatus of claim 1, wherein each extension divides a single vortex of glass into two vortices such that glass exiting the vortices is directed to at least one unusable edge of the sheet.

10. The apparatus of claim 1, wherein the bottom of the downcomer pipe is submerged in a glass free surface in the inflow pipe.

11. The apparatus of claim 1, wherein the bottom of the downcomer pipe is located substantially above a glass free surface in the inflow pipe.

12. The apparatus of claim 1, wherein the bottom of the downcomer pipe is partially submerged in a glass free surface in the inflow pipe.

13. The apparatus of claim 1, wherein a centerline of the downcomer pipe is not centered with a centerline of the inflow pipe.

14. The apparatus of claim 1, wherein the bottom of the downcomer pipe is cut at an angle to a centerline of the downcomer pipe.

15. The apparatus of claim 14, wherein the centerline of the downcomer pipe is not centered with a centerline of the inflow pipe.

16. The apparatus of claim 1, wherein the improvement further comprises at least one thermocouple that measures a temperature of the molten glass, wherein the thermocouple is immersed in at least one location directly in a path of molten glass flow, and wherein the location of the thermocouple is such that the thermocouple does not have an adverse effect on a quality of a finished glass sheet.

17. The apparatus of claim 16, wherein the apparatus further comprises a bowl inlet pipe for receiving molten glass from a stirring device, a bowl for receiving the molten glass from the bowl inlet pipe, and delivering the molten glass to the downcomer pipe, wherein the location of the thermocouple is selected from the group consisting of:

a) the bowl inlet pipe;

b) the bowl;

c) the downcomer pipe;

d) the inflow pipe;

e) a bottom centerline of the trough; and f) any combination of a) through e).

18. A method for manufacturing glass sheets using an apparatus that includes a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, wherein the method comprises the step of:

altering a flow path of at least a portion of a molten glass stream, wherein a bottom of a downcomer pipe comprises at least one downward extension including one or more V-shaped or curved extensions, which produces a controlled vortex flow of at least a portion of the glass stream exiting the downcomer pipe, directing at least a portion of the glass stream into a specific location.

19. The method of claim 18, wherein a top of the inflow pipe comprises at least one radial extension corresponding to the downward extension of the bottom of the downcomer pipe.

20. The method of claim 18, wherein the bottom of the downcomer pipe comprises a plurality of curved extensions, wherein the curved extensions project into the inflow pipe.

21. The method of claim 20, wherein each of the curved extensions divides a single vortex of glass flow into two vortices such that glass exiting the vortices is directed to at least one unusable edge of the sheet.

22. The method of claim 20, wherein the curved extensions comprise a plurality of V shaped extensions.

23. The method of claim 22, wherein the curved extensions comprise three V-shaped extensions.

24. The method of claim 22, wherein the curved extensions comprise two V-shaped extensions.

25. The method of claim 18, wherein the bottom of the downcomer pipe comprises a single V-shaped extension.

26. The method of claim 18, wherein each extension divides a single vortex of glass flow into two vortices such that glass exiting the vortices is directed to at least one unusable edge of the sheet.

27. The method of claim 18, wherein the bottom of the downcomer pipe is submerged in a glass free surface in the inflow pipe.

28. The method of claim 18, wherein the bottom of the downcomer pipe is located substantially above a glass free surface in the inflow pipe.

29. The apparatus of claim 18, wherein the bottom of the downcomer pipe is partially submerged in a glass free surface in the inflow pipe.

30. The method of claim 18, wherein a centerline of the downcomer pipe is not centered with a centerline of the inflow pipe.

31. The method of claim 18, wherein the bottom of the downcomer pipe is cut at an angle to a centerline of the downcomer pipe.

32. The method of claim 31, wherein the centerline of the downcomer pipe is not centered with a centerline of the inflow pipe.

33. An improved apparatus for forming sheet glass, wherein the apparatus includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises:

a bead guide located below a bottom of the trough that minimizes a formation of beads at each end of the glass sheet, comprising a portion that contacts the molten glass as it travels over the bead guide, such that a contraction of a width of a molten glass sheet is minimized as it moves downward over the bead guide.

34. The apparatus of claim 33, further comprising a variable external cross-section of the wedge shaped sheet forming structure.

35. The apparatus of claim 33, further comprising a heater operatively connected to the bead guide.

36. The apparatus of claim 35, wherein the heater comprises a platinum sheet wrapped around a portion of the bead guide.

37. The apparatus of claim 36, wherein the heater further comprises a plurality of electrical connections attached to the platinum sheet.

38. The apparatus of claim 33, wherein the bead guide comprises a wedge-shaped portion such that the glass sheet attaches to and travels over a front of the wedge-shaped portion of the bead guide.

39. The apparatus of claim 38, wherein a top of the wedge-shaped portion is rounded.

40. The apparatus of claim 33, wherein a bottom of the bead guide is angled away from a center of the glass sheet.

41. The apparatus of claim 33, wherein the bead guide comprises a rotating disk.

42. The apparatus of claim 41, wherein a rotation of the rotating disk actively pulls glass from a center of the sheet towards a beading area on the edges of the sheet.

43. The apparatus of claim 41, wherein the bead guide further comprises a shaft, connected to the rotating disk on a first end, and connected to a chamber housing the wedge shaped forming structure on a second end.

44. The apparatus of claim 41, wherein a width of the glass sheet increases as it passes over the bead guide.

45. The apparatus of claim 33, wherein the beads have a thickness less than a useable portion of the glass sheet.

46. The apparatus of claim 33, wherein a width of the glass sheet remains substantially constant as the glass sheet travels over the bead guide.

47. An improved apparatus for forming sheet glass, wherein the apparatus includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises:

a downcomer pipe connected to an end of the inflow pipe opposite the trough, wherein a centerline of the downcomer pipe is not centered with a centerline of the inflow pipe.

48. The apparatus of claim 47, wherein a bottom of the downcomer pipe is cut at an angle to a centerline of the downcomer pipe.

49. An improved apparatus for forming sheet glass, wherein the apparatus includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises:

a downcomer pipe connected to an end of the inflow pipe opposite the trough, wherein a bottom of the downcomer pipe is cut at an angle to a centerline of the downcomer pipe.

50. An improved apparatus for forming sheet glass, wherein the apparatus includes a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises:

a) at least one inlet end support block located at an inlet end of the trough, wherein the inlet end support block supports the trough;

b) an inlet end glass seal structure which affects a glass seal between the inflow pipe and the inlet end of the trough;

c) at least one far end support block located at an opposite end of the trough as the inlet end support block, wherein the far end support block supports the trough;

d) a robust structure restraining an inlet end adjustment screw, wherein the inlet end adjustment screw restrains the inlet end support block in a longitudinal direction; and e) a far end force motor, wherein the far end force motor applies a force to the far end support block such that a bottom of the far end of the trough is deformed, by thermal creep, in a longitudinal direction;

wherein the inlet end glass seal structure is designed to be weak in the longitudinal direction such that, as the far end of the trough deforms by thermal creep, the glass seal structure does not absorb significant horizontal force from the adjustment screw;

such that any deformation of the forming trough that results from thermal creep has a minimal effect on a thickness variation of the glass sheet.

51. An improved apparatus for forming sheet glass, wherein the apparatus includes an inflow pipe for delivering molten glass, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, and wherein the improvement comprises:

a downcomer pipe inserted vertically downward into a top of the inflow pipe opposite the trough, wherein the inlet pipe comprises at least one radial extension, which produces a controlled vortex flow of at least a portion of a glass stream exiting the downcomer pipe, directing at least a portion of the glass stream into a specific location.

52. The apparatus of claim 51, wherein the inlet pipe comprises a plurality of curved radial extensions, wherein the curved extensions project away from the downcomer pipe.

53. The apparatus of claim 52, wherein each of the curved extensions divides a single vortex of glass flow into two vortices such that glass exiting the vortices is directed to at least one unusable edge of the sheet.

54. The apparatus of claim 52, wherein the curved extensions comprise three extensions.

55. The apparatus of claim 52, wherein the curved extensions comprise two extensions.

56. The apparatus of claim 51, wherein the bottom of the downcomer pipe is submerged in a glass free surface in the inflow pipe.

57. The apparatus of claim 51, wherein the bottom of the downcomer pipe is partially submerged in a glass free surface in the inflow pipe.

58. The apparatus of claim 51, wherein the bottom of the downcomer pipe is located substantially above a glass free surface in the inflow pipe.

59. A method for manufacturing glass sheets using an apparatus that includes an inflow pipe for delivering molten glass received from a downcomer pipe connected to an end of the inflow pipe opposite the trough, a trough for receiving molten glass that has sides attached to a wedged shaped sheet forming structure that has downwardly sloping sides converging at the bottom of the wedge such that a glass sheet is formed when molten glass flows over the sides of the trough, down the downwardly sloping sides of the wedged shaped sheet forming structure and meets at the bottom of wedge, wherein the method comprises the step of:

moving the inflow pipe relative to the downcomer pipe such that the downcomer pipe is not centered with a centerline of the inflow pipe, which alters a flow path of at least a portion of a molten glass stream, and produces a controlled vortex flow of at least a portion of the glass stream exiting the downcomer pipe, directing at least a portion of the glass stream into a specific location.

* * * * *